United States Patent [19]
Buckley

[11] Patent Number: 5,940,529
[45] Date of Patent: Aug. 17, 1999

[54] SELF-ORGANIZING CIRCUITS

[76] Inventor: B. Shawn Buckley, 7067 Via Blanca, San Jose, Calif. 95139

[21] Appl. No.: 08/756,971

[22] Filed: Nov. 26, 1996

Related U.S. Application Data

[63] Continuation-in-part of application No. 08/279,917, Jul. 25, 1994, abandoned.

[51] Int. Cl.$^6$ ...................................................... G06K 9/62
[52] U.S. Cl. ............................................................ 382/155
[58] Field of Search .................................... 382/155, 156, 382/157, 158, 159, 160, 190, 226, 227, 228, 229; 364/148; 395/2.11, 2.25, 2.26, 2.27, 2.4, 2.41, 2.46, 2.47, 2.48, 2.49, 2.52, 2.53, 2.54, 2.68, 2.72, 1, 11, 20, 27, 50

[56] References Cited

U.S. PATENT DOCUMENTS

| | | | |
|---|---|---|---|
| 4,479,241 | 10/1984 | Buckley | 382/155 |
| 4,774,677 | 9/1988 | Buckley | 364/513 |
| 4,989,256 | 1/1991 | Buckley | 382/155 |
| 5,161,203 | 11/1992 | Buckley | 382/155 |

*Primary Examiner*—Jose L. Couso
*Attorney, Agent, or Firm*—Michael J. Persson; William B. Ritchie

[57] ABSTRACT

A self-organizing system providing improved performance is composed of node subcircuits in two or three dimensional arrays of nodes which behave like neurons in the brain. Improvements in the learning rules use the time-filtered output of nodes to define memory traces. Spatial summation and spatial difference functions then determine how node branches will compete to produce various memory trace topologies such as roots and junctions. Roots begin as input patterns at the lowest level of the circuit and grow towards output nodes at the highest level; roots are attracted to output nodes and to other roots as they grow. Roots connect or branch at junctions which are identified by spatial functions. By modifying node properties and branch competition of nodes at root junctions, roots interact to create Boolean logic roles. Unsupervised (classical) learning results when roots associate with each other. Supervised (operant) learning regulates root junction logic to assure that sequential or combinational system input patterns produce the proper system outputs. Punish or reward signals broadcast to all nodes are only acted on by memory trace root junction nodes. Implementation is in digital and analog circuitry as well as hardware and software embodiments.

43 Claims, 18 Drawing Sheets

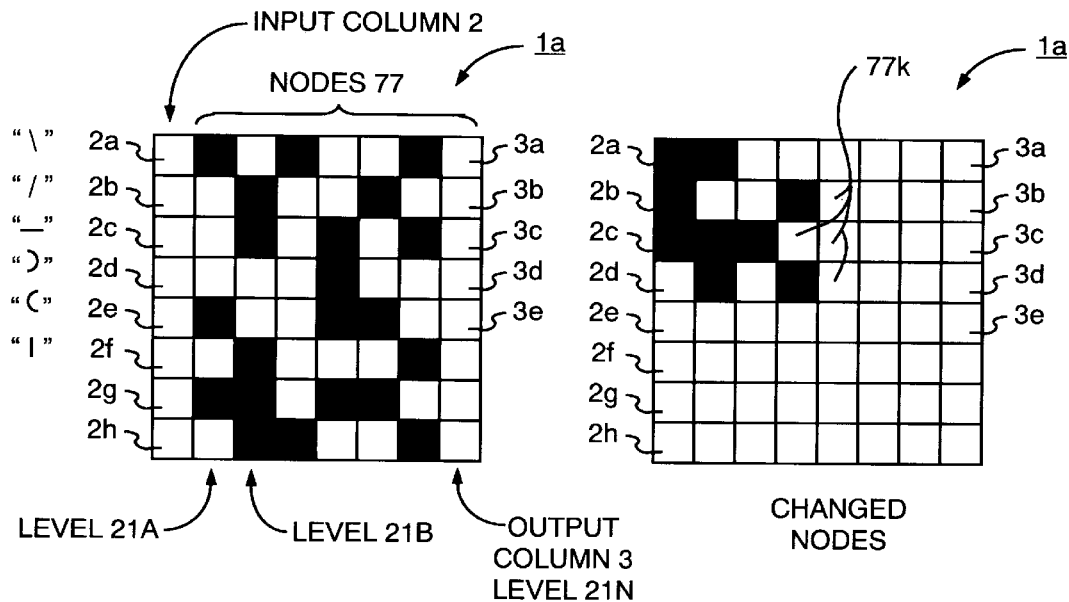
FIG. 12A
FIG. 12B
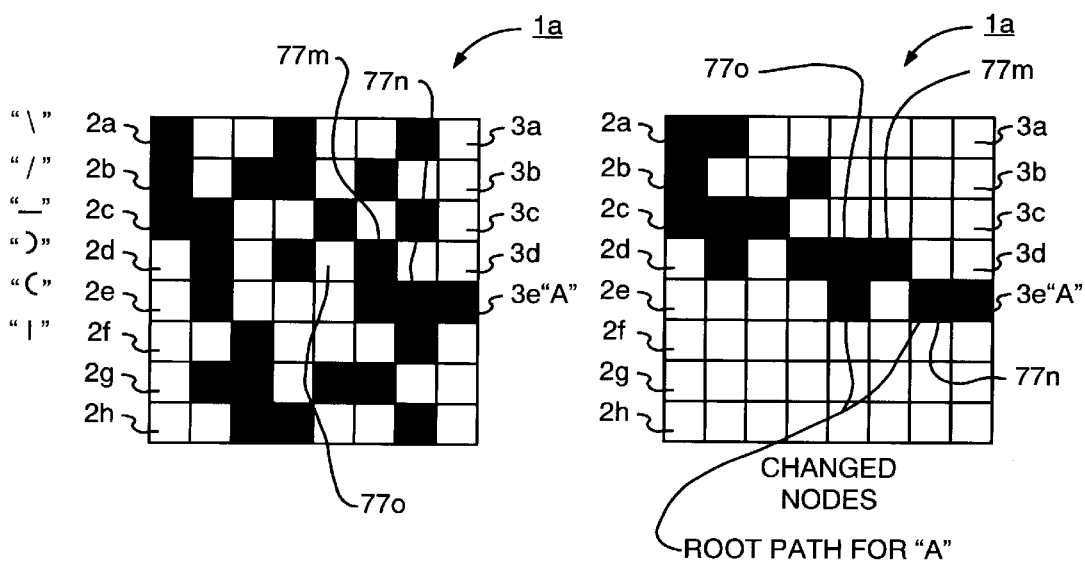
FIG. 13A
FIG. 13B

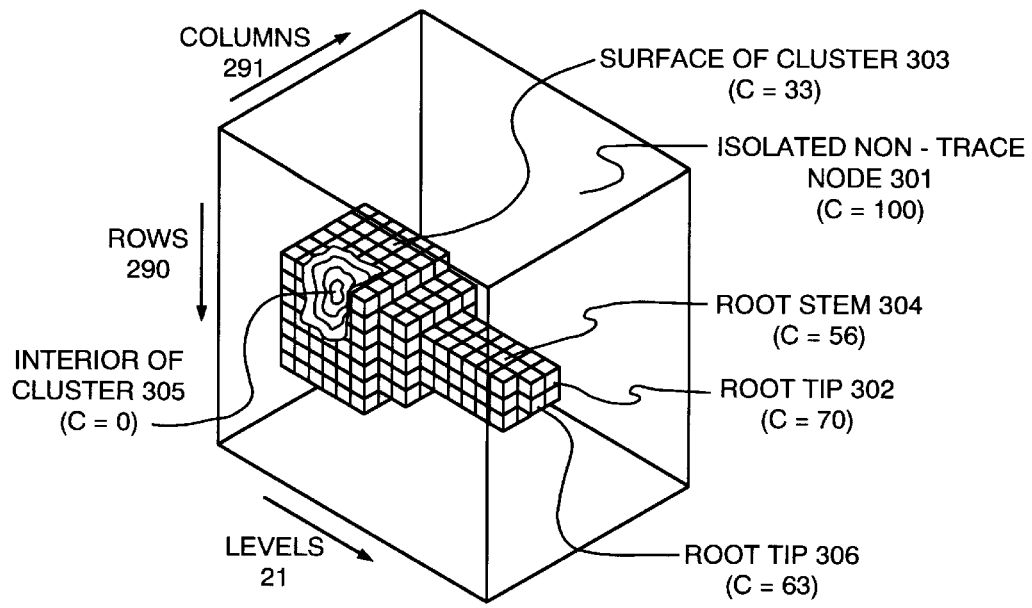
FIG. 14
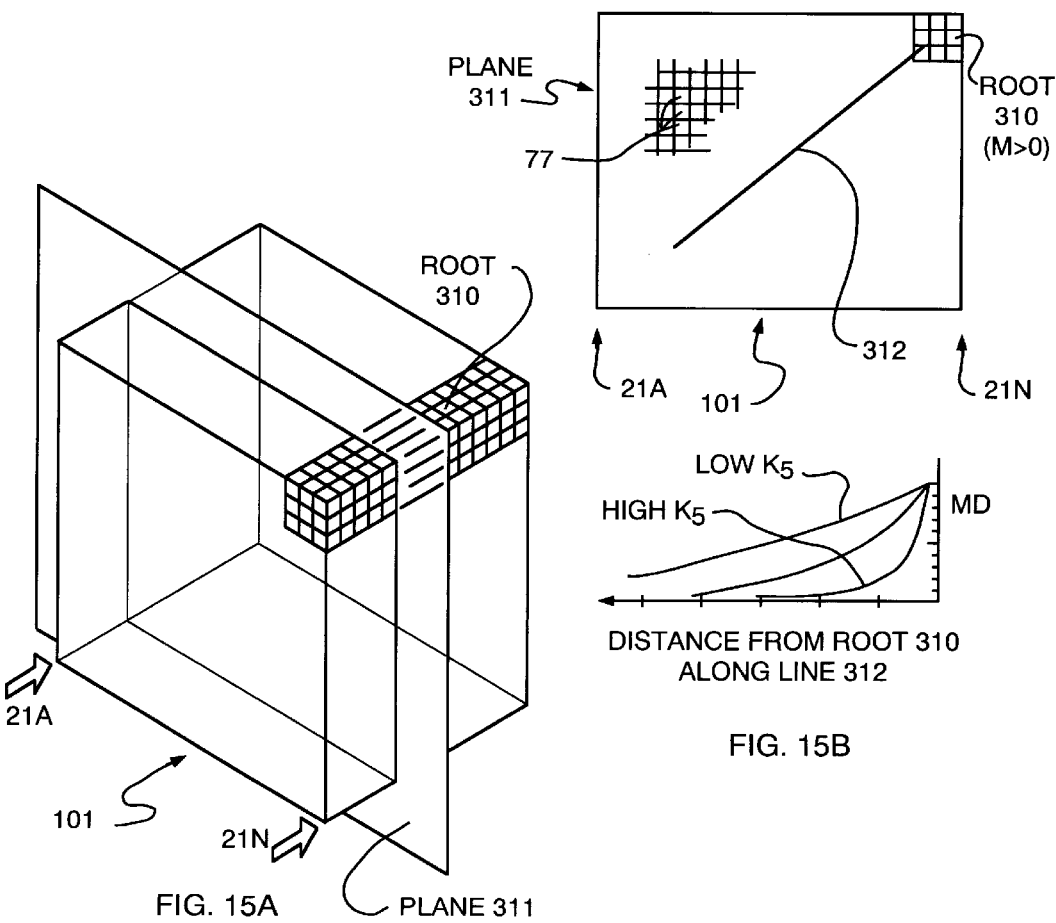
FIG. 15A
FIG. 15B

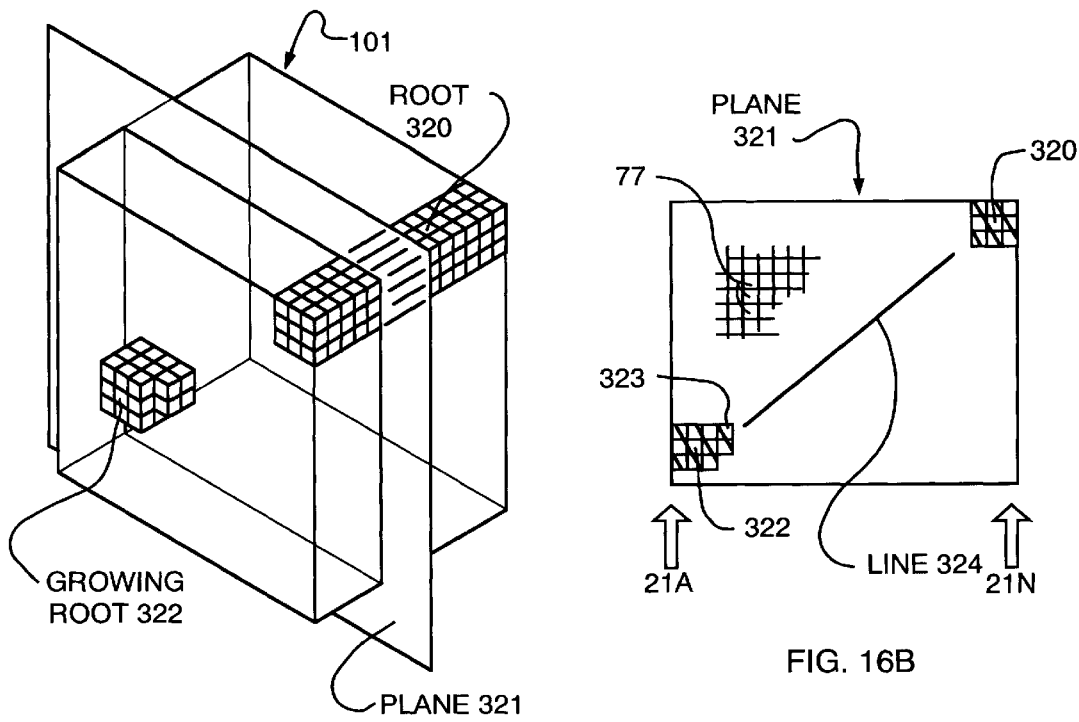
FIG. 16A
FIG. 16B
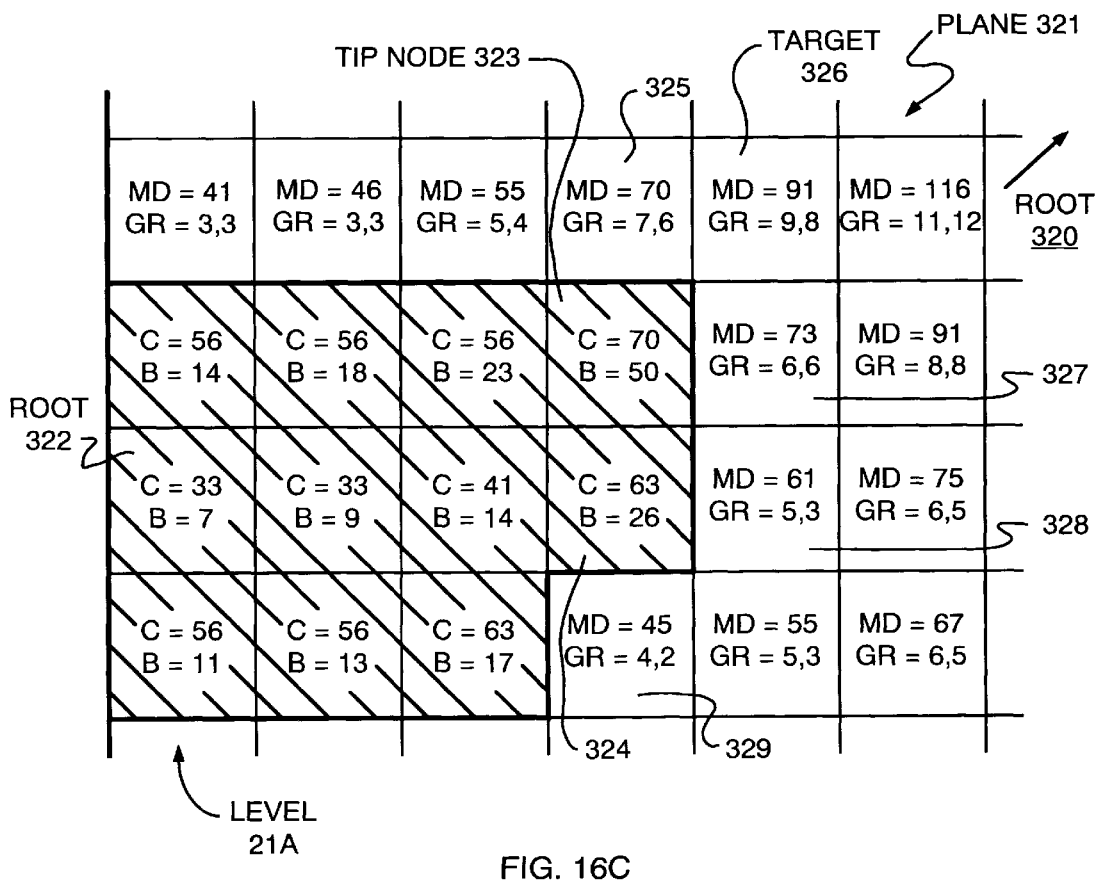
FIG. 16C

| TIME FUNCTIONS | | |
|---|---|---|
| SUMMATION | DIFFERENCE | COMBINED |
| Boolean Branch Functions (B,B'): Eqn. 1,4 | Change Sensitive Function Eqn. 6 | Memory Trace Function (M): Eqn. 9 |
| Burst Filters (M): Eqn. 8 | | |
| SPACE FUNCTIONS | | |
| SUMMATION | DIFFERENCE | COMBINED |
| Space Summation Function (I): Eqn. 12 | Space Difference Function (D, q): Eqn. 10, 11 | Branch Function (B): Eqn. 21 |
| Close (C): Eqn. 13 | Tip (T): Eqn. 15 | Close Difference ($\Delta C$): Eqn. 24 |
| Close Diffused (CD): Eqn. 14 | Target Nodes (q): Eqn. 17, 20 | |
| Memory Trace Diffused (MD): Eqn. 16 | MD Gradient (GMD): Eqn. 18 | |
| Adjacent (A): Eqn. 22 | | |
| Average Close ($C_{AVE}$): Eqn. 23 | | |

FIG. 18

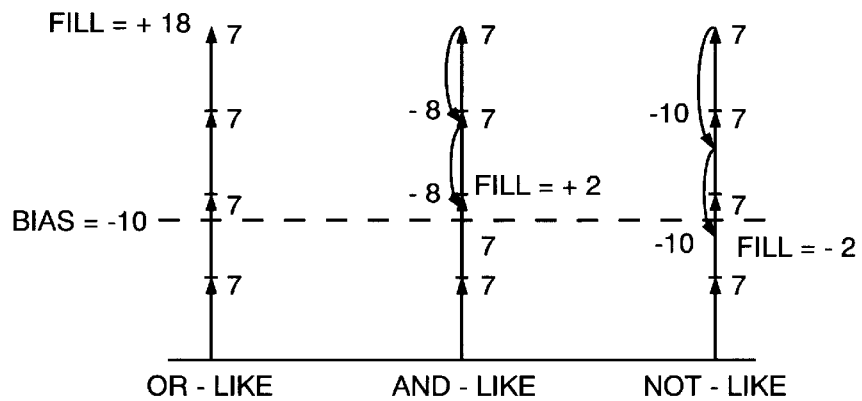
FIG. 25
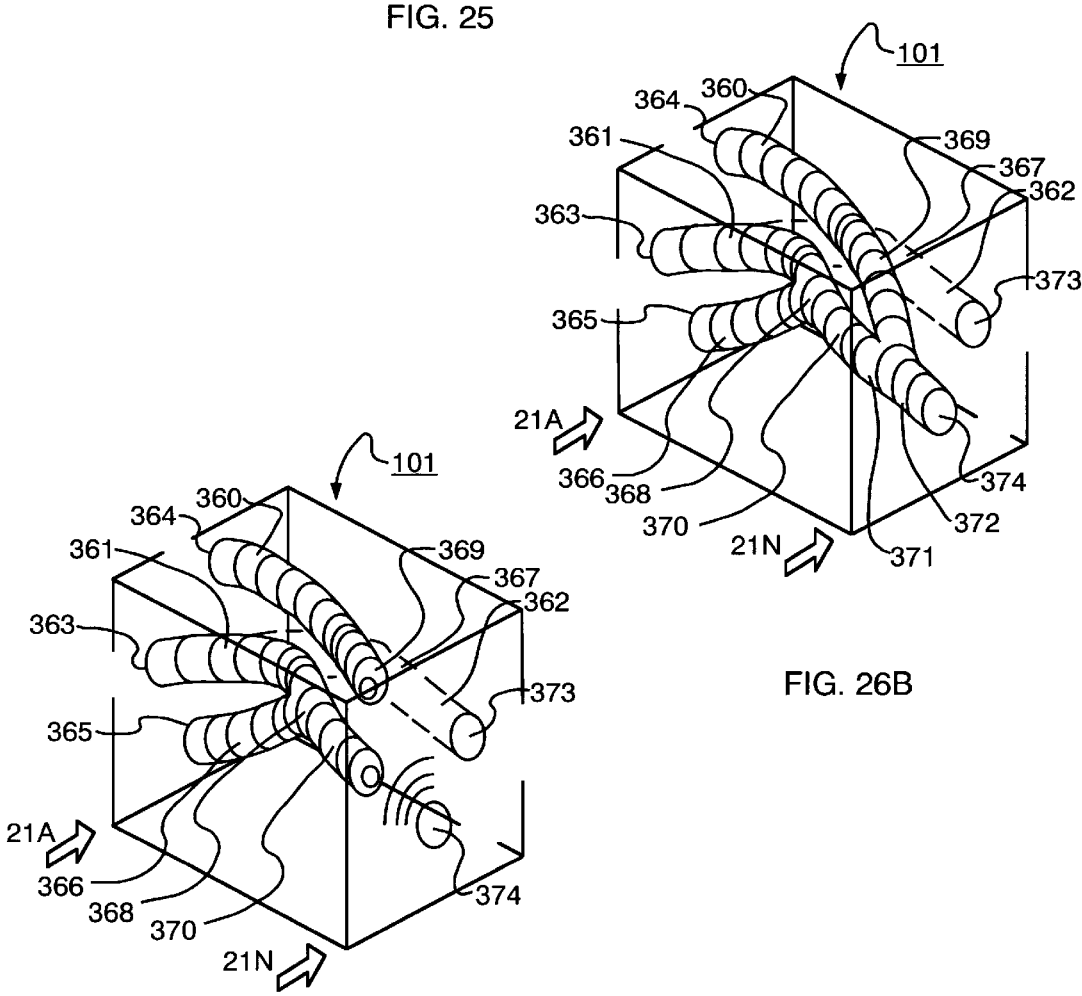
FIG. 26B
FIG. 26A

SELF-ORGANIZING CIRCUITS

This application is a continuation-in-part of application Ser. No. 08/279,917 filed Jul. 25, 1994 now abandoned.

BACKGROUND OF THE INVENTION

1. Field of the Invention

The present invention relates to systems that include mechanisms operable to receive information and to analyze that information on the basis of a learning mode of operation.

2. Description of the Related Art

The present invention adds improvements to the prior inventions of the present inventor referenced above. While these prior inventions provide adequate self-organizing circuit features, improved performance and reduction in costs can be achieved by the additions disclosed herein.

The improvements are of two basic types: those that apply to improved circuit design and those that apply to improved "teaching" of the circuit. Improved circuit design first includes a method to better allow the circuit elements of a self-organizing circuit to learn new patterns quickly, secondly includes a mechanism by which serial or sequential information can be learned, and thirdly includes mechanisms by which the circuits can be simplified by reducing the number of interconnections within the circuit. Improved teaching of the circuit includes ways by which the self-organizing circuit can be quickly taught new patterns. First by making each input to a subcircuit compete against the many other inputs to that subcircuit, by weighting each input according to simple branch functions, and lastly by incorporating a method by which information can be added to the circuit after the circuit has already learned some information. The circuit makes better distinctions between patterns by incorporating modified subcircuits which are change-sensitive and by making the subcircuit competition be sensitive to change. Lastly, a method of stabilizing and destabilizing subcircuits using signals which are sent to all nodes, lets the subcircuits organize themselves into persistent patterns.

Pattern recognition includes the ability of a circuit to detect a pattern among variables despite the fact that the pattern is not precisely the same pattern as was previously learned. The variables can be considered as any variable or set of variables from which a signal can be formed, in some way functionally related to the variables considered. The types of variables fall into two broad categories: static variables and time-varying variables. For example, when a color-blind person tries to distinguish between letters or numerals of pastel dots, he is given static variables or static information. Time-varying variables for which patterns might be recognized include audio signals, for example a person trying to distinguish between the dash and dot patterns he hears in a Morse code signal.

Clearly living organisms can accomplish this task of pattern recognition. People can recognize static information such as printed material (as the reader of these very words is now doing) and time-varying information such as how to swing a tennis racket so as to make proper contact with a tennis ball. Lower life forms also have this ability: certain ant species can recognize the foliage cover near their nests to orient themselves; certain moths can recognize the high-pitched sounds of a bat to avoid being captured; and even clams can learn primitive patterns of tactile responses which distinguish food from danger. Living organisms use electrochemical signals in the neurons of their brain or ganglion to perform this pattern recognition function.

While very complicated computers have been built which can do enormous numbers of calculations at speeds far exceeding the simple calculations done by house flies and clams, the ability of such computers to perform pattern recognition at the level of these primitive organisms has not been forthcoming. A major difference is that people tell the computers what to do whereas flies and clams tell themselves what to do. The former are essentially preprogrammed to do certain sequences in attempts to recognize patterns in space or in time while the latter self-organize themselves to "learn" to recognize patterns which are important to them. In each case, a certain amount of information is already known: in the computer it is a programming language (software) plus the myriad of interconnections in its circuitry; in the living organism it is its instincts or programmed patterns plus the myriad of interconnections in its neural circuitry.

It will be noted that in the last few years considerable research has been devoted to neural networks based on an approach by John Hopfield (see, for example, Proc. Natl. Acad. of Sci., Vol. 81, pp. 3088–3092, May 1984). When "taught" patterns, these neural networks have some of the same properties of the prior patents (U.S. Pat. Nos. 4,479,241, 4,774,677, 4,989,256 and 5,161,203 by the present inventor) and the present invention. For example, both methods can take arbitrary input patterns of binary information and detect when one of several patterns has been detected. Both methods use a multiplicity of "voter" subcircuits having simple binary outputs determined by combining neighboring outputs, weighting them either positively or negatively. Both methods are insensitive to noise—the input patterns during learning or recognition tasks may be only approximate copies of the exact input patterns and still detect the correct pattern. In a variation of the Hopfield algorithm Geoff Hinton and Terry Sejnowski use random outcomes of the subcircuits to better allow their networks to stabilize on a particular pattern (Cognitive Science, Vol. 9, 1985), much as the present invention uses random outcomes in eliminating the need for training of intermediate subcircuits.

But here the similarity ends. Hopfield, Hinton, Sejnowski and their colleagues all use "network optimization" methods for training their networks. Rather than using local outcomes of nearby nodes to adjust the interactions between subcircuits as does the present invention, neural networks optimize the network in total. Errors are detected at the input and output subcircuits and interactions between subcircuits are adjusted based on network-wide optimizations rather than on local competition between the subcircuits. In addition, present neural networks deal with time-varying patterns of inputs by transforming them into combinational patterns for which network optimization methods are well suited. The present invention can accept either combinational or sequential patterns as inputs and can output either combinational or sequential patterns as outputs.

Since neural networks rely on an optimization method, every node in the network must be adjusted as part of the learning process. As the number of nodes becomes large, the time required to learn input patterns becomes very large; some estimates show that learning time is proportional to the cube of the nodes in the network. In addition, all input patterns to neural networks must be learned at the same time: during learning all the input patterns are cycled through over and over again as the network adjusts to all the possible input sets. To learn a single new input pattern requires that the entire original input pattern set plus the new pattern be learned in its entirety.

Consequently, most neural network solutions have been limited to relatively small networks, typically less than a thousand nodes in order to keep learning time reasonable. Where larger networks are required, as in translating kanji characters, smaller networks are combined to give the proper output. Several small networks each work on a subset of the identification problem and then other neural networks combine the intermediate results.

By contrast, the self-organizing circuits and algorithms described use a direct approach rather than an optimization approach. Computations are not performed on all nodes, but rather only on nodes which meet the time filtering criteria. This time filtering identifies just those few nodes which require modification; learning a new input pattern takes approximately the same computation time regardless of the size of the network. Networks are not limited to a small number of nodes.

Moreover, new patterns can be learned by the present invention after the network has already learned other patterns. The network of nodes need not learn all the input patterns at once but can add information over time. Humans seem to use a similar technique: we don't have to relearn everything we know just to learn, say, a new phone number.

SUMMARY OF THE INVENTION

An aspect of the present invention is to provide a method by which a circuit can organize itself into a system which can recognize patterns, which are both static (non time-varying) and dynamic (time-varying).

It is a further aspect of the invention to provide novel analog and digital circuits which have the ability to learn from previous experiences as a way to self-organize. These circuits have the ability to "remember" patterns for which they were rewarded and also to "avoid" patterns for which they were punished. The learning can be accomplished wholly prior to the use as a pattern recognizer; the learning can occur in conjunction with use of such circuits as a pattern recognizer; or certain information can be learned by one circuit or system and this information can be transferred to other circuits which can operate in either of the first two modes (learn-then-recognize or learn-and-recognize simultaneously).

Another aspect of the invention is to provide primarily analog methods of accomplishing self-organizing, to provide primarily digital methods of self-organizing and also to provide variations which include some analog circuitry combined with some digital circuitry to accomplish self-organizing.

A further aspect of the invention is to provide substantially parallel subcircuitry which accepts multiple inputs from other similar subcircuits, to act on these inputs, and to output signals to yet other similar subcircuits. In addition, provision is made to connect such similar subcircuits in a combination of parallel and serial manner: parallel manner meaning two or more of the similar subcircuits acting simultaneously; serial manner meaning that one or more of the subcircuits act only after another has acted.

A further aspect of the invention is to provide both electrical and non-electrical means by which these circuits can self-organize. Non-electrical means include pneumatic, chemical, optical or other means which obey the rules set forth for self-organizing as described herein.

Another aspect of the invention is to provide an architecture of similar self-organizing circuits. The organization or architecture is composed of a hierarchy of levels, lower levels passing on information to higher levels and vice versa in such a way as to improve the self-organizing ability and ease of learning for the system as a whole.

Still another aspect of the invention is to provide means for initializing subcircuits, for changing influence coefficients between similar subcircuits, and for operating subcircuits which allows the subcircuits to behave noisily such that their output signal is not completely deterministic. Included is a provision for matching the learned responses to various patterns with useful names or identifications which the operator of such a system of circuits might wish.

Another aspect of the invention is to provide methods by which information between different elements or subcircuits of the self-organizing system can be transmitted by time-variations of signals. These time variations encompass the range between simple changes between two or more signal levels (e.g., binary data), to pulses whose width or rate (or coded sequence of widths or rates) carries the information, the purpose being to reduce the number of interconnections between various elements or subcircuits of the system.

Yet another aspect of the invention is to provide a method by which sequence of information in patterns is detected. While in many cases unordered information is satisfactory (a dozen eggs is a dozen eggs no matter which order they are taken from the box), some information is ordered and the exact nature of the ordering is critical for the patterns to be recognized. For example, in recognizing the pattern of letters which produce words, the two letters "A" and "M" taken together as a word have completely different meanings depending on order. An object of this invention is to provide circuitry which determines ordering and sequencing in patterns of both the static and time-varying varieties.

Another aspect of the invention is to provide improved teaching of the circuit. Improved teaching includes ways by which the self-organizing circuit can be quickly taught new patterns by making each input to a subcircuit compete against other inputs to that subcircuit. The competition is based on branch functions which modify the influence which one subcircuit has on another subcircuit. Depending on the behavior desired, the competition can cover the entire range where only the top subcircuit wins to where all competing subcircuits win.

To improve the self-organizing capability of the invention, a further aspect includes mechanisms to add new information to the system and a mechanism to balance the effects of excitory and inhibitory actions which take place within its subcircuits. This balance is achieved two ways: first, by balancing all inputs to a subcircuit and second, by balancing only those inputs whose subcircuits themselves are firing. In order to make the invention more sensitive to changes in the input, yet another object of the invention is to provide sensitivity to change both by appropriate choice of the competitive function used in teaching the circuit and also by modifications of the circuit to make them more change sensitive.

Another aspect of the invention is to provide a time-filtering means by which signals of too short duration or too long duration have little influence on how quickly the system learns new patterns. The present invention incorporates time-filtering as a way to amplify the influence of subcircuits which fire in short bursts or at the proper frequency and attenuate the influence of circuits which fire randomly or only for short duration. Outputs of subcircuits which have too long a duration can also have their influence reduced.

Learning rules that incorporate time-filtered functions produce a method by which a network of subcircuits eliminates inputs that change too quickly as well as those that change tooslowly. Such learning rules can be used in novel ways to teach the network to associate and distinguish its input information. As each new piece of information is learned, it must be either compared to previous information (association) or contrasted with previous information (distinction). Universal signals, broadcast to all subcircuits, can specify either punishment or reward; alternatively, universal signals can be used for comparing or contrasting.

The method by which the universal signals operate is to stabilize or destabilize appropriate subcircuits. On stabilizing, the inputs to a subcircuit are modified in a way that prevents the subcircuit from changing state (changing from firing to non-firing or from non-firing to firing). Destabilizing is the opposite: inputs to the subcircuit are modified in a way that encourages the subcircuit from changing state.

Yet another aspect of the invention provides a method to alter the character of the subcircuits based on bias and clip, variables which control how the subcircuit fires due to the number and amount of weighted inputs. Subcircuits can be made to behave like various gates (OR, AND, NOR, NAND, XOR, XNOR) depending on their bias and clip values.

An aspect of the invention is to use such networks of subcircuits to provide a means of linking patterns of input information with patterns of output information of the entire network. Tunneling is a means by which changes to the input information are made to propagate across the network to produce output information; densifying is a means by which the propagated changes are reinforced such that when the same input information occurs, the same output information will be produced.

An aspect of the invention is to provide branch competition functions based on both time functions (temporal variations) and space functions (spatial variations). These time and space functions can be further categorized into summation functions and difference functions: summation functions are those based on subcircuit outputs which accumulate over time or space, difference functions depend on differences in time or space between subcircuit outputs at different times or at different locations. Time functions define memory traces, those subcircuits which have the proper temporal aspects of firing and non-firing; space functions define various topologies of the memory traces including cluster, root and junction structures.

Input patterns at one level produce root structures which seek output subcircuits at another level. Through tunneling and densifying, these root structures grow to make connections between input patterns and outputs. The direction of the growth of new nodes which are either attracted or repulsed to output subcircuits and other memory trace roots are controlled by space functions. Other space functions control how thick the roots become and control their interaction at junctions; root branching lets one root control more than one output.

Another aspect of the invention is to provide means for unsupervised (classical) and supervised (operant) learning by altering the bias, clip and branch competition of junction subcircuits. In unsupervised learning, root junction subcircuits of memory trace structures take on OR and NOR properties as roots from input patterns are attracted to each other. In supervised learning, root junctions take on AND, NAND or NOT properties during universal punishment signals; root junctions take on OR or NOR properties during universal reward signals.

Another aspect of the invention is to provide means by which memory trace structures persist after the inputs patterns which produced them have changed or cease. One method is feedback means in which network output information is fed back and associated with the network input nodes creating repeated cycles of activity which persist. Another method uses a small percentage of "oscillator" nodes mixed with normal nodes incorporated into memory trace structures. When triggered, these nodes self-oscillate and produce periodic cycles of activity which persist after the input patterns which originally triggered the memory trace structure has ceased.

Pulses of firing nodes flow through memory trace structures. It is an object of this invention that when different input patterns are triggered sequentially, pulses from different patterns synchronize by altering their speed of propagation through the memory trace structure. Each pulse is the source of short-lived space functions which act upon other adjacent memory traces to increase or decrease their propagation speed.

When memory trace structures are formed, they operate on special "judgment" subcircuits which weight the circumstances of their formation as pleasant or unpleasant. An object of this invention is for these subcircuits to later be activated by memory traces or portions of memory traces. By summing over the entire network of subcircuits, a new variable is formed which is related to whether a new input pattern is desirable or undesirable based on prior learning experiences.

A further aspect of the invention is to provide both hardware circuitry and software implementations of the self-organizing system including its various functions: branch competition functions, time functions and space functions. Hardware circuitry can be implemented external or internal to the self-organizing circuits or locally for each subcircuit.

The foregoing aspect of the invention are attained, generally, in a system that includes a self-organizing mechanism connected to receive a plurality of input signals representing constituent elements of input information and operable to effect identification of the pattern of constituent elements by combining the influence which each constituent element has on the pattern of constituent elements, the self-organizing mechanism including multi-levels with feedback or communication between higher levels and lower levels to aid in identification of the pattern, the self-organizing mechanism being operable to provide an output related to the pattern, a correction mechanism connected to modify the self-organizing circuit means by varying the influence which each constituent element has on the pattern of constituent elements as occasioned by accurate and inaccurate identification of the input information.

The system also can include a mechanism to vary the influence which each constituent element has on an evaluation of the pattern of constituent elements based upon branch functions between the input signals to each said multilevel circuit and its outputs; and a mechanism connected to vary said influence based upon competition among the input signals. In addition, the system can include a mechanism to add new information to the system; and a method to balance the effects of excitory and inhibitory actions which take place within its subcircuits.

The invention is described hereinafter with reference to the accompanying drawing in which:

FIG. 12A shows the output states of a two-dimensional circuit shown in FIG. 1;

FIG. 12B shows how the output states of FIG. 12A change when the input signals to the circuit change;

FIG. 13A shows the output states of the circuit shown in FIG. 12A as the circuit learns an input pattern;

FIG. 13B shows how the output states of FIG. 13A change from that of FIG. 12A as the circuit learns an input pattern.

FIG. 14 is a three dimensional representation of a memory trace with various topological structures indicated;

FIG. 15A is a three dimensional representation of a circuit shown in FIG. 2 with a memory trace root structure;

FIG. 15B is a cross-sectional view of the circuit of FIG. 15A and a graph showing the expected variation of variable MD diffusing through the circuit;

FIG. 16A is a three dimensional representation of a circuit similar to FIG. 15A but with two root structures shown;

FIG. 16B is a cross-sectional view of the circuit of FIG. 16A;

FIG. 16C is a diagrammatic representation of a portion of the cross-sectional view shown in FIG. 16B detailing one of the root structures;

FIG. 18 is a table summarizing the time functions and space functions used to define memory trace topologies and branch competition functions

FIG. 25 is a diagrammatic representation in vector format similar to FIG. 21 of weights for node circuits having different types of Boolean logic;

FIG. 26A is a three dimensional representation of the stylized root structures shown in FIG. 24 but at a later time;

FIG. 26B is a three dimensional representation of the stylized root structures shown in FIG. 26A but at a later time;

DESCRIPTION OF PREFERRED EMBODIMENTS

Figure 1:
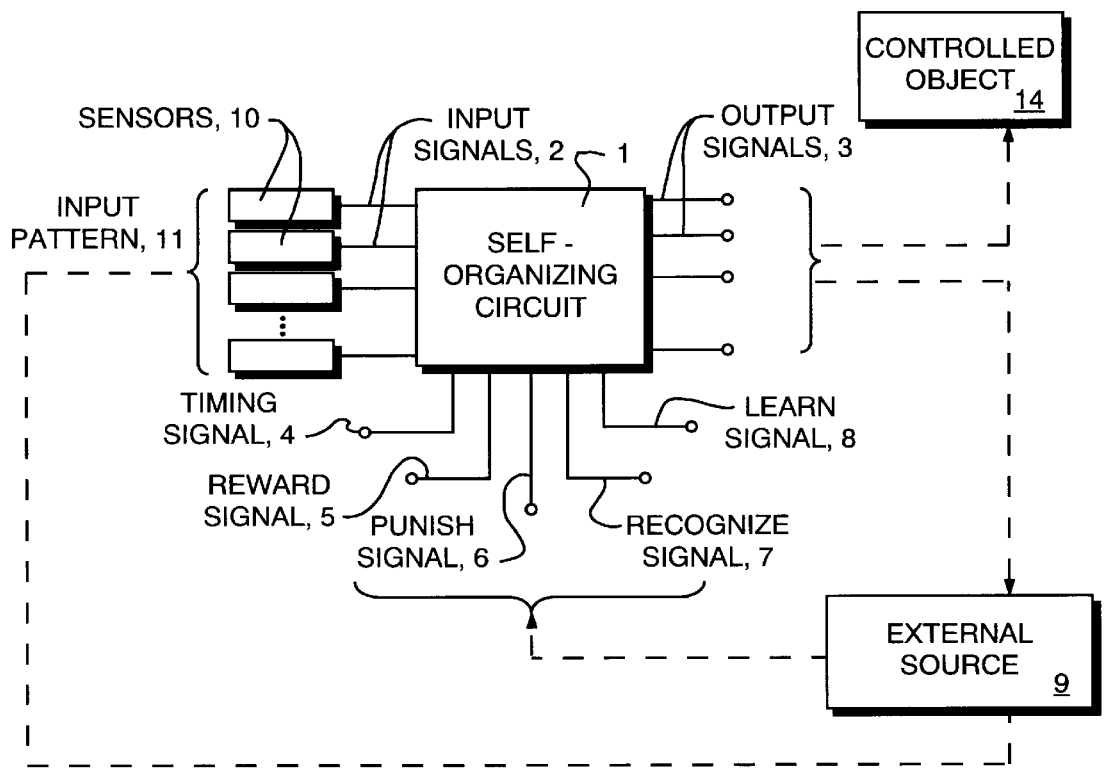
FIG. 1 is a diagrammatic representation of a system that includes a self-organizing circuit of the present invention.

There now follows a brief explanation of the invention with reference to FIG. 1 which shows a system 101 that includes transducers or sensors 10 to sense an environmental condition or some other input pattern thereto at 11. The sensor or sensors 10 are operable to process that input to provide an input signal at 2 which includes information to be analyzed. A self-organizing circuit 1, connected to receive that input signal, is operable to effect analysis of components of constituent elements of the input signal and to provide an output signal at 3.

In the discussion which follows, the various signals as well as the entire inner workings of self-organizing circuit 1 are assumed to be electrical signals. This need not be the case since analogous circuits can be derived which are non-electrical. For example, the self-organizing circuit 1 could be implemented in fluidics using pressure signals instead of voltage signals or in thermics using temperature signals instead of voltage signals (see, for example, U.S. Pat. No. 4,137,964 by the present inventor). However, for simplicity, further discussion will consider only the electrical implementation as the preferred embodiment.

An external source 9 (e.g., a computer), as explained later herein, is connected to apply modified inputs as inputs 5,6,8 and 7 (e.g., a reward signal, a punish signal, a learn signal and a recognize signal, respectively) to self-organizing circuit 1; the input signals at 5, 6 serve to correct errors in the output signal at 3 occasioned by inaccurate analysis by the self-organizing circuit. A timing signal may be applied at 4 for purposes later discussed.

Figure 2:
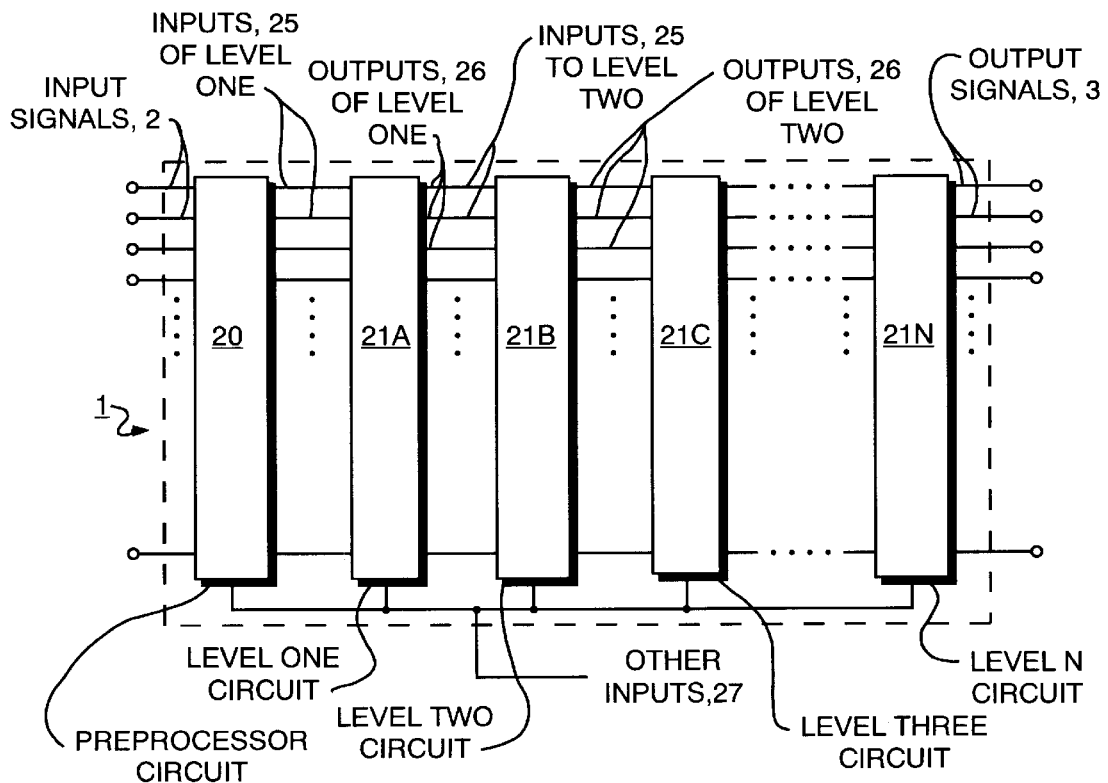
FIG. 2 is a diagrammatic representation of one form the self-organizing circuit of FIG. 1 can take, and shows a self-organizing circuit that includes a preprocessor circuit and a plurality of subcircuits or level circuits.

Typically, self-organizing circuit 1, as shown in FIG. 2, consists of several interacting elements. The system 101 may contain a controlled unit 14 (e.g., a mechanical mouse, whose functions are directed by signals 3 from the self-organizing circuit). (In order to simplify the explanation herein, the label 2 designates signal paths or the like interconnecting sensors 10 and self-organizing circuit 1, but hereinafter 2 is used also to designate the signal on those paths; and a similar approach is used as to other labels and either the signal path or the signal on that path.)

In the description that follows, self-organizing circuit 1 will be discussed. Generally, the circuit 1 has many parallel signals 2 as input; they are usually binary: electrical signals having either one or another of two states (e.g., a high voltage and a low voltage). The signals 2 are fed into circuit 1 which organizes the inputs to provide various signals 3, deemed by an external source 9 to be either desirable or undesirable. In some cases it is necessary for this outside source (e.g., a computer operating the circuit) to identify which output signals 3 are associated with appropriate input patterns 2.

In addition to signals 2 and 3, certain other signals to circuit 1 may be required. First, a timing signal 4 may be required to initiate various modes of operation of the circuit, for example, learning mode or recognizing mode. The timing signal 4 can be a simple binary signal or perhaps a series of such signals as are currently used on digital computers for sequencing events. Secondly, reward signals 5 and punish signals 6 are other examples of input signals initiated by external source 9 or an operator whose inputs pass through an appropriate device 9. A reward signal 5 tells circuit 1 that a pattern 11 which it recognized was a correct one; a punish signal 6 tells circuit 1 that a pattern 11 which it recognized was an incorrect one. Other modes of signals 5 and 6 serve to initiate other behaviors of operation of the circuit 1 such as association behavior or distinction behavior. Other signals which may be required are a learn signal 8 and a recognize signal 7. A more primitive form of circuit 1 can have a learn mode initiated by learn signal 8 (during which it learns only to recognize patterns) followed by a recognize mode initiated by recognize signal 7 when circuit 1 uses the organization provided by the learning mode to perform useful recognition tasks.

The external source 9 used to monitor circuit 1 can be of several types. It can be a mechanism that permits a human operator to direct circuit 1 as mentioned above, it can be a mechanism that permits the environment to direct circuit 1, or it can be another electronic circuit which recognizes the correctness of a response to a pattern 11 and rewards or punishes the circuit 1.

The input patterns 11 can be provided in several ways by external source 9 as suggested above. These patterns 11 can be patterns presented to circuit 1 by the human operator or the environment appropriately transformed into the proper binary mode electrical signals for use in circuit 1 by sensors 10. The sensors 10 can measure any of the common variables used in engineering disciplines. A partial list of the sensors include optical or light sensors, quantity sensors, radiation sensors, frequency variation sensors, auditory sensors, stress or strain sensors, position sensors, acceleration sensors, temperature sensors, heat flow sensors, time sensors, chemical composition sensors, proximity sensors, voltage sensors, current sensors, magnetic field sensors and force sensors. The electrical inputs at 2 can also be the output signals of another self-organizing circuit, as later discussed with reference to FIG. 2.

In addition to patterns 11 derived from the environment (or some other source of information) by the transforming sensors 10, the inputs may be triggered randomly by the circuit 1 itself as it explores ways in which to reward or punish. The self-organizing circuit 1 can adjust itself or accommodate to an environment with little prior knowledge of what the environment is. For example, if inputs 2 to circuit 1 represent each of four directions to which a mechanical mouse 14 controlled by circuit 1 can turn at each cell within a planar, Cartesian maze, the reward might be given for traversing a shorter path through the maze and a punishment given for traversing a longer path. Initially, the mouse 14 randomly picks directions and eventually finds its way through the maze. But as it tries more and more times it is rewarded for shorter routes and punished for longer routes; self-organizing circuit 1 tends to find the shortest path by eliminating long routes and encouraging short routes.

The input patterns 11, which can represent analog information, can be transformed into digital binary data by the Albus Method (BYTE Magazine, July 1979, p. 61, James Albus). In this method, several sensors 10 act over the range of some analog variable. The responses of the sensors 10 overlap various arbitrary values of the analog variable such that any particular analog value is represented by several simultaneous digital signals by some subset of the total number of digital sensors 10.

Information such as audio information, whose time varying characteristic periodicity is not appropriate for circuit 1 (e.g., is at too high a frequency), can be represented by overlapping filters (as sensors 10) whose outputs 2 indicate various frequency bands which the audio information contains. These sound spectrograms or voicegrams are standard representations of audio information; digital decomposition of the audio signal into constituent frequencies is a common technique for transmitting acoustic information digitally. Similarly static frequency patterns such as spectrographs, can be decomposed into a number of discrete frequencies and/or amplitudes for recognizing the patterns of compositions and the like. The focus of this invention is not how the various input sensors 10 derive binary information but, rather, how electrical signals 2 self-organize to form recognition signals 3.

Just as input signals 2 are derived from input sensors 10, output signals 3 can interact with external source 9 (or some controlled unit 14) in various ways. If external source 9 is the environment, it might include such output devices as motors which operate manipulator hands (which could be considered to be controlled unit 14), valves in hydraulic circuits or innumerable other ways in which electrical signals 3 alter the environment through mechanical, electrical, thermal, hydraulic or chemical amplification of electrical output signals 3. The output can also be simply information as used by another electrical circuit or computer. This invention does not primarily concern itself with what output signals 3 are used for, except perhaps as they directly or indirectly affect the other signals operating on circuit 1, as previously described.

The principal aspect of the present invention is how the self-organizing circuit 1 is able to organize itself in various ways. To elucidate the different aspects of this invention, circuit 1 of FIG. 1 is subdivided into subcircuits called levels, as shown in FIG. 2. The signals (typically binary in form) from sensors 10 of FIG. 1 feed first into a preprocessor circuit 20 whose outputs 26 are inputs 25 to a level one circuit 21A. Each level circuit 21A . . . 21N has outputs 26 which act as inputs 25 to the next higher level. The level one circuit 21A feeds its outputs 26 to the level two circuit 21B via connections 26; the level 21B inputs 25 are the same as the level 21A outputs 26. Level 21B outputs 26 become level 21C inputs 25 and so forth until the last level N circuit 21N is reached. The outputs 26 of the level N circuit 21N are the output signals 3 of the circuit 1.

This hierarchical form is not the most general; it is presented only to simplify the explanations which follow. As in neural connections, there can be feedback signals which connect from a higher level to a lower level, e.g., the higher level circuit 21B might connect to the lower level circuit 21A, via interconnections 26, but with a signal flow from the level two circuit 21B to level one circuit 21A rather than from the level one circuit 21A to the level two circuit 21B as previously suggested. Moreover, the different levels can "pass through" a signal from a lower level to a higher level; thus output signals of one level can be available as input not only to the next higher level, but to levels even farther up the hierarchical chain. For example, the preprocessor circuit 20 can have its outputs go into the level one circuit 21A, which may then be sent on to the level two circuit 21B such that both the level one circuit 21A and the level two circuit 21B have the outputs of the preprocessor circuit 20 available for acting upon.

Lastly, the FIG. 2 illustration is not meant to imply that the same number of inputs 25 would interconnect all the subcircuits shown. In general, there may be more or less interconnections 26 between two particular levels than between two other levels. Also shown in FIG. 2 are other inputs 27 which are fed to all circuits. These other inputs 27 are meant to include signals such as the timing signal 4, the reward signal 5, the punish signal 6, the learn signal 8 and the recognize signal 7 in FIG. 1.

In FIG. 2, the preprocessor circuit 20 has been distinguished from the level circuits 21A through 21N because the circuit 20 has no self-organizing capability. The preprocessor 20 acts in a programmed manner on the input signals 2 to convert them into the input signals 25 which will facilitate the self-organizing capability of the self-organizing level circuits 21A through 21N. While the preprocessor circuit uses Boolean operators such as AND and OR gates, the circuit 20 does not learn (its connection strengths do not change) as in self-organizing circuits 21A through 21N. The form the preprocessor circuit 20 takes depends to a great extent on the patterns which the circuit 1 is attempting to recognize, whether static or time-varying, and also upon the types of sensors 10 used to generate the signals 2 fed into the circuit 20.

The important facet of the self-organizing circuit 1 is not the preprocessor circuit 20, but, rather, the level circuits 21A through 21N. The preprocessor circuit 20 is discussed in U.S. Pat. Nos. 4,479,241, 4,774,677 and 4,989,256 with regard to specific tasks which the circuit 1 might perform. Examples used are a static pattern recognition task (recognizing letters of the alphabet) and a time-varying pattern recognition task (recognizing speech). Each type of pattern recognition task requires a specialized preprocessor circuit 20 which is especially designed for the specific task.

COMPONENTS OF LEVEL CIRCUITS

In the invention specification which follows, electrical means are used in the preferred embodiment. However, equivalent non-electrical means can also be used to implement the circuits which can self-organize. Non-electrical means include pneumatic, chemical, optical or other means which obey the rules set forth for self-organizing.

Figure 3:
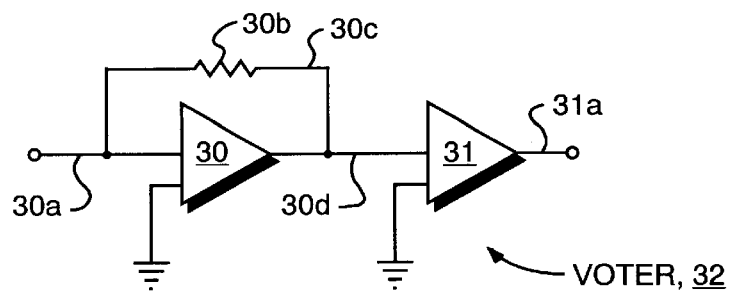
FIG. 3 is a schematic representation of a multiple-input summing junction.

Self-learning circuits of the present invention "vote" and have "path reinforcement." In an analog circuit, voting can be implemented by the multiple-input voting subcircuit or "voter" shown at 32 in FIG. 3. The voltage output signal at connection 30d is proportional to the sum of the currents— i.e., the total current—input at connection 30a. A high-gain amplifier 30 assures that the current at 30a multiplied by the resistance of a resistor 30b, connected via feedback path 30c, equals the voltage at the connection 30d. A subsequent high gain amplifier 31 outputs a binary voltage signal at connection 31a, depending on whether the voltage at 30d is positive or negative. The binary signal at the connection 31a has one of two states, thus specifying whether the voter 32 has fired: if the summation of currents into the connection 30a is positive, the voter 32 fires (i.e., attains one state at the connection 31a); if negative, it does not fire (i.e., stays at the other state at the connection 31a). Henceforth, the term "active" state will be synonymous with a binary one meaning that a particular binary device has fired; an "inactive" state will be synonymous with a binary zero, meaning that the device has not fired.

Transmission Gates

One method of path reinforcement uses digital-to-analog converters (DACs); it is presented here to illustrate one example of how to implement the present invention. A DAC takes a multiwire digital input signal and converts it to an electric current—the electric current being proportional to the binary weighted value of the input signal. One simple DAC can be made of C-MOS (complementary-MOS) inverters and transmission gates, as shown in FIG. 4A, FIG. 4B, FIG. 5A and FIG. 5B.

Figure 4A:
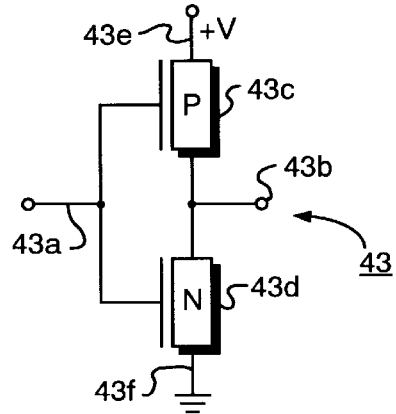
FIG. 4A is a diagrammatic representation of an inverter whose shorthand symbol is shown in FIG. 4B.
Figure 4B:
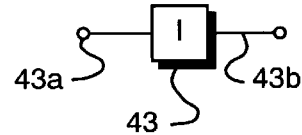

An inverter 43 is shown in FIG. 4A; its shorthand symbol is shown in FIG. 4B. Connection 43a is the input connection to the inverter 43 through which a voltage signal is fed. A positive voltage signal at the connection 43a turns the P-channel MOS element 43c OFF while simultaneously triggering ON an N-channel MOS element 43d, which causes the voltage at the output connection 43b to drop to the ground state voltage (0) which is provided at connection 43f. In a similar manner, a negative voltage at the connection 43a causes the output voltage at 43b to rise to the positive supply voltage (+V) provided at connection 43e.

Figure 5A:
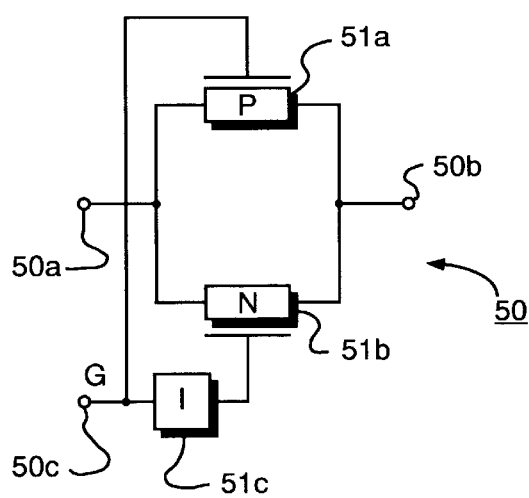
FIG. 5A is a diagrammatic representation of a transmission gate whose shorthand symbol is shown in FIG. 5B.
Figure 5B:
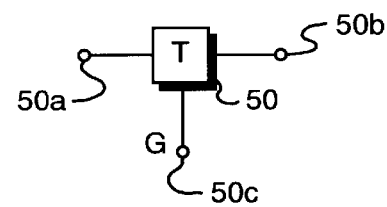
FIG. 5C is a diagrammatic representation of an analog delay circuit and FIG. 5D is a diagrammatic representation of a digital delay circuit, a shorthand symbol for both being shown in FIG. 5E.

A transmission gate 50 is shown in FIG. 5A; FIG. 5B shows its shorthand symbol. An input current signal at connection 50a in FIG. 5A is transmitted through either a P-channel MOS element 51a or an N-channel MOS element 51b if the gate signal labeled G at connection 50c is in one binary state; but no current is transmitted if the gate signal G is in its other state. An inverter 51c insures that 51a and 51b are either both ON (so current can flow in either direction between connections 50a and 50b) or both OFF.

Delays

Figure 5D:
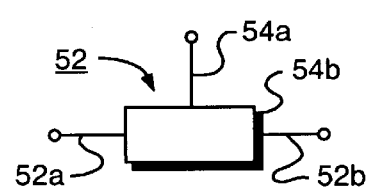
Figure 5C:
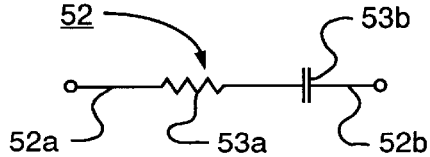
Figure 5E:
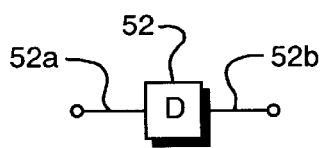

Shown in FIG. 5E is a generalized delay 52 with inputs 52a and 52b. The delay is a common electronic component which can, in many implementations of a self-organizing circuit, improve the ability of the complete circuit 101 to organize itself especially for sequential information.

FIG. 5C shows the analog implementation of the generalized delay 52; FIG. 5D shows its digital implementation. In an analog circuit 101, the delay 52 is simply a resistor 53a in series with a capacitor 53b; when fed a step input of current at connection 52a, the current at output connection 52b slowly builds to the input current 52a, effectively delaying the output 52b with respect to the input 52a. In a digital circuit 101 the shift register 54b is used instead of the analog delay. It is connected between digital input 52a and the digital output 52b; the input value is shifted toward the output connection 52b for each signal on clock input 54a.

Weights

Figure 6A:
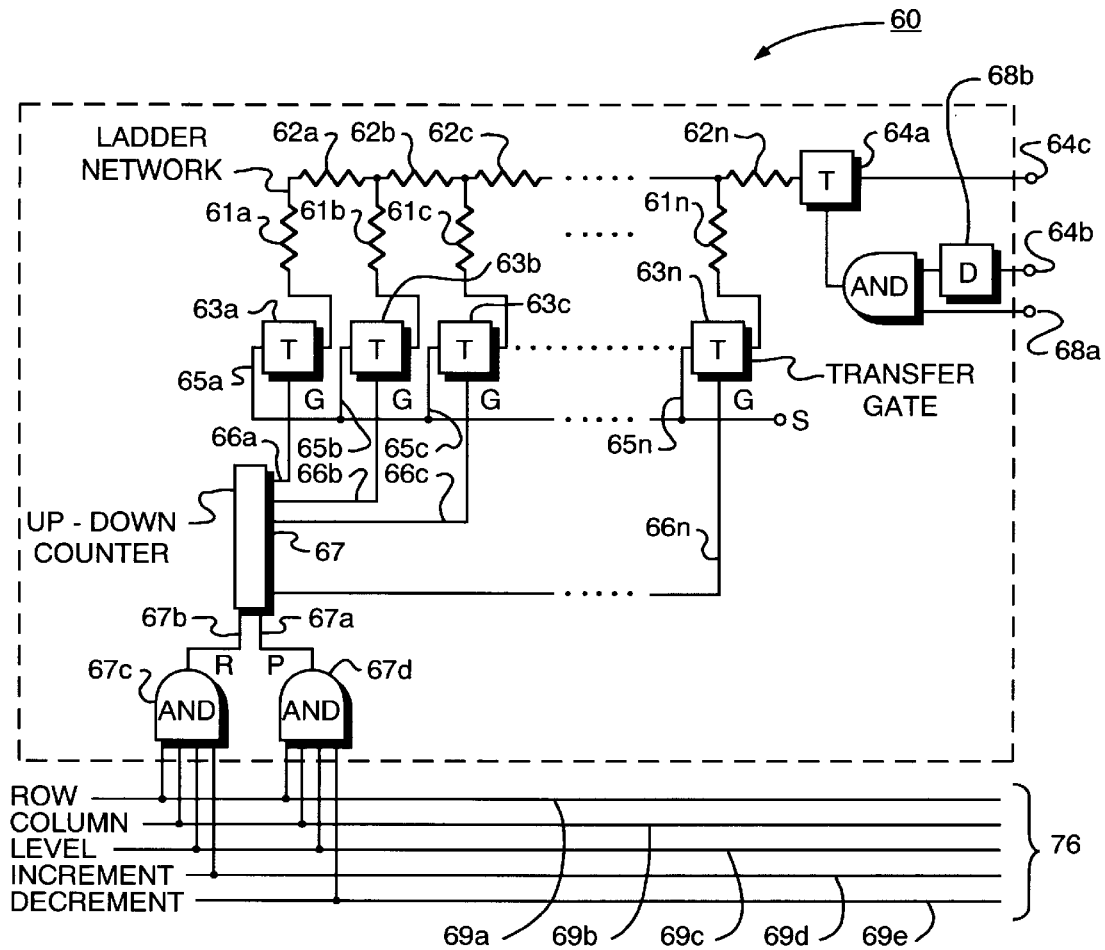
FIG. 6A is a diagrammatic representation of a digital-to-analog converter (DAC) whose shorthand symbol is shown in FIG. 6B.
Figure 6B:
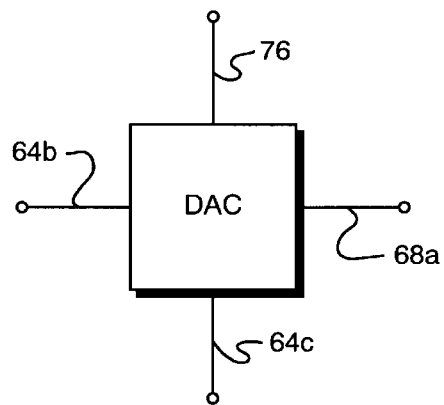

The digital-to-analog converter (DAC) marked 60 in FIG. 6A is composed of a ladder network of resistors 61a . . . 62n; FIG. 6B shows a shorthand symbol for the DAC 60. Note that other DACs than the "binary-weighted" DACs discussed here are possible. For example, a sequentially-loading DAC based on charge coupled devices or bubble memories may be used in other designs of self-organizing circuits. Resistors 61a . . . 61n are sized properly with resistors 62a . . . 62n such that when a set of transmission gates 63a . . . 63n is enabled by the binary number in an up-down counter 67, the current output fed to the transmission gate 64a is proportional to the value of a binary number stored in the counter 67 and applied to the transmission gates via connectors 66a . . . 66n. One of the signal inputs of each transmission gate 63a . . . 63n is connected to a supply voltage labeled S which can be either positive or negative; a positive supply S will produce a current flow into the transmission gate 64a, a negative supply S will drain current from the transmission gate 64a. A gate signal 64b (labeled G1 in FIG. 7A) is delayed by the delay 68b. After the delay, current flows through the transmission gate 64a to the output connection shown at 64c whenever the clock pulse 68a is simultaneously firing.

Figure 7A:
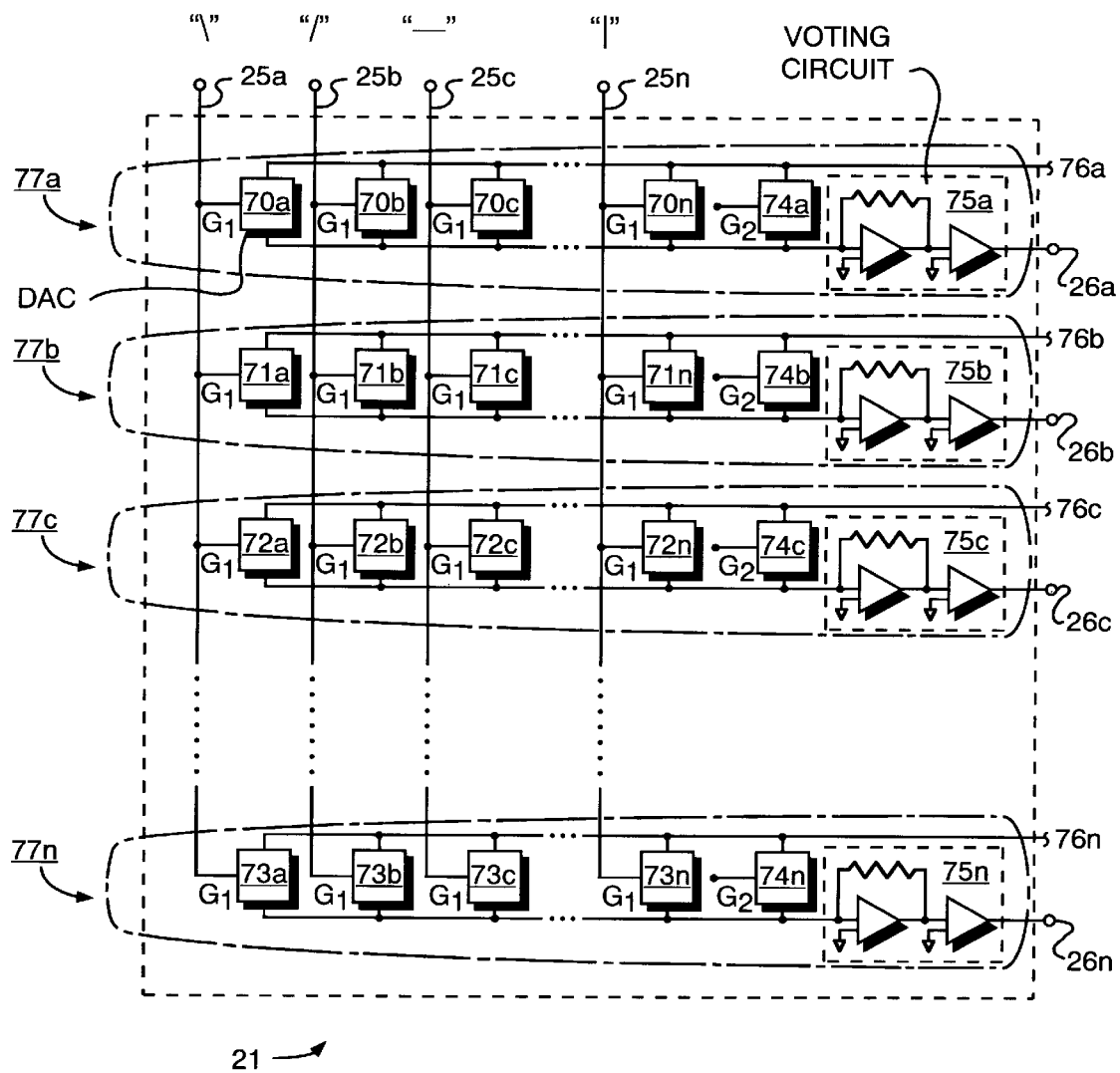
FIG. 7A is a diagrammatic representation of one form the subcircuits or level circuits of FIG. 1 can take.

The DAC 60 works as follows. For simplicity assume that the delay 68b is zero. Each connection 66a . . . 66n represents a bit of the binary number stored in the up-down counter 67. Hence, if the binary number in the counter 67 is zero, no signals will be present at connections 66a . . . 66n and none of the transmission gates 63a . . . 63n will allow current to flow to or from the supply connections shown at 65a . . . 65n; in this circumstance, the output current at 64c will be zero when the gate G1 in FIG. 7A is enabled simultaneously with the clock signal 68a. If the binary number in the inverter 67 is "all ones", all the transmission gates 63a . . . 63n will allow current to flow. The current flow into or out of the connection 64c will be its maximum when the gate G1 is enabled simultaneously with the clock signal 68a. This maximum current is called $W_{MAX}$ in the equations which follow. Any binary number between zero and "all ones" will cause a current flow at the connection 64c proportional to the value of the binary number in the counter 67, current being drawn into the DAC 60 for a negative supply and current flow being out of the DAC 60 for a positive supply.

The up-down counter 67 is a particular type of binary register which counts up (i.e., the binary value of signals 66a . . . 66n is incremented by one) each time it receives a reward signal 67b (at terminal R in FIGS. 6A and 6B) and counts down (i.e., the binary number is decremented by one) each time it receives a punish signal 67a (at terminal P in FIGS. 6A and 6B). A reward signal 67b adds the binary number one to a binary number stored in the counter 67; a punish signal 67a subtracts one bit from the counter's binary number. The binary number is stored in the counter 67; it remains the same whether or not signals are transmitted via connections 66a . . . 66n or not. Only the punish or reward signals, 67a and 67b, respectively can change the values of the counter 67.

In this particular configuration, the punish and reward signals 67a and 67b are activated by a punish/reward bus 76. The bus 76 is composed of five signal lines: a row signal 69a, a column signal 69b, a level signal 69c, an increment signal 69d and a decrement signal 69e. The first three signals 69a, 69b, and 69c identify the particular DAC 60 in the self-organizing circuit 101. These three are combined in an AND gate 67c with the increment signal 69d to form the reward signal R; they are combined in an AND gate 67d with the decrement signal 69e to form the punish signal P.

In operation, the DAC 60 accomplishes "path reinforcement." In FIG. 6B, a current flows into or out of the connection 64c, according to how much it has been rewarded or punished. The current flows when the delayed input signal 64b occurs simultaneously with the clock signal 68a. A highly rewarded and little punished DAC 60 will have a large current flow; a highly punished and little rewarded DAC 60 will have little current flow. While these circuits have been shown in a C-MOS implementation, it should be noted that similar circuits can be designed in many other types of electronic implementation. In addition, the effect of inhibiting or reinforcing a signal is shown here simply by the choice of supply voltage for the DAC 60; a more complicated circuit may well have the sign of the DAC 60 supply voltage determined by the binary number stored in the counter 67. Hence, in this latter variation, a much-punished DAC 60 would drain current from the connection 64c while a much rewarded DAC 60 would add current to the connection 64c.

Level Circuit Operation

Shown in FIG. 7A is a simple configuration whereby a plurality of DACs 70a . . . 74n (like the DAC 60) and a plurality of voters 75a . . . 75n (like the voting circuit 32) are combined to give a level circuit 21. The circuit 21 on FIG, 7A is meant to imply any of the self-organizing level circuits of FIG. 2 (e.g., circuits 21A . . . 21N). Inputs to the circuit 21 are denoted as connections 25a . . . 25n; each input signal 25a . . . 25n is connected to every column of DACs. For example, the connection 25a routes an input signal to the first DAC in every row (i.e., DACs 70a, 71a . . . 73a); the connection 25b routes its signal to the second DAC in each row (i.e., DACs 70b, 71b . . . 73b). The input signals 25a . . . 25n are connected to the G1 gate inputs (i.e., the input 64b in FIGS. 6A and 6B) of each respective DAC as discussed with reference to FIG. 6B.

Thresholds

Besides the "path-related" DACs 70a through 73n, the circuit 21 also has "threshold" DACs 74a . . . 74n. A threshold DAC 74a . . . 74n is one which modifies current to its respective voter 75a . . . 75n without regard to inputs 25. By contrast, the "path-related" DACs 70a . . . 73n modify the current going to the respective voters 75a . . . 75n based on their inputs 25. The purpose of the threshold DACs 74a . . . 74n is to insure that input signals to the voter 75a . . . 75n are offset properly as more and more learning experiences occur; this will be discussed in more detail later.

The outputs of all the DACs 70a . . . 74n either add or drain current from their respective voters 75a . . . 75n. If this net current flow to the voter 75 is positive, a binary one signal will occur at the respective output gate 26; if it is negative, a binary zero output signal will occur at the connection 26. The output signal 26 either a binary one or a binary zero, occurs simultaneously with the clock signal 68a.

Uncertainty

In some embodiments of the voting circuits 75a . . . 75n, a zero-mean noise current is added to the current flowing to the voter 75. The noise is zero-mean: it has equal likelihood of being positive (adding current to the voter 75) or negative (draining current from the voter 75). The noise has a band width higher than the clock frequency.

The effect of the noise is to produce an uncertain outcome of the voter circuit 75. If the net current to the voter 75 (excluding the noise) was very negative, the voter 75 would not likely produce an output signal 26 unless the noise current, at the moment of the clock signal 68*a*, was greater than the net current. Similarly, if the net current was very positive, the noise current would not likely prevent the output 26 from occurring. However when the net current to the voter 75 is near zero, the noise current has its greatest effect by preventing an output 26 which might otherwise have been an output, or by producing an output 26 which might otherwise not have had an output signal.

When the noise current to voter 75 is low (its standard deviation is small compared to the maximum current $W_{WAX}$ produced by a DAC 60), it has little effect: the output 26 closely corresponds to the net current to the voter 75. However when the noise current is high, the voter 75 outcome is uncertain. Circuits 75 which should not have fired occasionally do; those which ought to have fired occasionally do not. Neurons in the cortex have the same tendency to be very noisy: their outcomes are not completely determined by the net currents flowing into them.

Clocking and Delays

In the preferred embodiment of level circuits 21A ... 21N (as well as the preprocessor circuit 20) the outputs 26*a* ... 26*n* are clocked. That is, the transfer of signals from these circuits occurs at fixed time increments T. Since all DACs 70*a* ... 74*n* are connected to a clock signal 68*a* (FIGS. 6A and 6B), current is only injected into the voters 75*a* ... 75*n* at fixed intervals. If the time from the beginning of one clock cycle to the beginning of the next is its period T, then the DACs 70*a* ... 74*n* only provide current at multiples of T.

The duration of the clock signal is necessarily less than its period T (since most digital components require an edge to trigger on). The clock signal, then, is active for only a portion of its period T. The effect on the DACs 70*a* ... 74*n* is a pulse of current every clock period. Since the clock signal duration is typically half or less of its period, the voters 75*a* ... 75*n* must react quickly to the current pulse from the DACs, to reliably convey the information from the inputs 25*a* ... 25*n*. Hence the inherent time constant of the voters 75*a* ... 75*n* is small compared to the clock period T or to the duration of the clock pulse 68*a*.

On the other hand, the duration of delay 68*b* (FIG. 6A) associated with each DAC 70*a* ... 74*n* is often greater than T. While there can be as little as no delay, the delay 68*b* may also be as great as many clock time periods. In digital implementations of the circuit 101, shift register 54*b* (FIG. 5D) is also clocked at the same time period T via clock signal 54*a*. Hence, time delays of DACs 70*a* ... 74*n* will have only integer values of T from zero to some multiple of T. However, in strictly analog embodiments of the circuit 101 precise clocking of the delays 68*b* and the DACs 70*a* ... 74*n* is not required.

In at least one preferred embodiment of the present invention, each input 25 is associated with a delay 68*b* (also shown as 52 in FIGS. 5A, B, C, D, and E), hence messages from some other sub-circuit or level are delayed in time before each sub-circuit or level weights relative amounts of negative and positive inputs thereto and votes whether or not to pass along information to further subcircuits or levels. The delay 68*b* can be as simple as a first-order lag circuit common in many analog control circuits. Note that the delays 68*b* of the threshold DACs 74 ... 74*n* can also act to give the voters 75*a* ... 75*n* a delayed action. By draining the voters faster than they can fill with current, the voter action can be delayed in some self-organizing circuits.

Node Circuits

The combination of a row of DACs 70*a* ... 70*n*, threshold DAC 74*a* and the voter 75*a* is called a "node circuit" 77*a* or simply "node" 77*a* (FIG. 7A). There are many such node circuits 77*a* ... 77*n* in each level circuit 21 according to the present teachings; each mimics the operation of a neuron. The row of DACs 70*a* ... 70*n* mimic the dendrites which interconnect a neuron in a living organism to other neurons: they weight the effect of inputs from other neurons. By this analogy, the binary numbers stored in DACs 70*a* ... 74*n* are called "DAC 60 weights" or simply "weights". The voter 75*a* in combination with threshold DAC 74*a* mimics the neuron's cell body and how it fires in response to weighted inputs from other neurons. Each row of the level circuit 21, then, represents a node circuit like circuit 77*a*. Each level circuit 21A ... 21N represents a column of these node circuits 77*a* ... 77*n*. All the level circuits 21A ... 21N represent an array of node circuits.

Note that in an actual level circuit 21, connecting each column input such as input 25*a*, to each node circuit 77*a* ... 77*n* is very inefficient from a wiring viewpoint. A more efficient circuit has only "local" connections: each node circuit 77*a* ... 77*n* need only be connected to a few of the input signals 25*a* ... 25*n* (henceforth simply called the "inputs 25" but referring to any of the input signals 25*a* ... 25*n* to a particular level circuit 21A ... 21N). So long as each node circuit, such as circuit 77*a*, has several different inputs 25, the circuit 101 will self-organize efficiently without requiring the massive interconnection requirement that all inputs 25 be connected to each node circuit. In other words, the input signals 25 include only some of all the possible input signals available from either a lower level circuit or fed back from a higher level circuit. FIG. 7A shows the interconnections to all inputs 25 only for completeness.

Competition and Branch Functions

To understand how the circuit 101 operates, let it be assumed that two modes can occur: learning and recognition. In the learning mode, the circuit first learns to respond to various patterns of inputs 2 to give proper outputs 3. Later, in a recognition mode of operation, the learned responses are used to identify the input signals 2: active output signals 3 indicate a recognized pattern of input signals 2.

In the learning mode, the circuit 101 operates in the following manner for a single level 21. The discussion here is simplified to only consider a single level 21 in order to clarify the system's operation. However, in general, each pattern 11 to be recognized uses many levels 21A ... 21N with interconnections between higher levels and lower levels via feedback paths, connections from lower levels directly to several higher levels and connections within a single level.

Let it be assumed, for example, that the external source 9 in FIG. 1 is a computer which is capable of applying input patterns 11 to the sensors 10, and capable of interpreting the output signals 3 of the entire self-organizing circuit 1. It is also capable of storing within its own memory both the present state of each of the inputs 25*a* ... 25*n* and each of the outputs 26*a* ... 26*n* of each of the level circuits 21A ... 21N (henceforth simply called the "inputs 25" and the "outputs 26" but referring to any of the input signals 25*a* ... 25*n* or the output signals 26*a* ... 26*n* to a particular level circuit 21A ... 21N) as well as the previous states of these inputs 25 and outputs 26. Note that the output 26 of a node circuit 77 is not necessarily the same as the input 25 of another node circuit to which it connects. The two can differ when time delays (similar to the delay 68b (FIG. 6A)) and described later are included in the circuitry. Further, the computer 9 is capable of sending signals to the punish/reward bus 76a . . . 76n in FIG. 7A of each level circuit 21A . . . 21N by sending row, column, level and increment or decrement signals 69a . . . 69e as discussed earlier. A general purpose computer made by a variety of manufacturers connected with signal lines to the circuit 101 fills the above roles.

During the learning mode, the computer 9 applies different learning experiences or lessons to the input sensors 10, identifies the outputs 26 of the level circuits 21A . . . 21N and alters the DAC weights 70a . . . 74n (the binary numbers stored in each DAC 70a . . . 74n in FIG. 7A) by sending signals to the punish/reward buses 76a . . . 76n of level circuits 21A . . . 21N.

Branch Functions

In general, the computer 9 "teaches" a level circuit 21A . . . 21N in the following manner. A desired pattern 11 to be learned is applied to the input sensors 10 in FIG. 1 and the outputs 26 are monitored by the computer 9. Reward or punishment of a particular DAC weight 70a . . . 74n is based primarily on "local" rules. These rules have two major aspects: branch functions and competition.

Branch functions are functions which depend upon the node and its "branches". Branches are other nodes 77 which connect as inputs 25 to a node 77, each input 25 being weighted by DAC 60 weights. As already discussed, a node's branches may come from any level 21, but in preferred embodiments are located close by. Nodes are given the subscript i, while its branches are given the subscript j. Hence, the j inputs to node i are the outputs 26 of the branch nodes j; the j inputs 25 may also include the system input signals 2 or outputs of preprocessor circuit 20 (FIG. 2).

Branch functions are various spatial and temporal functions associated with a branch node 77 that depend on its firing and the firing of other nodes in its vicinity. The branches j of a node i compete with each other to determine weight modifications of the node i; the competition is based on the branch function. The branch winners have their respective DAC 60 weight increased accumulatively: as time goes on, the weights get larger if that branch continues to win the branch function competition.

Learning usually encompasses many lessons, each having many clock cycles T. A "lesson" is the presentation of a single input pattern 11 to circuit 1, FIG. 1 (or input 2 pattern to circuit 101, FIG. 2). The DAC 60 weights can accumulate several ways. One way is for the branch function to accumulate over an entire lesson and to modify the DAC 60 weight at lesson's end. A second way is for the branch function to compete after each clock cycle and to increment the weight after each clock cycle. The most general case is where the branch function accumulates over a period P of several clock cycles, and the weights winning the resulting competition are incremented.

The choice is based on circuit simplicity or computation time. Competing for the branch function each clock cycle (the accumulation period P equals T) requires more complex circuitry and more computation time (in digital embodiments) than accumulating the branch function over a longer period P with simpler analog circuitry. On the other hand, shorter accumulation periods handle time-varying input patterns 11 better than longer ones. Regardless of the accumulation period, the branch function, or its effect, accumulates in the winning weights.

The inputs 25 and the outputs 26 of a node circuit 77 have a binary signal. They are either active (when their respective voter 75 (FIG. 3) fires during the clock pulse) or they are inactive (when their respective voter 75 doesn't fire during that clock pulse). In analog implementations of the circuit 1 (FIG. 1), the voter 75 signal is not binary since the voltage output 26 passes through an analog delay. In such cases the analog voltage is converted to a digital one by use of a threshold—if the analog voltage is greater than a certain threshold the signal is considered active, below the threshold value the signal is considered inactive. Alternatively, the analog delay may be incorporated prior to the voter 75 rather than after to provide a binary output signal 26.

To illustrate how branch functions are used to make weight modifications, a very simple branch function will be used. This particular branch function is based on two-input Boolean operators or gate functions. Sixteen Boolean operators exist which have two inputs; these include the common AND, OR, NAND, NOR, NOT, XOR and IF functions as well as the less common IMP (implication), EQV (equivalence), TAUT (tautology) and CON (contradiction). The two inputs of this branch function are the binary output state 26i of a particular circuit 77i and input 25j from another circuit; they relate the binary output of node i to the binary output of its branches j.

While branch functions may have both temporal and spatial aspects, for simplicity this branch function has only a temporal aspect: the Boolean operator can act on the present or past values of the node i and its branches j. The branch function is generally of the form below. The branch variable B accumulates over the period P prior to competition for weight modification.

$$B_j|_{t+P} = SUMT[g((f_1(X,Y)),(f_2(X,YT))]|_t \qquad (1)$$

where:

X is the binary output 26 of circuit 77 at time t

Y is the binary output 26 from branch j of circuit 77 at time t

YT is the binary output 26 from branch j but at a time previous to t $f_1$, $f_2$ are functions of the two-input Boolean operators g is a functional relationship SUMT is a time summation operating over period P $B_j$ is the value of the branch function calculated for branch j of circuit 77i Competition and Cooperation In addition to branch functions, punish/reward decisions made by the computer 9 are based on a "competition function." The competition function can be of two forms: competitive or cooperative. First, consider the competitive form of the competition function. A particular node circuit 77 has as inputs 25 the outputs 26 of other circuits 77 to which it is connected. In a purely competitive function, the inputs 25 compete with each other based on their B values: the input 25 with the largest value has its DAC weight increased. Other inputs 25 have their weights reduced or unaltered.

Mathematically, a purely competitive competition function is simply a maximizing function (MAX). After the branch functions B for all the inputs 25 to a circuit 77 have been accumulated over period P, the maximum function determines the largest value and rewards the DAC weight 70 associated with that input 25. Reward is accomplished by increasing the value of the binary number stored in the counter 67 of its associated DAC 60. In some embodiments of the self-organizing circuit 1, the maximum function rewards the input 25 with the largest absolute value of B after each period P.

The purely cooperative form of the competition function is opposite to the competitive form. Instead of rewarding only those DAC 60 with the largest B values, all of the DAC 60 weights are rewarded. Between a "purely competitive" function (only the highest value is rewarded) to a "purely cooperative" one (all of the values are rewarded), lie competition functions which vary in the amount of competitiveness and cooperativeness. Competition functions which are "mostly competitive" reward the weights with a few of the highest B values; "mostly cooperative" functions reward many but not all of the weights with highest B values.

In addition to rewarding few or many of the largest branch values, the competition function can also involve the punishment of inputs 25 with low B values. Punishment involves decreasing the binary number in counter 67 of the DACs 70 by activating the punish/reward buses 76. For embodiments with positive/negative DACs 70a . . . 73n discussed later punishment is based on low absolute B values rather than simply low B values.

Cooperation is the other form of the competition function. When the circuit 1 learns "associative" information, cooperation improves the speed at which the circuit 1 learns and the accuracy with which it will respond to learned patterns 11. Associative information is that which is associated with the input pattern 11. For example, there are many variations of letter "A"s which can represent the capital letter "A". Of course, a well written "A" has three components left slant 25a, right slant 25b and horizontal 25c. However, poorly written "A"s might have a vertical 25n combined with left slant 25a and a horizontal 25c, perhaps a vertical 25n combined with a right slant 25b and a horizontal 25c, or perhaps two left slants 25a and a horizontal 25c. All of these are associated with the letter "A" and all should cause the output 26a to fire if they were presented as pattern 11.

Cooperation rewards many of the inputs 25 which participated in the correct output 26a of a letter "A", not just the largest ones. "Participated" as used here means that input 25 changed when the output 26a also changed (discussed in more detail in Change Sensitive Functions). Changed circuits 77 which led to a correct result—the output signal 3 correctly identified the input pattern 11—should cooperate in causing the same outcome again in the future. A cooperative competition function is where many of the changed inputs 25 are altered, not simply the few with the highest B values.

Competitive functions differs from cooperative ones in that competitive competition functions are usually used for distinctions rather than for associations, as in distinguishing the letter "A" from the letter "V". Competitive functions tend to reward only the few changed inputs 25 to a circuit 77 that eventually distinguishes one output 3 from another. By contrast, cooperative functions tend to reward many changed inputs 25 that associate different variations of the same output 3. The self-organizing circuit 1 learns and recognizes patterns 11 better depending on the task being performed: distinction or association. For association tasks, the change in a weight's DAC 60 is usually spread among more of the changed inputs 25 than for distinction tasks.

Threshold Learning

The threshold DACs 74a . . . 74n are used to bias the voltage level of the voters 75a . . . 75n (FIG. 7A). Usually, the threshold DACs 74a . . . 74n are "sink" DACs which draw current from the input 30a (FIG. 3) of the voters 75a . . . 75n. For example, in the case where the DACs 70a . . . 73n have only positive binary numbers stored in their respective up-down counters 67 and the supply S is positive, only positive currents will output from the DACs 70a . . . 73n at the respective connections 64c (FIG. 6A). These positive currents fed to the voter input connections 30a in FIG. 3, must be biased by a negative current; otherwise the outputs of every DAC 70a . . . 73n with any binary number in the counters 67 causes the outputs 26a . . . 26n to fire.

The bias of threshold DACs 74a . . . 74n are punished and rewarded just as the DACs 70a . . . 73n; by the computer 9 furnishing punish or reward signals on the connections 76a . . . 76n. The gates 67c and 67d in FIG. 6A are signaled by the computer 9 in an appropriate manner to allow the value of the binary number in the counters 67 of the threshold DACs 74a . . . 74n in FIG. 7A to approximately negate the effects of the sum of positive binary numbers in DACs 70a . . . 73n when the correct response to an input pattern 11 to the sensors 10 is obtained at the output connection 26a . . . 26n.

Positive Negative Weights

Positive/negative (called simply pos/neg) DACs 70a . . . 74n can be used in place of the positive current DACs 60 discussed above as the "weighting" mechanisms for the input signals 25a . . . 25n. Pos/neg DACs 70a . . . 73n are devices which can output either positive or negative current. One way to implement pos/neg DACs is to modify slightly the circuit shown in FIG. 6A. First, the ladder network of resistors 61 and 62 is changed to have an additional resistor 61a (equal in size to the resistor 61a of the highest order bit) connected directly to a negative supply S. Second, the DAC 60 initially has its up-down counter set with a binary value just equal to half its maximum value (i.e., the highest order bit fires).

The effect is that initially the negative current drained from the transfer gate 64a just equals the positive current added by the up-down counter 67. Once set, any increase of the binary number stored in counter 67 adds current to the voter 75 proportional to the increase (rewarding); any decrease of the number drains current from the voter 75 proportional to the decrease (punishing).

Thus the entire range from current addition to current removal is possible by altering the numbers stored in the pos/neg DACs. A positive current from a particular DAC will tend to fire the associated voter 75; a negative current will tend to inhibit the associated voter 75 from firing. In the discussion which follows, values of the binary number greater than half the maximum are "positive weights"; values less than half are "negative weights". In general, both the path-related DACs 70a . . . 73n as well as the threshold DACs 74a . . . 74n are pos/neg DACs (see Bias).

Punishment and reward are handled, as before, by the computer 9 which activates the punish or reward buses 76a . . . 76n, depending on the competition function of the branch function of its input signals 25a . . . 25n. Note that DACs are rewarded by increasing the value of the number in their counter 67; punishment is accomplished by reducing the number in their counter 67 thus allowing less current (either positive or negative) to flow. Pos/neg DACs used as DACs 70a . . . 73n probably mimic the response of brain neurons more closely than do positive DACs such as the DAC 60 in FIGS. 6A and 6B combined with threshold DACs 74a . . . 74n. Both methods are valid methods of producing self-organizing circuits 101. However in the discussion which follows, primarily pos/neg DACs will be used to discuss implementations of various designs of self-organizing circuits.

WEIGHTING METHODS

The external source 9 (FIG. 1) is an external device used to teach the self-organizing circuits 101; it is not used for the circuit's operation. Moreover, in a more advanced self-organizing circuit 101, the teaching function is implemented in internal hardware: the branch functions discussed above are made in silicon logic associated with each subcircuit 77a . . . 77n.

Internal Weighting

Figure 8A:
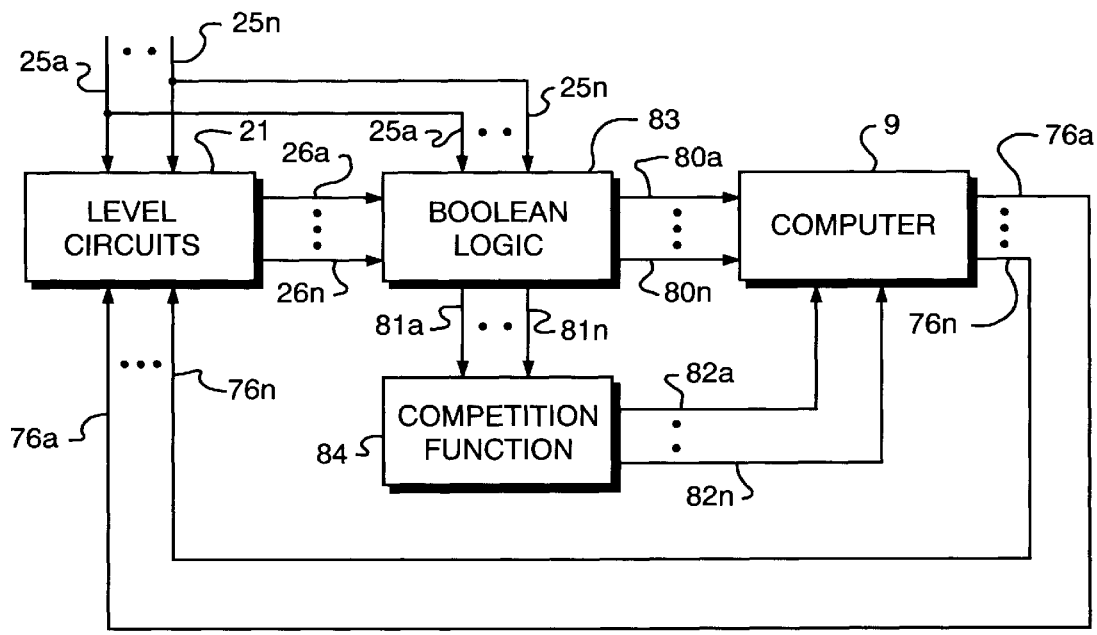
FIG. 8A is a diagrammatic representation of the self-organizing circuit with the branch function and competition function implemented in hardware.

To understand the various weighting methods between internal or "local" weighting (local implementation of weighting the circuit's DACs 60) and external weighting (where an external source 9 effects the DACs weighting), consider FIG. 8A. The level circuits 21 function, as before, to receive input information in the form of an input signal. The level circuits 21 are operable to effect analysis of the pattern of constituent elements in the input signal to extract the input information from the input signal and provide an output signal related to the input information. The circuits 21, as noted above, are self-organizing circuits or levels 21A . . . 21N in FIG. 2 interconnected to receive the outputs 26 of other sub-circuits 77 or levels 21 and to provide other outputs, all of which are connected as inputs to the computer 9 and, usually, fed back from the computer 9, usually after processing by the computer, to other sub-circuits or levels.

Typically, then, a sub-circuit or level of the circuits 21 (e.g., sub-circuit 21A in FIG. 2) receives input signals 25a . . . 25n and processes those input signals 25a . . . 25n to provide an output signal 26a . . . 26n to the other circuits 77 of levels 21A . . . 21N. Within each circuit 77 of level 21A . . . 21N there is weighting whereby each circuit 77 votes whether or not to pass along information to the other circuits 77. The computer 9 serves to apply modifying inputs to each circuit 77, which modifying inputs serve to correct errors in the output signal 26a . . . 26n occasioned by accurate or inaccurate analysis of the input signal 25a . . . 25n or the input pattern 11 by the self-organizing circuit 1 in FIG. 1, which consists of the preprocessor 20 and the sub-circuits or levels 21A . . . 21N.

The branch function and the competition function of the circuits 77 of the level circuits 21A . . . 21N are now discussed in detail. Note, however, that the operation of the weighting of the DACs 60 are also influenced by the universal punish/reward signals; as a simplification, only their weighting due to other outputs 26 and inputs 25 will be discussed.

According to the present teaching, the outputs 26a . . . 26n of the various level circuits 21A . . . 21N are connected as input to branch function circuits 83 which may be separate circuits as shown or may be functions within the computer 9. Output 80a . . . 80n in FIG. 8A from the branch function circuits 83 to the computer 9 provide some of the data to permit the computer 9 to provide modifying inputs to the circuits 21A . . . 21N. That is, one mechanism by which the circuits 21A . . . 21N are self-organized is by feedback from the branch function circuits 83.

As noted earlier, the results of the branch computation (by the circuits 83 or by the computer 9) are further modified by competition or cooperation amongst the various inputs based on the B score accumulated over the period P. In FIG. 8A, the competition function is executed by competition function circuits 84, which receive inputs 81a . . . 81n from the branch function circuit 83 and provide inputs 82a . . . 82n to the computer 9 which processes these inputs to provide modifying inputs, included or part of the inputs 76a . . . 76n in FIG. 8A, to the level circuits 21. The purpose of the competition function circuits 84 is to provide modifying inputs to the level circuits 21 in FIG. 8A based upon competition or cooperation among the messages received by the various circuits 77 of levels 21A . . . 21N from the other circuits 77.

Local Weighting

Figure 8B:
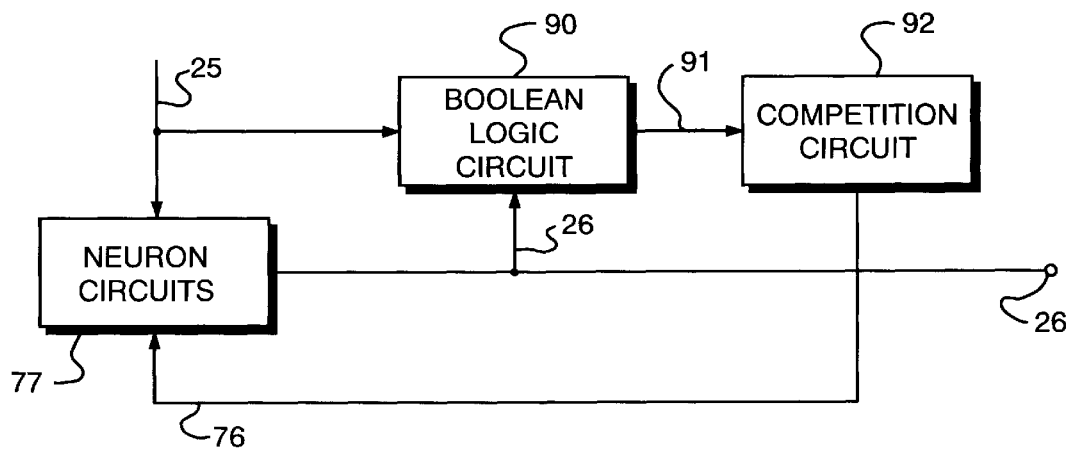
FIG. 8B shows how the same hardware logic functions are implemented at the subcircuit level of the self-organizing circuit.

FIG. 8B shows the branch function and the competition function implemented on the local level without requiring the use of external source 9. As discussed earlier, the node circuit 77 (one of the circuits 77a . . . 77n shown in FIG. 7A), receives inputs 25 (collectively, the inputs 25a . . . 25n in FIG. 7A) and has an output 26 (one of the outputs 26a . . . 26n in FIG. 7A). In addition, each node circuit 77 has an associated branch function circuit 90 which performs the branch operation described earlier to determine the B scores of the inputs 25 based on the branch values of the inputs 25 and the output 26 accumulated by the node circuit itself.

The output of the branch function circuit 90 is input via connections 91 to the competition function circuit 92 which rank orders the B scores of the inputs (or the largest absolute B scores in some circuits). Depending on whether the competition function is competitive or cooperative, fewer or more of the rank-ordered functions will be chosen for modification. The circuit 92 applies a modifying input to the node circuit 77 via bus 76 to alter the DAC weights 70.

Thus the weights in the self-organizing circuit 1 can be modified by several alternate methods. They may be externally modified by a teaching computer 9 with branch and competition functions implemented in software programming. In the method shown in FIG. 8A the weights can be modified by an external computer 9 which bases its decision on internal branch circuits 83 and internal competition circuits 84. The weights can also be modified completely internally using branch circuits 90 and competition circuits 92 associated with each node subcircuit 77. A designer skilled in the field can devise many other weighting methods which have various amounts of internal and external functions which accomplish the branch and competition functions of this invention.

Direct Feedback

Certain self-organizing circuits may require outputs 26a . . . 26n to feed directly back to inputs 25a . . . 25n. One common use of such feedback signals is to provide an output 26 whose firing rate, averaged over many clock cycles, varies. While the output of a circuit 77 is binary, a binary output is not useful in situations where the output signal 26 is to drive actuation circuits whose output 26 must vary proportionately to the amounts of time spent on various input patterns 11. Since actuation circuits (e.g., electrical motors driving the controlled object 14, FIG. 1) typically have inertial effects which integrate their input over time, output signals 26 whose pulse rate varies are often useful in self-organizing circuits 1.

When the net current input to a voter 75 of a node circuit 77 is only slightly greater than zero it fires, producing an output signal 26. If this output 26 feeds directly back to the circuit 77 as an inhibitory input 25, the tendency will be prevent the circuit 77 from firing a second time or third time in succession because the inhibitory feedback signal drains current from the voter 75. For a very large weight associated with the feedback input 25, the output 26 of the circuit 77 might fire only once and then be inhibited from firing for the next ten clock cycles.

However, when the net current flowing to the voter 75 (from inputs 25 other than the inhibitory feedback current) is much greater than zero, the feedback from the output 26 has relatively little effect on the behavior of the circuit 77. The inhibitory feedback signal doesn't drain enough current from the voter 75 to prevent the output 26 from firing every time. For a very large weight associated with the DAC 60 of the feedback input 25, the circuit 77 might be inhibited from firing some portion of the clock cycles.

Here then is a method by which the firing rate of a circuit 77 is varied. For a given feedback weight, the frequency of firing is low when the net current is low, but as the net current increases, the firing rate increases. The effect is proportional to the value of the feedback weight (the number stored in DAC 60 of the input 25 coming directly from the output 26). When the feedback weight is low, there is little effect on the circuit's firing rate; when the feedback weight is high, the effect is greater. The feedback weight stored in DAC 60 is a proportionality constant between a circuit's net current and its firing rate.

The proportionality between net current and firing rate is also altered by the delay 68b (FIG. 6A) of DAC 60 of the feedback input 25. When the delay is small, the inhibitory feedback acts immediately to inhibit the output 26 from firing; when the delay is large, the current drawn from the net current otherwise flowing to the voter 75 is delayed. The weight stored in DAC 60 combined with the delay 68b of that DAC 60 produce a time constant which controls how the firing rate is proportional to the net current.

Oscillatory behavior of a node 77 is also possible. When output 26 feeds directly back to voter 75 as an input 25 with the proper time delay 68b, an oscillating circuit is formed. In the preferred embodiment, the time delay of the negative feedback signal 25 produces an oscillation of the node 77 whose period is 10 T or more. Oscillator design calls for the feedback signal with adequate open-loop gain to be delayed half a period (180 degrees of phase shift). The delay can be provided by delay 25b. Alternatively, the delayed feedback input 25 can be provided by local circuitry having higher order delays than the first order delay 68b (see Combined Filters).

Note that an oscillatory node 77 only oscillates when other inputs 25 add enough current to the voter 75 to cause it to fire. For example, in FIG. 7A, let node 77a have a negative threshold value of −20 in DAC 74a and positive values of +8 in DACs 70a, 70b and 70c in addition to direct feedback with time delay from 26a as DAC 70d (not shown). The threshold DAC 74 prevents node 77a from firing despite the positive feedback from DAC 70d. Only if the inputs 25a, 25b, and 25c fire together will the current of voter 75a be large enough (+4) to offset the current drain of threshold DAC 74 and produce output 26a. Once node 77a fires, its negative feedback applies an inhibitory current to the voter 75, but only after the DAC 70d time delay 68b. If the delayed feedback current is large enough, it will reduce the current to voter 75 enough to prevent the node from firing. Soon the inhibitory current ceases (after delay 68b of DAC 70d) and the node once again fires as the cycle repeats.

In some embodiments of the circuit 77, direct feedback is accomplished by circuit modifications of the voter 75 itself. In these circuits, the output signal 26 is fed directly to the input of the voter 75 through a fixed resistor-capacitor link. Based upon the fixed values of the resistor-capacitor combination, more or less current is added (positive feedback) or drained (negative feedback) from the voter on each firing of the node circuit 77. The effect is the same as using a DAC 60 except that the proportionality constant between net current to voter 75 and firing rate is fixed, not variable.

Non-Firing Nodes

Circuits 77 are binary: they either fire or they do not fire. In actual neurons which cause muscle contraction, it is the firing neurons which carry the information. However, in many sensory neurons, information is carried by both firing and non-firing neurons. Similarly, node circuits 77 can carry information to other circuits 77 even if they are non-firing.

For example, consider three circuits 77. The output 26 of the first circuit 77A feeds an input 25 of the second circuit 77B through a DAC 60 whose negative weight draws current from the second circuit 77B just large enough to prevent the circuit 77B from firing. The output 26 of the second circuit 77B, when firing, feeds an input 25 of the third circuit 77C through a DAC 60 whose negative weight drains just enough current to prevent the third circuit 77C from firing. The second and third circuits 77B and 77C are NOT functions: if the circuit 77A driving them changes state, then they respond oppositely.

When the first circuit 77A fires, it inhibits the second circuit 77B from firing. However, the third circuit 77C fires because without the negative current drained by the second (only firing inputs 25 actuate the gate 64a of DAC 60, FIG. 6A), its voter circuit 75 receives enough current to fire. Now suppose the first circuit 77A stops firing. This first circuit no longer produces the inhibiting effect on the second circuit 77B and the second begins to fire. The second circuit 77B, on firing, drains current from the third circuit 77C which then ceases to fire. Information is conveyed down the chain of circuits even though they were non-firing. When the second circuit 77B changed from non-firing to firing, it caused the third circuit 77C to change as well. Similarly when the first circuit 77A changed from firing to non-firing, it caused the third circuit 77C to change (through the interaction with the second circuit 77B).

Circuits 77 carry information to other circuits 77 and other levels 21 primarily by changing state. The change can be from firing to non-firing or from non-firing to firing. Hence, non-firing circuits 77 are as important to the operation of self-organizing circuit 1 as are firing circuits 77. Patterns of firing and non-firing, circuits 77 of the network 1 determine how the input signals 2 produce the output signals 3. In analogous organic self-organizing circuits, these patterns are called thoughts.

UNIVERSAL SIGNALS

Universal signals are those which are directed to all the DACs 70a . . . 74n of the circuits 21A . . . 21N. These signals change the branch functions B of the DACs so that reward and punishment (incrementing and decrementing the binary numbers in the counters 67 of the DACs) can be influenced by the external source 9 teaching the self-organizing circuit 1. As the name implies, the universal signals 5 an 6, FIG. 1 are broadcast universally to all circuits 77. Universal signals are a way to aid the external source 9 in identifying correctness and relationships in the input patterns 11 taught to the circuit 1.

Correct and Incorrect

One form of universal signals is based on the correctness of the outputs 3. In this way, pattern recognition which occurs at the highest level of circuit 1 can be used to influence the learning process at lower levels. For example, let it be supposed that the pos/neg DAC method is used in the level one circuit 21A of FIG. 2 for recognition of letter components such as left diagonal, right diagonal, horizontal and so forth. Let it be supposed, too, that in a level two self-organizing circuit 21B, the same method is used to recognize patterns of letters based on the outputs of the level one circuit 21A. In the learning of patterns 11 by the first circuit 21A, punish or reward signals 76a . . . 76n alter the binary numbers in DACs 60 as earlier described in order to identify output signals 26a . . . 26n associated with component patterns of diagonals, horizontals and so forth. However, in some self-organizing circuits 1 (FIG. 1), learning of component patterns 11 by the first circuit 21A may also occur simultaneously with learning of patterns of letters by the second level circuit 21B.

To accomplish this function in electronic circuitry the "correct" or "incorrect" signals 5a and 6a is transmitted simultaneously to all DACs 70a . . . 73n. Signals 5a and 6a alter the branch competition function B which in turn varies the local punish and reward signals 67a and 67b (FIG. 6A) associated with each DAC 60. Signals 5a and 6a are two of several universal signals 5 and 6 which communicate universal signals to all DACs 60 of levels 21A . . . 21N. Each DAC 60 combines the "universal" correct/incorrect signals 5a and 6a from the computer 9 with the output signals 26a . . . 26n to alter the binary number stored in the respective counter 67 of the DAC 70a . . . 73n.

In one simple method of accomplishing the combining, the branch function is chosen to be an AND combination (both inputs present to get a signal) of the correct/incorrect signals 5a and 6a and the changed output signals 26a . . . 26n. In operation, a correctly recognized pattern 11 (as presented to the sensors 10 by the computer 9) causes the computer to transmit a "correct" signal 5a to the self-organizing circuit 1. The "correct" signal 5a combined with a changed output signal 26a . . . 26n (i.e., the output 26 changes from firing to non-firing or from non-firing to firing) in an AND combination adds binary numbers to the counters 67 in the DACs 70a . . . 73n; the "incorrect" signal 6a combined with a changed output signal 26a . . . 26n in an AND combination subtracts binary numbers from the counters 67.

In the present example, learning of "letter" patterns 11 by circuit 2113 is accompanied by correct/incorrect signals 5a and 6a depending on whether the learning was correct or incorrect. Since these same punish and reward signals are also transmitted to the circuit 21A learning will occur on this circuit as well: DAC 60 binary numbers will be altered in response to correct or incorrect answers. Hence, a "diagonal" component signal on first circuit 21A is rewarded if it helped to cause a correct letter "A" pattern to be recognized by the circuit 21B. In this sense "helped to cause" means that it changed state when both the input pattern 11 and its correctly associated output 26 (or output 3 of circuit 1) also changed state. In general, any DAC in the circuit 1 which contributes to a correct answer is rewarded; a DAC that contributes to a wrong answer is punished.

Association and Distinction

Universal signals 5 and 6, such as the one described above, improve self-organizing of circuit 1. Other universal signals 5b and 6b convey to the circuit 1, in a universal manner, important information about the input patterns 11.

As discussed earlier (see Competition and Cooperation), the self-organizing circuit 1 can be used for two separate tasks: association and distinction. A new pattern 11 (as characterized by inputs 2 to the circuit 1) falls into either of two categories. It is either like a previously learned pattern 11 or it is different from any previously learned pattern 11. If the new pattern 11 is the same as a previous pattern, the task of the circuit 1 is to associate the new pattern with the previous pattern which it is alike. If the new pattern 11 is different from previous patterns, the task of circuit 1 is to create a new output 3 which responds to that input pattern 11. This is distinction.

Universal signals 5b and 6b can be used to signal the circuits 77 of circuit 1 that association or distinction is taking place. Signal 5b represents "association" rather than "correct"; signal 6b represents "distinction" rather than "incorrect". However, signals 5b and 6b are universal: they are sent to all circuits 77 of circuit 1, which, together with the branch function B, are used to change the binary number stored in DACs 70a . . . 74n of level circuits 21.

Essentially the signals 5b and 6b modify the branch function B as will be discussed shortly (see Stabilizing and Destabilizing). The external source 9 presents the pattern 11 to the sensors 10 in conjunction with either the universal signal 5b or 6b. For example, if the circuit 1 had previously learned the capital letter "A" pattern and the new pattern was the small letter "a", signal 5b would be actuated to associate the two patterns 11 by modifying the B value for all the circuits 77 which changed when the pattern 11 changed. However, if the new pattern was the capital letter "V", signal 6b would be actuated to distinguish between the two patterns: B values of the changed circuits 77 are modified in a different way than for association to eventually produce a new output signal 3. Note that the best associations and distinctions of pattern 11 can be made by alternating back and forth between the two patterns 11 that are to be associated ("A" and "a" in the example) or the two that are to be distinguished ("A" and "V" in the example above).

In addition to modifying the amount by which the weights in the DACs 60 of circuits 77 are altered, the association signal 5b and the distinction signal 6b can be used to alter the number of DACs 60 of a circuit 77 which changed state when the pattern 11 was input. For distinction, only one or a few of the DACs 60 with the highest B values have their weights modified (competition). For association, many of the DACs associated with changed inputs 25 have their weights modified (cooperation).

Naming and Intermediate Outputs

Preferred embodiments of self-organizing circuits 1 eliminate the need for learning experiences by a lower level circuit (e.g., level circuit 21A used in the previous example). The circuits 21A . . . 21N form a network of circuits 77 which change state to produce the firing and non-firing patterns which convert a particular input pattern 11 to a correct output 3. While naming the inputs 25 as components of letters as in FIG. 7A aids in understanding the workings of circuits 77, generally no such intermediate components are known or required.

The issue is concerned with "naming": associating a particular output 26a . . . 26n of some level circuit 21 with a named or known pattern 11. For the circuits 77 discussed so far, all outputs 26a . . . 26n are known or identified prior to learning. Output 26a, for example, is associated with the pattern 11 for a left diagonal, output 26b for a right diagonal and so forth. These outputs are "named," they are associated with a pattern that we, the reader, knows already.

Naming, while useful for illustration, is not needed for the self-organizing operation of circuit 1. For instance, a circuit 1 whose task was to optically read handwriting would be very concerned which letter patterns 11 were associated with which letters, although the outputs 26a . . . 26n associated with the components such as left diagonals, verticals or horizontals would have other components which we, the reader, might not recognize at all. For these situations, naming can occur randomly or, more general still, no intermediate components need be named at all.

In random naming, the counters 67 of pos/neg DACs 70a . . . 73n (FIG. 7A) are initially loaded with small, but random, increases or decreases prior to learning. Instead of the binary number in counter 67 exactly balancing the current drain, small variations in the binary number leave small variations in the currents added or drained from the voter 75. During initial lessons, all outputs either fire or don't fire based solely on the sign (positive or negative) of the summation of random numbers stored in their DACs 60.

Reward and punishment signals are based, as before, on the branch functions of the inputs 25a ... 25n and outputs 26a ... 26n of each level circuit 21A ... 21N. As learning progresses, some output signal 26a ... 26n tend to become associated with an intermediate component. Exactly which one is not important since these intermediate outputs 26a ... 26n are transmitted to the next higher level circuit.

For example, if the level one circuit 21A is to have outputs 26a ... 26n which represented components such as diagonals, horizontals and so forth of letters whose outputs 26a ... 26n are in the level two circuit 21B, the DACs 70a ... 70n of the first circuit 21A would be loaded with small random increases or decreases. Input signals 25a ... 25n of the first circuit 21A come from sensors 10 but are preprocessed by preprocessor circuit 20. These inputs 25a ... 25n activate certain columns of the DACs 70a ... 73n in FIG. 7A, for instance, the first three columns of DACs. Some of DACs 70a ... 73n, based on the random numbers in their counters 67, would output enough current to the voters 75a ... 75n to cause the voters to fire.

The computer 9 sends reward and punish signals based on the branch functions to the DACs 70a ... 70n in levels 21A ... 21N, incrementing or decrementing the number in their counters 67. If the signal were incorrect, the numbers in counters 67 would be decremented. In particular, the DACs 70a ... 73n in the first circuit 21A would be incremented or decremented. As more and more lessons occurred for various upper-case letter patterns 11, certain intermediate components would become associated with particular outputs 26a ... 26n of the level one circuit 21A. However, which outputs become associated with which intermediate component patterns 11 would not be known, a priori. Hence, an output 26a might become associated with a diagonal, with a horizontal or with some other component pattern 11 purely at random; "naming" is not necessary.

In the more general case as shown in FIG. 2, many level circuits 21 are involved in the determination of the output 3 using input patterns 11. While some of the circuits 77 might have outputs 26 which actually represent a component which we, the reader, might recognize, most circuit 77 outputs are important only in that they interact with other circuits 77 to produce the correct recognition of the pattern 11 at the output 3 of the level circuit 21N.

BALANCE AND ADDENDUM

As has been discussed previously, the influence which an input connection 25 has on its voter 75 is determined by the value of the binary number stored in its associated DAC 60 (one of the DACs 70a ... 73n). The "weight" of the DAC 60 is itself determined by a combination of influences: the branch function of the particular input 25 and the output 26 of the voter 75 to which it connects; how well that branch function competes or cooperates with that of the other DACs 70a ... 73n connected to the same voter and modification of the branch function by universal punish/reward signals 5 and 6. In addition to these, yet another influence on the weights of DACs 70a ... 73n leads to better self-organizing properties of the circuit.

"Balance" is a term which applies to the balance of the inhibitory and excitory inputs applied to a voter 75 of a node circuit 77. When too many of the DAC 60 weights of a circuit 77 are either inhibitory (draining current from voter 75) or excitory (adding current to voter 75), the circuit 77 cannot change state easily, producing poor self-organizing capabilities. Balance is achieved by incrementing DAC 60 weights in such a way that neither inhibitory nor excitory weights dominate. Without balance, a node circuit 77 may become dominated by either inhibitory or excitory influences. More importantly, a balanced node 77 is capable of taking on more information as will be discussed shortly (see Addendum).

Balancing can be accomplished in two basic ways: balancing the positive and negative weights of all DACs 60 connected to a voter 77 or balancing the positive and negative weights of only those DACs 60 connected to an input 25 which is firing. With either of these methods, an out-of balance node 77 is pushed toward a more balanced state by either changing its bias weight (in DACs 74) or its branch-related weights (in DACs 70a ... 73n).

Weight Balance

"Weight balance" is balancing a node circuit 77 by assuring that all the DAC 60 weights connected to it are neither too inhibitory nor too excitory. The balancing is done regardless of whether the input 25 to that DAC 60 is firing.

One way to weight balance a node 77 is to use the "net balance" on the node to modify the competition for branch function of each node circuit 77. The net balance of a circuit 77 is computed by the computer 9 by summing the binary numbers for all pos/neg DACs 60 connected to a circuit 77 (including the threshold DAC 74). The net balance is positive if this sum is positive, else it is negative.

The net balance can be used to influence the competition function for the largest B values and thus keep the node balanced. If the net balance on the node circuit 77 is positive, the competition is slanted so that negative weights will compete more easily. As the weights of each sign grow larger, those that are negative will tend to grow faster than the positive because they will be rewarded with a weight gain more often. Conversely if the net balance is negative, then positive weights in DACs 60 will do better in the competition, and the tendency will be to increase positive weights to the detriment of negative weights. Again node balance is maintained.

A second way in which weight balance can be maintained on a node circuit 77 is to base the weight change of DACs 60 with a positive weight on the sum of negative weights and the weight change of DACs 60 with a negative weight on the sum of positive weights. The positive and negative sums are the same as are described above. Such a method appears to be used by neurons in the cortex of living organisms: inhibitory neurotransmitters spur the growth of excitory connection strengths while excitory neurotransmitters spur the growth of inhibitory connection strengths.

Firing Balance

"Firing balance" is similar to weight balance except that the balance is based only on those DAC 60 weights whose associated input 25 is firing. Since only those inputs 25 which are firing produce a positive or negative current at the voter 75, it is these DAC weights 60 which most influence whether the node 77 will be dominated by excitory or inhibitory influences. Note that the threshold DACs 74 are included in the firing balance since they also produce a current at the voter 75.

One way to achieve firing balance is to reward DACs 60 of each sign equally during the competition or cooperation for branch functions. Assuming a branch function, B, which is largest for firing inputs 25, competition or cooperation takes place in each node circuit 77 for the largest B values among the DACs 60 associated with firing inputs 25 to which it is connected. Firing balance is achieved by allowing the excitory (positive weight) DACs 60 to compete separately for the biggest positive B values, while the inhibitory (negative weight) DACs 60 compete for the biggest negative B values.

The DACs 60 with the biggest B values of each sign (positive or negative) are rewarded with weight increases: positive weights get more positive and negative weights get more negative. As the circuits 77 of the self-organizing circuit 1 learn the input pattern 11, the biggest of both the positive and the negative weights are increased more or less equally so that any particular circuit 77 stays close to being firing balanced.

Firing balance can also be achieved by basing the DAC 60 weight changes on how close the circuit 77 is to firing or to not firing. When a node circuit 77 fires, it is because the net current to its voter 75 is positive. When it does not fire, it is because the net current to its voter 75 is negative. Using pos/neg DACs, the current injected into the voter 75 depends on whether the inputs 25 to the circuit 77 fired, on the value and sign of the weights stored in its input DACs 60, and the value of its threshold DAC 74. All these influence the net current to the voter 75 and thus whether the circuit 77 fires.

"Fill" is the term used to represent the net current to a voter 75 because it measures how "full" is a node circuit 77. If Fill is greater than zero, the node will fire; if it is less than zero it won't fire. Note, however, that a noise current might prevent the voter 75 from firing despite its Fill being greater than zero (see Uncertainty). Fill is the weighted sum of the input weights for each input that fired, plus the bias (the threshold weight 74). Fill also represents how close a node circuit 77 is to achieving a firing balance: how close is it to changing state. Large values of Fill (either positive or negative) mean the node is far from changing state—that either excitory or inhibitory influences dominate the node 77. Low absolute values of Fill mean the node 77 is close to changing state, that the node is nearly firing balanced.

Balance and Learning

Learning, the modification of the DAC 60 weights in circuits 77, can be thought of as being composed of two parts: competition or cooperation for branch functions to determine which DACs 60 will be altered, and incrementing or decrementing DAC counters 67 by an appropriate amount. In both parts, weight balance and/or firing balance can be used to improve self-organization.

In the branch competition function, net balance or Fill is used to modify the branch function B of Eqn. 1. First, define net balance (NBAL) and Fill (FILL) in terms of the DAC 60 weights of the circuit 77:

$$NBAL_i = SUM_j(N_j) + N_{TH} \quad (2)$$

$$FILL_i = SUM_j(N_j * IF(Y_j)) + N_{TH} \quad (3)$$

where, as before:

Y is the branch input 25j from branch circuit j

IF is a Boolean operator $N_j$ is the decimal equivalent, either positive or negative, of the binary number in the DAC 60 associated with the branch input 25j

$SUM_j$ is the summation over the j branch inputs $N_{TH}$ is the decimal equivalent of the binary number stored in the threshold DAC 74 of the node circuit 77

Note that since Fill determines the state of node 77, the sign of Fill is the Boolean function IF(X). These balance expressions modify the branch function B as follows:

$$B_j' = f_3[B_j, NBAL_i, FILL_i, U, Nr] \quad (4)$$

where:

$B_j$ is the branch function for branch j of node i accumulated over a period P (Eqn. 1)

$NBAL_i$ is the net balance for node i (Eqn. 2)

$FILL_i$ is proportional to the net current to voter 75 of node i (Eqn. 3)

U is the Universal signal

Nr is a random number used to add noise to the competition $f_3$ is a functional relationship $B_j'$ is the modified branch function for branch j of node i The B' values are used in the same way that B values are used to pick a few or many of the DACs 60 having the largest B' values. Universal signals 5 and 6 can modify the B' values for the task at hand to improve self-organization. For instance, if the task is an associative one, the signal 5b modifies B' to reward many of the DACs 60 with a high B' value (a cooperative competition function). Conversely, for distinction tasks, the signal 6b modifies B' to reward only a few DACs having the highest B' values (a competitive competition function). The noise number Nr adds an uncertainty to the competition much as the noise current adds uncertainty to the node's firing.

Stabilizing and Destabilizing

After identifying which DACs are to be rewarded, the second part of learning is to modify the numbers in the counters 67 of those DACs 60. The amount that the DAC 60 weights are modified depends on the same variables as the competition: the branch function B, the net balance and/or Fill and the universal signals 5 and 6.

Modifying the DAC 60 weights has the effect on the node circuit 77 of stabilizing or destabilizing it. As an illustration, consider the preferred embodiment where weights are modified based on the Fill of the circuit 77. In addition, let the universal signals 5 and 6 represent stabilizing or destabilizing. Stabilizing is usually related to either reward tasks (signal 5a signaling the circuit 1 that the output 3 is correct) or association tasks (signal 5b signaling that the new pattern is associated with a previously learned pattern). Destabilizing is usually linked to either punish tasks (signal 6a denoting that the output 3 is incorrect) or distinction tasks (signal 6b indicating that the new pattern is distinct from a previously learned one).

To stabilize a node circuit 77 is to drive its Fill away from zero (either positively or negatively). To destabilize a node is to drive its Fill toward zero and eventually change state. Put another way, stabilizing tends to prevent a node circuit 77 from changing state; destabilizing tends to cause a node circuit 77 to change state. For nodes which have direct feedback (see Direct Feedback), the important Fill value is the highest value of Fill whose sign is opposite the threshold DAC 74 sign. For example, if the threshold DAC 74 of a node is positive, the most negative Fill value controls stabilizing and destabilizing.

Below is a simple weight modification strategy. The inputs 25j which have the highest branch function $B_j'$ are chosen as the ones whose weights will be modified. Then they are modified according to Eqn. 6. Notice that only firing inputs contribute to the weight modifications:

$$X_i = SGN(FILL_i) \quad (5)$$

$$W_{ji}|_{t+P} = ((T_O - 1) * W_{ji}|_t + U * W_{MAX} * B_j' * X_i)/T_O \quad \text{For } Y_j \text{ fires}$$

$$W_{ji}|_{t+P} = W_{ji}|_t \quad \text{Otherwise}$$

where:

$SGN(FILL_i)$ is the sign of the net current to node i (+1 for firing and −1 for not firing)

$B_j'$ is the modified branch function of the branch j $X_i$ $Y_j$ are the states of node i and branch j U is the Universal signal: +1 for stabilizing and −1 for destabilizing $W_{MAX}$ is the maximum possible weight (either sign)

$T_O$ is the time constant $W_j$ is the DAC 60 weight of node i to branch j

Now consider stabilizing node circuit 77. If the node 77 is firing, then its Fill will be positive (except for the noise current, Fill is the variable which determines whether the node fires or not), $B_j$ is always positive and X will be positive (+1). For stabilizing, U is also positive (+1). According to Eqn. 5, the new weight is driven toward a maximum value ($W_{MAX}$) whose sign matches its Fill. That is, a firing node 77 (with positive Fill) drives toward positive $W_{MAX}$ while a non-firing node (with negative Fill) drives toward negative $W_{MAX}$. As the weight changes, so does the binary Nj in the DAC's counter 67. If it's a firing node, the counter's number gets more positive, adding positive current to its voter 75 (and its Fill). Stabilizing a firing node makes it more likely to fire. If it's a non-firing node, its weight is driven toward—$W_{MAX}$; as the weight gets more negative, its effect is to make the node's Fill even more negative and less likely to fire.

For destabilizing, the opposite is true. The universal signal U for destabilizing is negative (−1). If the node 77 is firing (X=+1), its weight is driven negatively, draining current from an already firing node 77. On the other hand, a non-firing node 77 (with a negative Fill and X=−1) has its weight driven positively. Either way, the Fill value of the node is closer to zero after the weight modification than before. Eventually, repeated weight modifications change the node's Fill value enough to change state—from firing to non-firing or from non-firing to firing.

Because of either self inhibition (see Direct Feedback) or noise currents (see Uncertainty), the Fill of a node circuit 77 does not completely determine X outcome 26, but rather the tendency of its outcome. For instance, if the node had been firing consistently and was destabilized (as above), the effect of noise currents or of self-inhibiting feedback currents might simply make the node fire less consistently. As we will see, the proper choice of a branch function assure that only consistently firing or consistently non-firing node circuits 77 dominate the self-organizing capability of the circuit 1.

More complex weight modification strategies than Eqn. 5 provide a way to be sure that a node circuit 77 will stay changed once it has changed state. For example, when the weight modification is based on branch functions, B, which use previous values of node firings, a node can change state rather than simply reverting to an inconsistently firing node. Moreover, some weight modifications strategies specifically target nodes with low Fill values by making the weight modification proportional to the reciprocal of Fill. Thus nodes 77 with low Fill values have their branch weights (numbers stored in DACs 60) changed faster than stable consistent nodes (having high Fill values).

Node circuits 77 are stabilized or destabilized by another method: modifications of the threshold DAC 74. Since Fill is a summation of all additions and drains of current to its voter 75, the threshold DAC 74 also affects stability. The method is similar to DAC 60 weights linked to the inputs (i.e., DACs 70a ... 73n). For stabilizing, firing node circuits 77 have positive increments added to the threshold DAC 74 and non-firing nodes have negative increments added. For destabilizing, firing nodes have negative increments added and non-firing nodes have positive increments added to their threshold DACs 74.

Weight and Fill Limiting

In stabilizing and destabilizing, the weights in DACs 60 are modified according to a weight modification strategy such as Eqn. 5. This particular strategy has limits imposed upon the maximum value which any weight can have: the weights are driven to either −$W_{MAX}$ or +$W_{MAX}$. The weights are usually limited in any case by the physical constraints or the circuitry. For example, in DACs 60 with a fixed supply voltage S, the maximum amount of weight change is determined by the number of bits in its up-down counter 67 or the number of transfer gates 63 in its ladder network.

Fill, the firing balance of a node, can also be used to limit the weight values in DACs 60. Weight limiting based on Fill assures the Fill does not get so large that it can prevent a node from changing. Consider the case when several inputs 25 fire, each having a high positive weight. Fill, the net current to the voter 75, would become very high as each input contributed a positive current (even if the threshold current from DAC 74 offset the total). During certain operations of the circuit 1 (see Tunneling and Densifying), a very large Fill prevents the network of node circuits 77 from proper learning of new patterns 11.

Using Fill as the criteria for limiting DAC 60 weights simply means that when the Fill exceeds a limit (either positively or negatively), no further weight changes are made. Learning, the modification of DAC 60 weights, only takes place when the Fill is within the Fill limits. Different input patterns 11 produce different combinations of inputs 25 to a particular node 77. As weights to the node build, connections with other inputs 25 strengthen. However, no additional weights are added if the Fill exceeds its limits. Alternatively, the weights can approach the Fill limits asymptotically by reducing the weight increase as the Fill approaches its limits.

Addendum

"Addendum" is an important feature of a self-organizing system that is to operate on a variety of information at different times. Addendum is the ability of a circuit 1 to add information in addition to that on which it has already been trained. For example, suppose a pattern of input signals 2 (FIG. 1) representing the letter "A" was taught to the circuit 1 (as was previously described by presenting this input pattern 11 to appropriate sensors 10 and preprocessor circuit 20). The circuit would then be able to recognize the letter "A" if the input pattern 11 presented to the sensors 10 once again was an "A" or close to it.

If the circuit was trained on the letter "V" at the same time, the input pattern 11 could be either a letter "A" or a letter "V" and the output signals 3 would respond either to the letter "A" or to the letter "V" as previously described. "At the same time ... " here means that the patterns for the letter "A" and the letter "V" are presented to the circuit 1 alternately—first the letter "A" pattern, then the letter "V" pattern, back to the letter "A", then "V" again and so forth. By using such a presentation of patterns, the weights (the values of the binary numbers in the DACs 70a ... 74n) incorporate the information of both patterns 11 at the same time.

However in living organisms, the learning of one pattern is not restricted to occur simultaneously with the learning of all other patterns. Living organisms have the ability to add new patterns—new information—to the store of patterns which they learned at a previous time. For the most part, living organisms learn patterns sequentially in a one-after-the-other manner, rather than learning patterns simultaneously.

As described earlier, the branch connections (inputs 25) of a node circuit 77 are chosen by having them compete or cooperate for the branch function modified by the universal punish/reward signal. If highly competitive, only a few of the many inputs to a circuit 77 develop large inhibitory or excitory connection weights. If highly cooperative, many of the inputs 25 have their weights modified. Although the method applies equally well for the cooperative case, as a simplification consider only the highly competitive situation.

As the same pattern 11 is repeatedly presented to the sensors 10, the winning connections grow larger and larger (either positively if connected to a positive source or negatively if the reverse). After many of these weight modification steps, only a few of the connections will dominate the response of the node. Addendum operates by freezing or maintaining the weights of the winning connections of the previously learned patterns, during the time when a new pattern is being learned.

To understand how addendum operates, consider a hypothetical node circuit 77d which has pos/neg DACs and inputs 25 representing primitives of letters. After the circuit 1 has been trained on the letters "N", "R", and "V" many times, circuit 77d modifies its weights so that certain inputs tend to dominate its behavior. Strong excitory weights come from inputs 25a and 25b (similar to those in FIG. 7A) representing a left diagonal "\" and a right diagonal "/", respectively. Strong inhibitory weights come from inputs 25d and 25n representing a left-facing curve ")" and a vertical "|", respectively. Other inputs 25 have lost in the competition for B' values—their DACs only have small binary numbers; they contribute little to whether voter 75d fires or not.

When the input pattern 11 presented to the circuit 1 is a "V", the voter 75d tends to fire. Two of its subcomponents ("\" and "/") are present; DACs 60 connected to these two inputs 25 inject large amounts of current into the voter 75d causing it to fire and producing an output signal at 26. When the patterns 11 for "N" and "R" are presented, they tend to prevent the voter 75d from firing. Though these patterns have a subcomponent in common ("\") which adds current to voter 75d, they also have strong inhibitory signals from inputs 25d and/or 25n which drain current. Hence the voter 75d tends to fire when patterns for the letter "V" are presented but not fire when patterns for "N" and "R" are presented. Other circuits 77 are trained in a similar way to respond only to the "N" and "R" patterns.

But now suppose the circuit 1 is to learn additional information—while still retaining the information it already has. Suppose a new input pattern 11 representing the letter "A" is to be learned in addition to patterns for the letters "N", "R" and "V" to which it already responds. First the winning connections of the node circuits 77d are held fixed; the binary numbers in those DACs 70a . . . 74n which developed the highest binary numbers during previous learning experiences (i.e., DACs of inputs 25a, 25b, 25d and 25n) are no longer allowed to participate in the competition for highest B values. The binary numbers in the DACs associated with these branches are held fixed. In living organisms, neuron connections appear to undergo a similar process which distinguishes "short-term memory" from "long-term memory." In long-term memory, protein synthesis in the synapses (connection points between neurons) occurs, making connections which last for years.

As the new pattern 11 representing the letter "A" is presented to the sensors 10, once again the inputs 25 to circuit 77d operate through their respective DACs 60 to add or drain current from the voter 75d causing the circuit to either fire or not fire. Since the pattern "A" has both left and right diagonals, the circuit 77d (whose output 26 represents the letter "V") tends to fire due to its excitory connections 25a and 25b. Note that while these fixed weights do not change, they still influence the voter to which they are attached when their respective inputs 25 fire.

In addition to circuit 77d firing, the circuit 77e whose output 26e eventually will represent the letter "A" also fires. The DAC 60 having output 26e has an input 25e to the voter 75e—a feedback connection from output to input on the same level circuit—will develop a high B value since the computer 9 will reward the "correct" response "A" rather than the incorrect response "V" (see Universal Signals). The DAC 60 connected to input 25e (and output 26e) will compete well with the other DACs and is likely to be rewarded by increasing its weight. Since it is an inhibitory connection, it drains current from the voter 75e.

After presentation of the pattern representing "A", the negative weight associated with input 25e will be increased. In addition, other DACs 60 will likely be rewarded (for example, the input representing "NOT horizontal"). Notice, however, that the connections associated with inputs 25a, 25b, 25d and 25n (which already have large binary numbers in their DACs) do not participate in the competition for B values. Only the "losing connections" from previous learning experiences participate in the B value competition. As the pattern 11 representing "A" is presented again and again, the binary number stored in the DAC 60 connected to input 25e of circuit 77d will grow larger and larger. Soon input 25e along with inputs 25a, 25b (positive) and 25d, 25n (negative) will dominate the behavior of the voter 77.

The result is that information has been added to the circuit 1 by showing it only the new pattern 11 representing the letter "A". The learning of the new pattern occurred after other patterns had been learned, not in conjunction with the learning of the other patterns. In particular, the node circuit 77d which responds to the input pattern "V" by firing, learned not to fire when the pattern "A" is presented—despite both patterns sharing two important subcomponents.

Balance and Addendum Functions

The balance and addendum functions, like the branch and competition function described earlier, is how the network of node circuits 77 learn patterns 11 presented via sensors 10 and preprocessing circuit 20. These functions only determine how the weights (the numbers stored in DACs 60) are modified during self-organizing operation of the circuit 1.

As such, the functions can be implemented completely by the external computer 9, as discussed with respect to the branch and competition function. The computer 9 serves to apply modifying inputs to each sub-circuit or level in the level circuits 21 in FIG. 2, which modifying inputs serve to correct errors in the output signals 26a . . . 26n of the level circuits 21 (or output signals 3 in FIG. 1) occasioned by accurate or inaccurate analysis of the input signals 25a . . . 25n of the level circuits 21 (or input signals 2 in FIG. 1). As noted previously, the use of the teaching computer 9 is merely one of convenience; a human operator could also modify the inputs (i.e., change the values of the numbers stored in the DACs) to the level circuits 21 in FIG. 2, so long as the rules described for balance and addendum were used to insure efficient self organizing.

Just as branch and competition functions can be implemented in internal circuitry (FIG. 8A), so can the balance and addendum functions. Instead of calculating the modified branch functions B' and weight changes $W_j$ by the external computer 9, they are calculated internally based on branch function, universal signals and balance variables (Fill or net balance). Addendum functions are implemented internally by freezing the values of the appropriate DACs 60 when they have grown large enough. The circuitry is a variation of that shown in FIG. 8A.

Lastly, the balance and addendum functions can be implemented locally. In this case each node circuit 77 has its own circuitry which determines the modified branch function and freezes the weights of the appropriate DACs 60 of that circuit 77. The circuitry is a variation of that shown in FIG. 8B which determine the branch function and the competition function of each node circuit 77.

BIAS AND CLIP

Insight into how node circuits 77 self-organize is found by showing how the node circuits 77 act as multi-input branch functions. Using bias (the weight of threshold DAC 74) and clip (where the circuit 77 is modified to alter behavior if the voter current becomes too high or too low), circuits 77 act like common 2-input Boolean gates such as AND, NAND, OR, NOR, XOR and XNOR. A short summary of how bias and clip operate follows.

Bias

First consider bias. Improved self-organizing results when threshold DACs 74$a$ . . . 74$n$ (see Threshold Learning) are used to bias a node circuit 77. In preferred embodiments, the threshold DACs 74 are pos/neg DACs (see Positive/negative Weights) which act to change the characteristic behavior of the node circuits 77 from an "OR-like" or "NOR-like" nature to an "AND-like" or "NAND-like" nature. The terms OR-like, NOR-like, AND-like and NAND-like used here refer to circuits 77 which have two or more inputs 25, yet behave in a similar manner to the respective 2-input Boolean gates.

Refer now to FIG. 7A where various inputs 25 of a level circuit 21 produce outputs 26 of that level. Assume for the moment that only a few of the weights associated with the inputs 25 have grown large enough during learning to dominate the node's behavior. If the bias on a threshold DAC 74 is a high negative one, it acts to prevent the circuit 77 from firing unless two or more of the inputs 25 fire; the circuit is "AND-like" because a 2-input AND gate fires only if both of its inputs fire. On the other hand, a low negative bias lets the circuit 77 fire if at least one of its inputs 25 fire; the circuit is "OR-like" because a 2-input OR gate fires if either of its inputs fire. The terms "AND-like" and "OR-like" also apply to multi-input circuits 77.

The bias can also be positive. "NAND-like" and "NOR-like" circuits 77 always fire unless acted upon by their inputs 25. The threshold DAC 74 adds current to the voter 75 which can only be drained by inputs 25 with negative weights in their associated DACs 60. A high positive bias makes the circuit 77 NAND-like since two or more large current drains (caused by inputs 25 with large negative weights) are needed to prevent the output 26 from firing. A single input 25 does not drain enough current from the voter 75 to prevent it from firing because of the high current injected by the threshold DAC 74.

In contrast, a low positive bias acts NOR-like: it is always firing unless a large current is drained from its voter 75. In NOR-like circuits 77, the small current injected by the threshold DAC 74 can be overcome by any of the inputs 25 whose current drain exceeds it. NOR-like nodes 77 need one or more inputs 25 to prevent firing.

Bias comes about in two ways. First, node circuits 77 have an inherent bias which makes an individual circuit behave in an OR-like, NOR-like, AND-like or NAND-like manner. Second, the bias can be modified during learning (i.e., in conjunction with learn signal 8) of the self-organizing system 1 (FIG. 1) to change the characteristic behavior of the circuit 77 during learning.

Clip

Clip is another means by which the behavior of the circuits 77 can be altered to provide improved self-organizing. While bias changes the circuit 77 from OR/NOR-like to AND/NAND-like characteristics, clip changes it from OR/NOR-like to XOR/XNOR-like characteristics. The XOR and XNOR functions, like the OR, NOR, AND and NAND functions, are 2-input Boolean operators. XOR is the "exclusive OR" function; XNOR is the "exclusive NOR" function. The terms "XOR-like" and "XNOR-like" used here refer to circuits 77 which have two or more inputs 25, yet behave in a similar manner to their respective 2-input Boolean gates.

When circuits 77 are made to operate like XOR or XNOR functions, they provide the circuit 1 with a "decision" capability. Rather than "averaging" the effects of the inputs as the OR/NOR functions do, the XOR/XNOR functions force the output of the circuit 77 to be determined by one input or another, not a combination of both. XOR/XNOR functions provide a branching organization of input patterns 11 which aids in correctly determining the proper output 3.

The clip function resembles the response of actual neurons. When a neuron receives too large an input signal (that is, the neuron's internal potential is driven too high), "cathodal block" prevents the neuron from firing. Such a function is XOR-like; it behaves like a Boolean XOR. Consider a two-input XOR gate. It fires if either of the inputs fire, but doesn't fire if both or neither input fires. It's behavior is similar to the OR gate except for the case where both inputs fire: the OR fires but the XOR does not. Similarly, an XNOR gate responds like a NOR gate except for the case where both inputs fire: the NOR doesn't fires but the XNOR does. To make an OR gate into an XOR gate requires only that the output of the gate be "clipped" (not fire) for the case where both inputs fire.

Just as a node circuit 77 (FIG. 7A) is modified by the bias to produce OR/NOR-like and AND/NAND-like behavior, the same circuit 77 can be modified to produce XOR/XNOR-like behavior. While the term XOR and XNOR only apply to 2-input Boolean gates, in general, a node circuit 77 is XOR/XNOR-like if its output is altered when the input voltage to its voter 31 (FIG. 3) is either too high (XOR-like) or too low (XNOR-like). Also like bias, clip can be either fixed (assigned an initial value that doesn't change) or modified during learning (changing the value at which clipping occurs).

TIME FUNCTIONS

Self-organizing of circuit 101 depends on "learning rules": how the nodes 77 (FIG. 7A) of circuit 101 develop the proper DAC 60 weights (70$a$ . . . 74$n$) in making connections with other nodes. Learning rules are distinct from the node's "operation", the process by which it fires to produce an output 26 based on its inputs 25. Learning rules are essentially choosing which branch function is used in the competition for branch weight modification: how to pick the branches and the amount of DAC 60 weight increment.

The most efficient branch functions depend on both the time and the space aspects of the nodes 77 of circuit 101. They may be very simple functions such as the Boolean branch function shown in Eqn. 1. As branch functions become more complex, they are composed of functions which have both temporal aspects and spatial aspects.

As a way of organizing the branch functions, the functions of which they are composed are divided into two types: time functions and space functions. Time functions and space functions depend upon how the nodes 77 react in time and in space. Time functions are those which depend on aspects of the network 101 which vary temporally; these aspects change over time for a particular node circuit 77. By contrast, space functions are those which depend upon aspects of the network 101 which vary spatially, that is, aspects which change over the spatial dimensions of the network—from one node circuit 77 to another node circuit 77 at the same time.

Both the time and space functions can be further divided into difference and summation functions. Summation functions depend on the summation (or accumulation) of the time or space aspects of the circuits 77; difference functions depend on differences of the time or space aspects of the circuits 77. The summation and difference functions are themselves discrete versions of the common integral and differential functions of calculus.

Time Difference Functions

The Boolean branch function shown in Eqn. 1 was primarily a time summation function. It depended on the Boolean values of the node and its branches which accumulated over time. Now, another type of branch function will be introduced which depends on time differences in the node and its branches. Time differences are change functions: they relate to how the node and its branches change over time.

An important function of a self-organizing system is to be sensitive to change. Knowing when and where an input pattern 11 changes allows a self-organizing circuit 1 to organize more efficiently. Changes—either to static or time-varying patterns—which occur at any of the inputs 25 to any of the level circuits 21 can be used to modify DAC 60 connection weights between inputs 25 and outputs 26 of a node circuit 77. The sensitivity to change can be accomplished in two ways: 1) the branch competition criterion can be modified to be sensitive to change and 2) the subcircuits themselves can be modified to be sensitive to change.

To illustrate time difference functions, consider a distinction task where two patterns 2 are to be distinguished from each other: distinguishing the letter "A" from the letter "V". Distinction tasks typically have competitive competition functions where only a few of the highest B values are rewarded by weight increases (see Association and Distinction). Using the format of FIG. 7A, the input 25c specifying the horizontal is the one which changes. The other two inputs 25a and 25b remain the same for either letter "A" or letter "V" input as pattern 11; they do not change and should fare less well in the competition for weight increases of their DACs 60.

To understand the process, a simple change-sensitive branch function will be combined with the time summation function:

$$B = SUMT[K_1 * AND(X,Y) + K_2 * ABS(IF(Y) - IF(YT))] \quad (6)$$

The first term, $K_1 * AND(X,Y)$, is of the form of Eqn. 1 where a Boolean function relates the node's firing (X) and its branch's firing (Y). The second term $K_2 * ABS(IF(Y) - IF(YT))$ is the change-sensitive term. $K_1$ and $K_2$ are constants which control the relative amount of change sensitivity. The time summation is over the period P, here taken to be one lesson.

Applying this simple branch function to distinguishing a letter "A" from a letter "V", assume that letters "A" and "V" are input alternatively as the input pattern 11. When you distinguish two patterns that differ slightly, you use the same strategy: first you look at one and then back to the other, again and again. The first term (the Boolean AND(X,Y)) accumulates for DACs 70a and 70b when the inputs "\" 25a or "/" 25b fire at the same time that output 26a (the "A"); it accumulates for DACs 71a and 71b when the output 26b (the "V") fires. The second term contributes nothing for these DACs—when either the "A" or the "V" are presented these inputs do not change.

However, the situation is different for the input 25c. For DAC 70c, the first term contributes to B whenever pattern "A" is presented. The second term also contributes to B each time the input pattern changes from an "A" to a "V" (or back again): IF(Y) is unity whenever the horizontal appears in the input pattern 11, and IF(YT) is unity at some previous time. Hence whenever the patterns change, the value of IF(Y) differs from that of IF(YT) and the second term adds to the accumulation of branch function. In a digital implementation, the "previous time" is typically one or more clock cycles; the patterns 11 are typically presented for many clock cycles.

IF(Y) and IF(YT) differ only when the pattern changes. As the patterns 11 switch back and forth between "A" and "V", the input 25c (and its corresponding DAC 70c) will compete well with other inputs which don't change. The result is that connection strength of input 25c is likely to be increased—the horizontal is an important component in distinguishing an "A" from a "V". Note that other components such as the left and right slants (inputs 25a and 25b) are also likely to have their connection strengths increased by competing well. Their branch function B is based more on the first term than the second since they do not change.

Change-Sensitive Circuits

Figure 9:
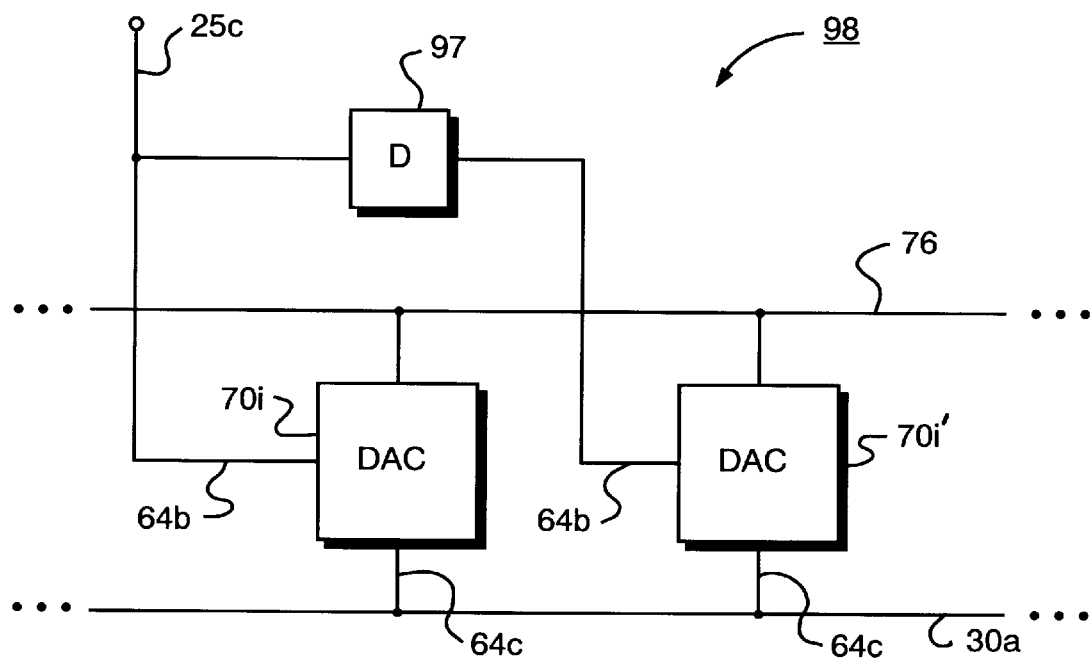
FIG. 9 is a diagrammatic representation of a modification of the circuit in FIG. 7A showing how change-sensitivity can be implemented.

Not only does the choice of branch function make a self-organizing circuit 1 more change sensitive, but so do changes in its circuitry. FIG. 9 shows a modification of a portion of the circuit shown in FIG. 7A. This circuit 98 is presented only to illustrate how the circuit 77 can be made change-sensitive with only minor changes; in general, the components are combined to make a much simpler circuit. Two DACs 70i and 70i' are connected to the same input signal 25i via connections 64b (see FIG. 6A). They add or drain current via connections 64c into the same connection 30a which is an input to a voting circuit 32. Both DACs, in the simplest implementation, are also both connected by the same punish/reward bus 76 such that both increase their connection strength (the binary numbers in their counters 67) by the same amount.

The two DACs 70i and 70i' differ in that they have opposite signs of their voltage sources (see source S, FIG. 6A). If one DAC has a positive source, then the other has a negative source. They also differ by the addition of a delay 97 through which the input signal 25i passes before going to DAC 70i'. The delay is identical to the internal delay 68b of the DAC; it is called out specifically to emphasize its importance to the operation of the circuit. In a digital implementation of the circuit 1, the delay 97 is typically one or more clock cycles; in analog circuits, the delay's time constant is longer than the time constant of the voter 32 (FIG. 3). The internal delay 68b of the DAC 70i will be much less than that of the delay 97 for proper functioning of the circuit.

Again assume that the patterns 11 are the letters "A" and "V" alternately presented to circuit 1. Consider a circuit 98 whose input is the horizontal signal 25c (FIG. 7A)—it only fires when the letter "A" is presented. Let the DAC 70i have a positive voltage source (it adds current to the associated voter 32) and the DAC 70i' have a negative voltage source (it drains current from the voter). Suppose that the letter "V"

had just been presented and the pattern 11 was then switched to the letter "A". When the signal 25c first fires, DAC 70i adds current to the connection 30a while the DAC 70i' has no effect—its input is delayed by delay 97. The net tendency is to make the voter 32 more likely to fire. A short time later when the delay of time delay 97 has passed, the current added by DAC 70i is the same as that drained by DAC 70i' (since they both have the same binary numbers in their counters 67). There is no net current added to the connection 32a by the input 25c, so input 25c has no influence on the firing of voter 32.

Let the branch function be the simple function AND(X,Y) as discussed previously. For several clock cycles after the pattern 11 changes from "V" to "A", DACs 70i and 70i' of input 25c will accumulate the branch function, B. It will accumulate again when the pattern switches back. After many presentations, the DACs of input 25c compete well with the other connections and are likely to have their connection strength increased. Certainly a distinguishing feature of the letter "A" is not only that the horizontal is present, but that its first appearance is important. Moreover, when the letter "A" is removed the change-sensitive circuit 98 prevents the "A" output from firing. When the horizontal input 25c ceases, current is drained from the voter when DAC 70i' stays on even after DAC 70i stops adding current.

Note that change sensitive circuits such as shown in FIG. 9 are added to circuit 7A in addition to DACs such as 70a . . . 73n. Hence an input 25c would likely feed into a DAC 70c as shown in FIG. 7A and also feed into a circuit 98 sensitive to changes in the signal 25c. Also note that because a circuit 98 is sensitive to change, it is also sensitive to noise. A random firing of the input 25i would cause noisy fluctuations in the voter connection 30a. Usually the delay 97 is several clock cycles to prevent the circuit from being too noise sensitive.

The change sensitive circuit 98 is one of many such circuits. The important characteristic of a change sensitive circuit is that an input signal 25 arrives at a voter 75 via two paths, one which drains current and one which adds current. If one signal is delayed from the other, the circuit becomes change sensitive. Indeed, multi-level circuits (such as those described on p. 22 of U.S. Pat. No. 4,479,241 by the present inventor) spontaneously form change-sensitive paths through subcircuits when delays such as delay 68b are included. Similarly, when both the signal and its negation (for example, "horizontal" and "not horizontal") having different internal delays 68b are both input to the same voter circuit as previously discussed, conditions are ripe for spontaneously forming change-sensitive circuits. The methods now discussed for making change-sensitive circuits by either proper choice of the branch function which accumulates or by circuit modification improves the sensitivity to respond to changes in the input patterns, either static or time-varying.

Burst Filters

Burst filters are more complex time functions on which branch functions are based. In the change sensitive circuits described above, time delays 68b in the DAC 60 (FIGS. 6A and 6B), were used to sensitize the self-organizing circuit 1 to changes of the signals relayed between its node circuits 77. The delays 68b can also perform another important function of self-organizing circuits: burst filters. Burst filters assure random or short cyclical firings (or non-firings) of surrounding nodes 77 do not cause learning (changing the weights of DACs 60). Learning should only be caused by relatively consistent firings (or non-firings) of surrounding circuits 77.

Burst filters are also needed in the recognizing mode where inconsistent inputs 25 from surrounding nodes 77 are prevented from causing changes in circuit 77. The delay filter 52 (FIG. 5C) is often sufficient at preventing node circuits 77 from firing due to random inputs 25: random firings of an input 25 are attenuated by its associated delay filter 52. Only consistently firing inputs 25 (those which fire many times in a row) can penetrate the delay filter 52. Note, however, that the first order filter 52 cannot always prevent randomly firing inputs 25 from triggering circuits 77.

Hence, burst filters 300 (FIG. 10) are valuable in two different applications in self-organizing circuits 1. First, they are used in the learning mode, where they prevent weight changes between inconsistently firing circuits 77. Second, they are used in the recognition mode to better attenuate randomly firing circuits 77. Burst filters require bursts of firings from a node 77 before signals are acted on—either by the learning (weight modification) circuits or by other circuits 77 during the recognition mode. In either application, the filter may be implemented as either analog circuitry or as digital algorithms, depending on whether the learning mode and the recognition mode have been implemented in hardware or software. The preferred embodiment is for the learning (modifying the binary number stored in DAC counters 67) to be implemented by a computer such as external source 9, while the recognition (determining the state of outputs 26) is implemented in hardware. However, a person skilled in the art could envision alternative embodiments.

An analog burst filter is simply a higher order filter 52 (FIG. 5E) than the simple first order filter shown in FIG. 5C. Burst filters belong to a class of filters called low-pass filters: they pass lower frequency information but attenuate higher frequency information. Filters with a sharp cutoff between the low frequencies passed and the high frequencies attenuated are the preferred embodiment of burst filters. In the discussion which follows, burst filters are used to reduce the effects of inconsistently firing nodes 77. Inconsistent firing means those firing randomly due to noise currents (see Uncertainty), those which are non-firing but which occasionally fire, those which are firing but which occasionally don't fire, as well as those with short cyclical cycles (periods typically less than 10 T).

Figure 10:
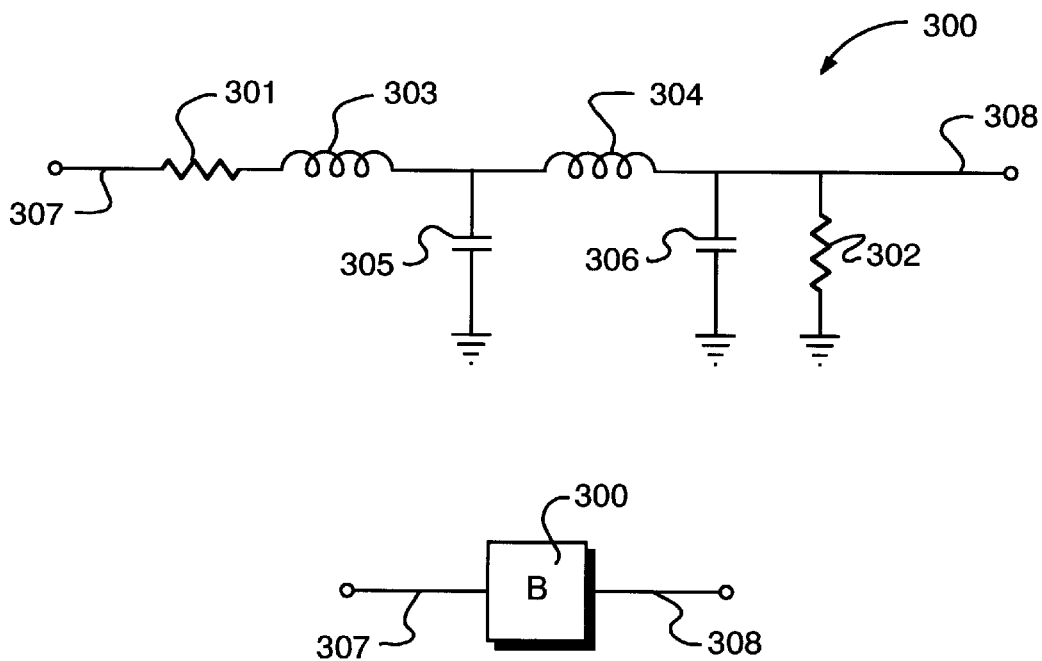
FIG. 10 is a diagrammatic representation of a filter used in conjunction with the circuit of FIG. 7A whose shorthand symbol is also shown.

Shown in FIG. 10 is a passive low-pass filter 300 with sharp cutoff; resistors 301, 302 inductors 303, 304 and capacitors 305, 306 are sized to allow a few pulses from a firing circuit to be attenuated, while a burst of many firings in succession passes through the filter. A burst filter may also be produced using active elements such as op-amps. FIG. 10 also shows the shorthand symbol for the burst filter 300 with connection 307 as input and connection 308 as output. Note that dendritic spines of biological neurons are thought to serve as burst filters in living organisms.

Burst filters 300 used in the recognition mode replace the simple first order filter 52 (FIG. 5C) in the generalized delay 68b (FIG. 6A) of the DAC 60 (FIG. 6B). When used in a DAC 60 of a node 77, the inputs 25 are burst filtered before they affect the outcome of the voting circuit 75. Only bursts of firings at the inputs 25 allow the output 26 of circuit 77 to change.

To prevent randomly firing input 25 from influencing the learning mode of circuit 77, burst filters 300 incorporated into DACs 60 also assure that the branch circuitry 83 and 90 (FIGS. 8A and 8B) only respond to bursts of firing or non-firing inputs 25i. Alternatively, burst filters 300 can be added to the branch circuits 83 and 90 so that accumulations of the branch function are based on consistent firings or non-firings and not random ones.

Burst filters can be added in software as well as in hardware for those embodiments where the DACs 60 are rewarded or punished by a computer rather than by specialized circuitry as in FIGS. 8A and 8B. Burst filter algorithms (see Discrete Time Systems, Ch. 2,3, *Control and Dynamic Systems*, Takahashi, Auslander and Rabins, Addison-Wesley, Reading, Mass., 1970) are generally of the form:

$$Z|_{t+T} = P Z|_t + Q \, IF(Y)|_t \qquad (7)$$

$$M = SUMT[Z] \qquad (8)$$

where:

$Z|_t$ are the values of an 1xn discrete-time state vector at various discrete time steps T; one of the states is chosen to be the output M $Z|_{t+T}$ are the values of the same state vector one time step later than t P is an nxn dimension state matrix with matrix values chosen to pass primarily frequencies of Y below a certain value Q is an 1xn input vector $Y|_t$ is the Boolean input at time steps T where IF(Y)=1 if Y fires and IF(Y)=0 if it doesn't fire n is the order of the state system and determines how sharply higher frequencies are rejected SUMT is the time summation over the period P M is the node's time filter function When burst filters are implemented as a learning algorithm, the input Y to the burst filter is the firing of a branch input 25. One of the states of the vector Z is chosen to be either the B value (branch function) or the B' value (modified branch function) discussed earlier.

Combined Filters

Combined filters are functions which combine both time summation functions and time difference functions. Preferred embodiments of the combined filter branch function combine burst filters with change sensitive functions (see Change Sensitive Functions). Below is a combined filter which combines an n=4 burst filter shown in Eqn. 7 with a change sensitive function similar to Eqn. 6. It operates as a band-pass digital filter: it is insensitive to very quick changes and also to very slow changes, but it is sensitive to changes of intermediate duration.

$$Z_1|_{t+T} = (((T_1 - 1) * Z_1) + IF(Y))/T_1 \qquad (9)$$

$$Z_2|_{t+T} = (((T_1 - 1) * Z_2) + Z_1|_{t+T})/T_1$$

$$Z_3|_{t+T} = (((T_1 - 1) * Z_3) + Z_2|_{t+T})/T_1$$

$$Z_4|_{t+T} = (((T_2 - 1) * Z_4) + Z_3|_{t+T})/T_2$$

$$M = SUMT[ABS(Z_3 - Z_4) - M_{TH}] \quad \text{IF } ABS(Z_3 - Z_4) > M_{TH}$$

$$M = 0 \quad \text{IF } ABS(Z_3 - Z_4) < M_{TH}$$

where:

Y is the input 25j of circuit i from branch j at time t $Z_1, Z_2, Z_3, Z_4$ are the filtered values of Y at time t $Z_1|_{t+T}$, $Z_2|_{t+T}$, etc. are the values of $Z_1$, $Z_2$, etc. at a previous time step $M_{TH}$ is threshold value which ABS(Z3–Z4) must exceed for branch j to compete SUMT is a time summation over the period P $T_1$ $T_2$ are time constants of the digital filter M is the combined filter function In this combined filter, an order 4 (n=4, Eqn. 8) state vector $Z_1$, $Z_2$, $Z_3$ and $Z_4$ operates on the input IF(Y). The states are combined to give a burst filtered, change-sensitive time function M in which only those values of M which exceed the threshold $M_{TH}$ compete at all. Typically the threshold value ($M_{TH}$) is 50% or more of maximum M resulting from a step change to an input 25. The absolute value function assures that input Y can change from either firing to non-firing or from non-firing to firing with the same result.

Now suppose that the value of the combined filter function M were used as the branch function as a way to modify branch DAC 60 weights. M in Eqn. 9 identifies those branch inputs 25 which change and stay changed for several $T_1$ time constants. Randomly changing inputs and cyclically changing branch inputs with bandwidth greater than $1/T_1$ (where $T_1$ is typically 5 T to 10 T) all have branches whose M values would not compete effectively (see Uncertainty and Direct Feedback). In addition, inputs which do not change for a very long time ($T_2$ is generally 20 T or longer) also have low M scores and do not compete effectively.

Figure 11:
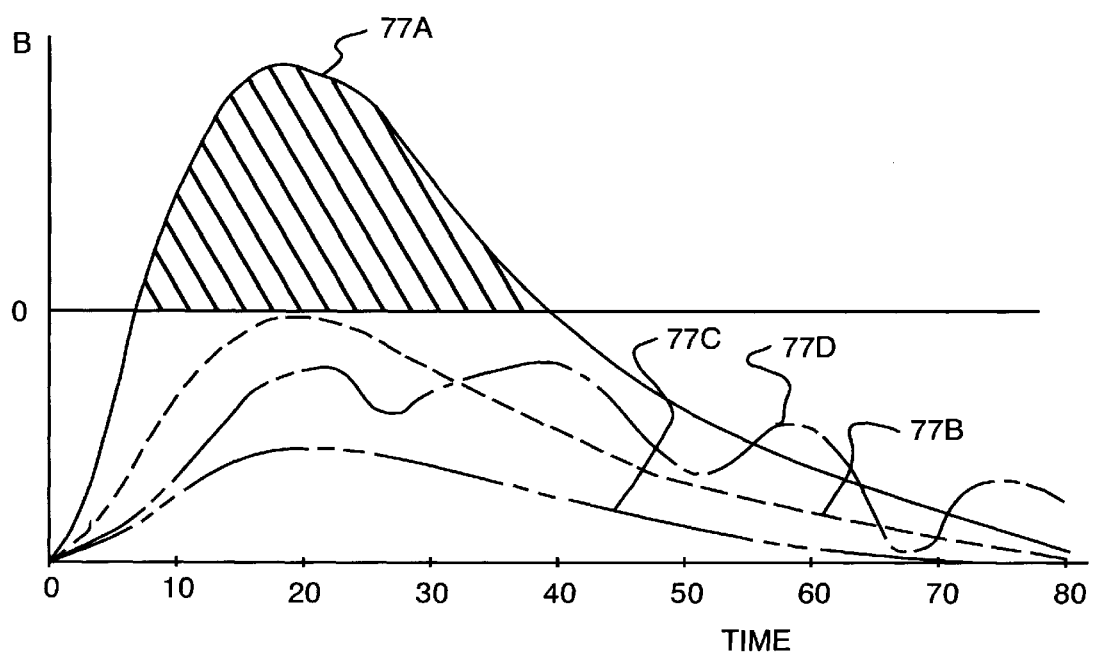
FIG. 11 shows the time response of a combined change-sensitive and burst filter to four inputs: step function, random input, and two types of cyclical inputs.

FIG. 11 shows how the M function changes with time for nodes 77 having various types of firing sequences (the period P is equal to the clock cycle T and the nodes have been non-firing prior to the time shown on the figure). Again, the M function is used as a branch function to choose how branches should have their weights incremented. Node 77A has a step change in output state 26: it changes from non-firing to firing and stays that way. Initially, the function increases at a rate based on the time constant $T_1$ toward a maximum value. Then it falls off toward zero again at a rate based on the time constant $T_2$. Only that cross-hatched portion of M above the threshold $M_{TH}$ applies in the competition for weight changes. In this example, M exceeds the threshold for thirty clock cycles.

On the other hand, the response of the other three nodes 77B, 77C, and 77D never exceed the threshold; these branches would not participate in weight increases. Nodes 77B and 77C change cyclically: 77B fires for 2 T and then doesn't fire for 2 T; 77C fires for 1 T and then doesn't fire for 3 T. Their M function never exceeds the threshold and do not compete for DAC weight increases. Node 77D changes randomly at every clock cycle r, either firing or not firing with equal probability. Its M value never exceeds the threshold and it does not compete. If all four nodes were node branches, only the branch associated with node 77A would compete well enough to have its connection strength changed.

Memory Traces

To better separate out the temporal and spatial dependencies of how node circuits 77 allow the self-organizing circuit 1 to identify patterns of input signals 2 and to distinguish among various sets of input signals 2 (FIG. 1), the concept of a "memory trace" defines those nodes which meet the proper temporal criterion. Once this important temporal criterion has been established, then the spatial relationships can be more easily understood.

A "memory trace" is a term used in the tradition of early brain researchers of the last half century. Hebb, in his landmark book (*The Organization of Behavior*, Donald O. Hebb, John Wiley, 1949, Chpt. 4) described a memory trace as a "transient, reverberatory circuit" that is "wholly a function of a pattern of neural activity." Rosenblatt, the father of the perceptron, referred to memory traces as related to the "wiring diagram" of the nervous system (F. Rosenblatt, "The perceptron: a probabilistic model of information storage and organization in the brain", Psychological Review, V 65: 386–408, 1958). Wooldridge (Cal Tech professor and founder of TRW) described memory traces as the storage of memories—the place where memories are recorded (*The Machinery of the Brain*, Dean E. Wooldridge, McGraw-Hill, 1963). Anderson (UCLA professor) described a memory trace as the pattern of individual activities of an entire group of neurons with simultaneous activity (James A. Anderson, "A simple neural network generating an interactive memory," Mathematical Biosciences, V 14: 197–220, 1972).

In the context of the present invention, a memory trace has a similar meaning: it is the circuits 77 which are activated by a particular pattern of input signals 2. The memory trace is composed of the "changed nodes" (those which change state) when the input pattern 2 is applied to the network 1. In the preferred embodiment, memory traces are simply those nodes 77 whose filter function M is non-zero. In the following discussion, the variable M will be called the memory trace function to better understand the concepts addressed.

TUNNELING AND DENSIFYING

"Tunneling" and "densifying" elucidate how time functions such as the memory trace function M can be used to produce memory traces and thereby improve pattern recognition in circuit 1. Tunneling and densifying are a means by which a circuit 1 learns new input 2 patterns. Tunneling is a means by which a memory trace propagates from the inputs 2 of circuit 1 to produce output signals 3. In tunneling, competitive competition functions are typical: only one or a few of the branch inputs 25 of a node 77 are rewarded (see Competition).

Densifying is the logical opposite of tunneling. While tunneling is used to form a memory trace, densifying reinforces the changes produced by tunneling (see Association and Distinction). In densifying, cooperative competition functions reward many of the inputs 25 to a node 77 (see Cooperation). Tunneling uses the "incorrect" signal 6a or distinction signal 6b as universal signals. By contrast, densifying uses the "correct" signal 5a or the association signal 5b to direct the amount of weight increment.

Tunneling modifies the weights of unchanged nodes 77 which lie near a memory trace. The memory trace is a region of changed nodes 77 (M>0) which penetrates the unchanged nodes (M=0). Densifying modifies the connections between changed nodes 77 within the memory trace in a way which encourages the memory trace to persist, so long as the same input set 2 persists.

By analogy, tunneling is similar to an army's invasion into enemy territory. The attacker represents changed nodes 77 and the defender represents unchanged nodes 77. The attacker forms a thrust as it penetrates into the defender's territory—the memory trace. Like tunneling, the attacker directs the most effort at the point of penetration. Densifying is similar to the army's reinforcement of its conquered territory. Once the memory trace is conquered, connections are made between units within it to reinforce each other. The reinforcement assures that each part of the memory trace helps its neighboring units withstand assaults by other attackers.

Tunneling

To understand tunneling, consider a circuit 1a (FIGS. 12) composed of nodes 77 of levels 21A . . . 21N whose purpose is to respond to changes of the input set 2 composed of inputs 2a . . . 2n corresponding to the input pattern 11. For simplicity, the input set 2 has been chosen to be the input set 25a . . . 25n of the examples previously discussed: the components of the letters of the alphabet such as left slant 2a, right slant 2b, horizontal 2c and vertical 2n. In the circuit 1a, no preprocessor circuit 20 or sensors 10 are used since the component inputs 2 have already been identified; input patterns 11 are the same as the input set 2a . . . 2n.

The network of nodes 77 in this circuit 1a is directed from lower level 21A to higher level 21N. That is, the connections from any particular level 21 come primarily from the same level 21 or from lower levels. Each branch input 25 of each node 77 has the preferred embodiment of the branch function M shown earlier (see Combined Filters). The M function lets only those inputs which change compete for DAC 60 weight increases, but the change must be neither too quick, nor too slow.

Let the nodes 77 of circuit 1a have bias and clip values (see Bias and Clip) which produce a mix of both change-sensitive nodes as well as change-insensitive nodes. Assume at least a few inputs 25 to each node 77 have already formed large binary numbers in their DACs 60 from previous learning experiences (see Addendum). Assume also that connections between nodes are local ones: the branch inputs 25 to any node are from other nearby nodes. A node 77 is much more likely to have connections from an adjacent node 77 than to have connections from a more distant neighbors. Further, let the output nodes (the nodes 77 of the highest level 21N of circuit whose outputs 26 are output signals 3) be inhibiting to other output nodes. That is, when an output node 77 fires, its firing draws current from the voters 75 of the other output nodes 77, tending to prevent them from firing. The result is that one, and only one, of the outputs 3 of level 21N tends to fire.

In FIG. 12A, each small square represents the state (firing nodes are black and non-firing nodes are white) of an input 2 or an output 26 of a node circuit 77. The leftmost column represents the input pattern 11 (that is, the input set 2). The second through last columns represent the outputs 26 of level circuits 21 like that shown in FIG. 7A: the second column shows level 21A outputs 26 and the rightmost column shows the output set 3.

For any particular input pattern 11, the output states 26 of the nodes 77 of level circuits 21 will form a stable pattern. Shown in FIG. 12A is a typical stable pattern representing the null set: no inputs 2 are firing (no black squares in the left-hand column). In the pattern produced by firing and non-firing nodes 77, the non-firing nodes are just as important in producing the pattern as the firing nodes (see Non-firing Nodes). Notice that a stable pattern forms even when there are no inputs 2 present. Since some of the nodes 77 act like Boolean NOT functions (NOR, NAND or XNOR functions), even when their inputs 25 fire, the node 77 may not fire because its threshold current prevents it from firing.

The null pattern shown in FIG. 12A is the "background pattern" against which change is measured. The null pattern was one chosen for convenience only. Indeed, the background pattern can be any pattern from which a difference is detected. It is not the pattern itself which is important, but rather, the changes from this pattern, as measured by the memory trace function M, which direct learning behavior of the self-organizing circuit 1a.

Now consider the case where a "new" pattern 11 is learned. The new pattern 11 represents the letter "A". As before, the "A" has inputs 2a, 2b, and 2c from its three major components, slant left "/", slant right "\" and horizontal "−". Recall that nodes 77 in the circuit 1a are a mix of both change-sensitive nodes and change-insensitive nodes. When inputs 2a, 2b and 2c change, some of the surrounding nodes 77 are likely to be change-sensitive and change when the inputs change. For instance, a node 77d in level 21A (the second column) might, by happenstance, be an AND-like node 77 which required the input 25 from node 2c to fire. Without the input 2c, node 77d doesn't fire but with input 2c, it does fire: it changes state from non-firing to firing. Other nearby nodes in the levels 21A and 21B also change state when the input set 2 for "A" is presented. Some of these changes in turn produce a change in levels 21C and 21D as the change propagates to higher levels (rightward in FIG. 12A).

However the changes at 2a, 2b and 2c do not likely propagate all the way to the output level 21N (output column 3, the rightmost column). While many of the nodes 77 are change-sensitive, many are not. The nodes which are not change-sensitive tend to prevent change from cascading to higher levels 21. With a mix of both types of nodes, a few input changes (like 2a, 2b, and 2c) do not usually propagate far into the circuit 1a.

After many time steps T, the network of nodes 77 might look like that in FIG. 12B. Shown here is not the state of the nodes 77 (i.e., whether they fired or not), but rather how they changed from the background state of FIG. 12A. A small black square represents a node 77 which changed from firing to non-firing or from non-firing to firing; a small white square represents a node 77 which did not change state. Note that the inputs 2a, 2b and 2c (in the leftmost column) are all black squares: they change from not-firing to firing.

The path of changed black squares from left to right is the memory trace. It represents how far the change in the input pattern 11 has progressed toward changing an output 3 (the rightmost column). Without tunneling, the memory trace will not likely progress very far since change-insensitive nodes 77 tend to absorb any changes to their inputs 25. Tunneling uses the memory trace function M to destabilize nodes 77 on the memory trace shown in FIG. 12B (see Stabilizing and Destabilizing). Those unchanged nodes 77 (white squares in FIG. 12B) which have inputs from the changed nodes 77 (black squares) will have high M values: their inputs 25 (the IF(Y) term in Eqn. 10) will have changed state. Since the network of circuit 1a is directed rightward, nodes such as nodes 77k will be destabilized.

As nodes 77k are destabilized, their Fill is altered in a way to make their Fill change sign. The appropriate weights are incremented as in Eqn. 5 (where U=−1 for destabilizing), driving the nodes 77k to change state. If their Fill is positive (firing nodes) weights or thresholds are incremented negatively to drive them toward changing state (toward not firing). If their Fill is negative (non-firing nodes), weights or thresholds are incremented positively to drive them toward changing to the firing state. Once one or more nodes 77k surrounding the end of the memory trace changes state, then other nodes 77 to the right of these now-changed nodes 77k will also likely change. The rightward path of black squares proceeds, triggering more rightward nodes 77 to change. The memory trace progresses for a level or two rightward and then the tunneling process begins anew on other nearby nodes 77 in an effort to destabilize them and add to the memory trace. A nearby node 77 sometimes changes due to its inputs 25 changing and sometimes due to new weights destabilizing them.

Often many presentations of the new input pattern 11 (e.g., the inputs for "A") are required to complete a memory trace path from an input 2 change to an output 3 change. The most efficient learning occurs when the new pattern 11 and the background pattern 11 are presented alternately. When the background pattern 11 is presented, the nodes 77 which formed the memory trace revert back to their original states (as shown in FIG. 12A). After the switch in patterns 11, the M values are recomputed. They are high for the nodes which had been on the memory trace: the same memory trace path as before, but now the change is from the new pattern 11 to the background one. Again, increments of weights are added in a way that destabilizes unchanged nodes 77 near the memory trace tip. If destabilized enough, the unchanged nodes 77 change state and the memory trace path grows rightward again.

When the background pattern 11 is presented as inputs 2, occasionally some of the nodes 77 do not revert to the original background pattern. If so, this newest background pattern becomes the background pattern. The background pattern, then, is simply whatever pattern of outputs 26 of nodes 77 result when the original pattern 11 is presented.

By switching back and forth between the original pattern 11 and the new pattern 11, the appropriate nodes are destabilized and change state until eventually the memory trace progresses far enough rightward that the output 3 state changes (as shown in FIG. 13B). Soon the memory trace function M has sensitized the circuit 1a to just those differences that represent the components of the letter "A". By using tunneling the changed inputs 2 destabilize surrounding nodes that eventually cut a path—the memory trace—to the output column 3. Indeed, our own brains operate in the same way. When we wish to distinguish a pattern, we take the closest similar pattern and focus our attention on just those components that distinguish the two. Then we shift back and forth between the two patterns until we learn how to separate the two.

When two input patterns 11 which differ only slightly are to distinguished, one of the resulting patterns of nodes 77 is used as the background pattern rather than using the null background pattern. For instance, to distinguish a letter "A" from the letter "V" let the background pattern be that produced when the letter "A" input set is presented. After many time steps, the M function will drop to zero and the background pattern becomes the one shown in FIG. 13A: the "A" node pattern. Then when the "V" input pattern is presented, the only change between the "A" pattern and the "V" pattern is the horizontal, input 2c. It is only the input 2c which produces a memory trace that eventually tunnels across to the output column—a memory trace which represents the difference between the "A" node 77 pattern and the "V" node 77 pattern.

Note that tunneling works as well for time-varying patterns 11 as for static patterns 11. In time-varying patterns 11, both the outputs 26 of nodes 77 (as in FIGS. 12A and 13A) and the changes of these outputs (as in FIGS. 12B and 13B) are time-varying. However, only slowly changing patterns 11 cause tunneling (changes which have a bandwidth less than 1/T1). For a time constant T1 on the order of 5 T to 10 T, only changes having a duration of 20 time steps (20 T) compete effectively enough to produce tunneling weight changes. Similarly, people require at least 20 pulses of a neuron (20 msec of 1 millisec pulses) to learn. Optic or auditory inputs (sights or sounds) which change faster than about 20 msec are difficult to perceive (e.g., movie frames).

Densifying

One application of densifying is to stabilize memory traces formed during distinction tasks. In tunneling, often the changed nodes 77 comprising the memory trace have Fill values which are only barely able to maintain a changed state of the node. Densifying uses a cooperative competition function to strengthen connections: the changed nodes 77 stabilize other changed nodes 77.

For example, when the input pattern 11 for "A" is presented to the circuit 1a, the changed nodes 77 are the memory trace of FIG. 13B. Now when the output 3e fires, that correctly identifies the "A" input pattern 11 and actuates the universal reward signal 5a. Consider node 77n, one of the nodes in the memory trace. As viewed by node 77n, nearby nodes in the memory trace like 77m and 3e have high M values: they have recently changed state. According to Eqn. 6, the weights from nodes 77m and 3e will both increase toward $+W_{MAX}$ (X is positive and U is positive). When nodes 77m and 3e fire, they will add positive current to node 77n, tending to assure it will fire as well.

Densifying uses nodes in the memory trace to reinforce each other's firing or non-firing. In circuit 1a above, the firing of node 77n is not only strengthened by nodes 77m and 3e, but its firing can strengthen their firing. From the perspective of nodes 77m and 3e, node 77n represents a changed input 25: its M value is likely high and it would likely produce weight increases in the links from 77n to 77m and 3e. The effect is that more current is injected from node 77n when it changes, reinforces the firings of node 77m and 3e.

Non-firing nodes which have changed (such as node 77o) are also reinforced by firing nodes during densifying. In FIGS. 13A and 13B, node 77m is identified as a firing node which has changed. As an input 25 to node 77o, Eqn. 5 specifies that the current contributed by node 77m should grow more negative (U is positive and X is negative for 77o, so the weight grows toward $-W_{MAX}$). Again, the effect is stabilizing: driving the Fill of a non-firing node 77 more negative makes it even less likely to fire (see Stabilizing and Destabilizing).

The effect of densifying a memory trace such as the one in FIG. 13B is to make its changed nodes 77 act in concert. If several memory trace nodes 77 have a state consistent with their memory trace state (their state when they were densified), they tend to make the rest of the nodes in the memory trace change to their memory trace state as well. For example, in circuit 1a, if nodes 77m and 77n should change (say, due to an input 25 from a non-memory trace node), then other memory trace nodes (nodes 77o and 3e) tend to change too. Densifying assures that the nodes 77 which changed during tunneling are reinforced and can produce the same change in the future.

SPACE FUNCTIONS

A combination of space and time functions is used to identify topological structures in a generalized way. The functions depend on first identifying which nodes belong to the memory trace and which do not. Memory trace functions M identify the memory trace as the preferred embodiment: only nodes which have the proper temporal response belong to the memory trace. Temporal response here means the nodes 77 have the proper time-filtered outputs 26, such as those defined by M in Eqn. 8 and 9. M defines the temporal criteria for a memory trace much as Hebb's "transient, reverberatory circuit" defined his memory trace.

Once the temporal criteria for a memory trace is established, memory traces form various topological structures shown in FIG. 14 in a three dimensional array of nodes 77, each level 21 composed of a plane of rows 290 and columns 291. A "cluster" 303 forms when many nodes in a region all belong to the memory trace. Clusters 303 are similar to the "cell-assemblies" described by Hebb. A "root" is a tubular cluster whose cross-section dimensions are very small compared to its length. The narrow cross-section portion of a root is the "root stem" 304 while the end of a root is the "root tip" 302. The nodes which form the outer layer of a root or a cluster are called "skin" nodes; interior nodes of a root are called the "core" nodes. A "junction" is the intersection cluster of two or more roots. Roots form the circuitry of memory traces: they connect appropriate junctions together. Roots are similar to the "wiring" of Rosenblatt or the "projections" (parallel connections between groups of neurons) in the brain which Anderson describes.

The memory trace structures illustrated in FIG. 14 are shown for clarity as compact or "solid" groups of nodes. Each node within a root or cluster is shown immediately adjacent to other nodes; interior nodes are completely surrounded by other memory trace nodes. Such a portrayal helps elucidate the explanation which follows, but is not accurate. In addition to the tightly formed compact topologies shown in FIG. 14, memory traces can also be loose assemblies of nodes which contain non-trace nodes within their boundaries. As described in more detail later, memory trace nodes are surrounded and intertwine with nodes of other memory traces which do not happen to be activated (those whose memory trace function is currently zero). Memory trace topologies can also be "porous" where trace nodes are interspersed with non-trace nodes which are not activated at that moment but which may be activated by other input 2 patterns. The learning rules and equations discussed below are equally valid for solid and porous memory trace topologies with appropriate changes in thresholds and constants.

Space Difference Functions

Space difference functions are functions which are calculated by spatial differences between nodes near each other. Space difference functions have two styles: the summation style and the ranking style. The summation style determines the value of the function based on the summation of differences between the node and its surrounding nodes. It is used in calculating such variables as the gradient of a function. The ranking style ranks the surrounding nodes and chooses the one or more nodes having the highest value of the function's argument. It is used in direction-seeking functions where the greatest difference is required, say, to direct the growth of one memory trace toward another.

The summation style is the form:

$$D_i|_{t+P} = f_4(DIF_K(f_5(D_k, M_k, d_k, S_k)))|_t \quad (10)$$

where:

$M_k$ is the memory trace function identifying whether circuits 77k are in the memory trace (trace nodes have non-zer0. $M_k$ and non-trace nodes have zero $M_k$)

$d_k$ is a weighting given to each neighbor node k based on the distance and direction between the circuits 77i and 77k $S_k$ is a source variable of circuit 77k that drives the function $f_4, f_5$ are functional relationships $DIF_K$ is the difference operator which finds the sum of differences in its argument ($SUM_K$); its argument is the difference between the circuit 77i and each of the N neighboring circuits 77k of level circuits 21

$D_i, D_k$ are the values of the difference function of a circuit 77i, 77k $|_t$ indicates the values at time t $|_{t+P}$ indicates the values at time t+P Space difference functions can be iterative functions in that the value for a node can depend on the value of that same node at a previous time. The right hand side of Eqn. 10 are values taken at time t, but the result (the left hand side of Eqn. 10) occurs at time t+P, where P is the period P between successive calculations of $D_i$. By applying the equations over and over again, the values of $D_i$ converge to their final values.

Space functions use the subscript k to distinguish neighbor nodes k from branch nodes j used in branch functions. A node can have a set of k neighbor nodes which surround it, but have a different set of j branch nodes which are its branch inputs 25. Circuits 77k (i.e., node k) surrounding a particular circuit 77i (i.e., node i) for which the difference function is calculated can be deployed in many different 2-dimensional and 3-dimensional spatial arrangements. In two dimensions, rectangular arrays have each node surrounded by 4 neighbors (N=4), as shown in FIG. 2 where each level circuit 21 is composed of a vertical stack of node circuits 77. Two dimensional hexagonal arrays have each node surrounded by 6 neighbors (N=6). In three dimensions, face-centered-cubic arrays can give 6 neighbors (face adjacent nodes, N=6) or 26 neighbors (face, edge and corner adjacent nodes, N=26) which are more complex. Larger neighborhoods are often used when memory trace topologies are very porous.

The distance weighting term, $d_k$, is usually an inverse distance relationship such that the further the distance between the nodes i and k, the smaller the distance weighting factor. For example, with "distance squared" weighting in a three dimensional Cartesian network of nodes 77, the weight might be 0.500 for diagonally adjacent nodes in the same plane in a face-centered cubic arrangement but 1.000 for face adjacent nodes in the same plane. In calculating gradients of node variables, $d_k$ can also depend on the direction between the node i and its neighbor k.

$DIF_K$ is the difference operator which determines the differences between the argument of circuit 77i and the argument at a nearby circuit 77k. Once the difference in arguments has been determined, the differences are summed ($SUM_K$). For instance, in determining the gradient of a variable in a particular direction, the dot product of the neighbor's direction vector and the coordinate direction vector is summed ($SUM_K$) for each neighbor circuit 77k to give a weighted average of the argument in the vicinity of circuit 77i.

The second style of space difference function, the ranking style, is of the form:

$$q|_{t+P} = (MAX_{QN}(f_6(M_k, d_k, S_k)))|_t \qquad (11)$$

where:

$M_k$, $d_k$, $S_k$, $|_t$ and $|_{t+P}$ are as defined in Eqn. 10 above $f_6$ is a functional relationship $MAX_{QN}$ is the maximum operator which rank orders the N neighboring nodes into the Q largest values of the argument q is the identifier of the Q nodes having the largest values of the argument of $MAX_{QN}$, given in the coordinates of the circuit 101

The ranking style identifies which node (or nodes) maximize its argument by returning the coordinates of those nodes 77. For example, if the network 101 is Cartesian made up of rows, columns and levels of circuits 77 as in FIG. 14, the q function locates the proper node by its X, Y, Z coordinates. The ranking style is similar to the competition functions B discussed earlier (see Eqn. 1) except that the competition is among neighbor circuits which are spatially close rather than a competition among branch inputs 25. Like the competition functions, the ranking style of space difference function can be competitive or cooperative depending on the number Q of the N surrounding nodes which are chosen by the maximum operator $MAX_{QN}$. A very competitive $MAX_{QN}$ function chooses only a few of the N neighboring nodes (e.g., Q is one or two); a cooperative $MAX_{QN}$ function picks many of the neighboring nodes. Note that the minimum function ($MIN_{QN}$) is a subset of the maximum function ($MAX_{QN}$) where the argument is negated.

The two styles of space difference functions help self-organization by determining gradient functions and direction-seeking functions, both of which are common in nature. In living organisms, gradient equations drive an insect's direction sensing capability (as one antenna picks up different pheromone signals than the other); direction-seeking functions guide the growth of plant stems and roots (as some cells of the plant receive more light or nutrient than others).

Space Summation Functions

By comparison, the summation type of space function is calculated by spatial summations rather than spatial differences. Space summation functions have a similar form to the summation style space difference functions: they can be iterative equations, they depend upon whether or not a node is in the memory trace, they depend on the values of their argument at neighboring nodes and they depend upon source and distance values of the neighboring nodes. Their form is:

$$I_i|_{t+P} = f_7(SUM_K(f_8(I_k, M_k, d_k, S_k)))|_t \qquad (12)$$

where:

$M_k$, $d_k$, $S_k$, $|_t$ and $|_{t+P}$ are as defined in Eqn. 10 above $f_7$, $f_8$ are functional relationships $SUM_K$ is the summation operator taken over the N neighboring circuits 77k and may include the circuit 77i itself $I_i$, $I_k$ are the values of the summation function of a circuit 77i, 77k The "diffusion equations" for a discrete system are a subset of the space summation functions shown in Eqn. 12. The discrete diffusion equations, common in finite element analysis (FEA) of stress and temperature are iterative equations where the values at a circuit 77 "relax" toward their final values depending on the values of their surrounding circuits. While the difference functions emphasize differences between nearby nodes 77, the summation functions average the values of nearby nodes 77. Variables of a node "diffuse" or spread to other nodes in much the same way that a scent spreads from its source.

The diffusion equations are characterized by a source (or sink), $S_k$, that drives the function. Diffusion equations with a source variable are called Poisson functions; those without a source variable are called LaPlacian functions. In the chemical diffusion of perfume in a room, for instance, the points from which the perfume evaporates are the sources that drive the diffusion process according to Poisson equations. Points which have no liquid perfume follow LaPlacian equations: diffusion without sources.

SPACE FUNCTIONS AND MEMORY TRACES

Now consider various forms of the space difference and space summation functions which use a time function to identify memory trace topological structures and then produce better self-organizing of circuit 1 based upon these structures. In the preferred embodiment, these spatial functions depend first on the memory trace (memory trace function M). Is a node in a memory trace? Is its neighbor node in a trace? Some space functions apply to all nodes in the network, whether in the memory trace or not. Other space functions only apply to memory trace nodes and not to nodes outside of the memory trace. Still others apply to the non-trace nodes near trace nodes.

Close Function

The Close function is a space summation function which measures how many trace nodes are nearby: how many memory trace neighbors does each node have? Nodes both inside and outside a memory trace have Close values. A node buried inside a cluster, completely surrounded by trace nodes, has the lowest Close value. One on the surface of a cluster has a higher value, a root stem node has a still higher value, while a root tip node has a very high value of Close. The highest Close value is for an isolated node not near any other memory trace nodes.

An example Close function for a three-dimensional Cartesian array of circuits 77 is calculated by summing the neighbor nodes which surround a node in three dimensions. The Close function shown below is a simplified version of Eqn. 12 where the summation operator $SUM_K$ operates on $M_k$ and where the neighbor nodes are face, edge or corner adjacent nodes. Close is calculated by operating in 3 dimensions on the block of 27 nodes having the node i as its center (the 26 surrounding nodes plus the node i itself); any node in the memory trace adds to the sum:

$$C_i = 100 * (27 - SUM_K(M_k))/27 \quad (13)$$

where:

$M_k = 1$ if k is in the memory trace $M_k = 0$ if k is outside memory trace $C_i$ is the value of Close for node i As discussed above, the preferred memory trace function is the combined filter function (Eqn. 8 and 9) such that $M_k$ simply defines whether or not a circuit 77k is in the memory trace. The Close function determines how close, on the average, are other neighboring trace nodes. FIG. 14 shows C values for various locations in a three dimensional memory trace, scaled between 0 (surrounded trace node) and 100 (isolated non-trace node). The Close function is used in various aspects of organizing the circuit 1 to recognize and distinguish patterns.

Tip Function

The Tip function is based on Close and is useful in identifying the root tips where tunneling first occurs. Nodes identified by Tip destabilize non-trace nodes in their vicinity and cause them to become part of the memory trace (see Stabilizing and Destabilizing; Tunneling and Densifying). Just as living plants such as vines grow from "growth tips" so do the roots of memory traces; Tip identifies the nodes from which growing occurs.

Tip behaves like large molecules trapped by a cell membrane in living organisms. Large molecules are entrained by the flow of a small molecule such as water. The small molecules pass easily through the membrane while leaving the large molecules behind; the large molecules, like Tip, accumulate at the membrane's boundary. In this "filter" analogy, the large molecules are driven by the pressure gradient driving the flow of the small molecules; the pressure gradient is a space difference function. Like Tip, the large molecules will collect at the furthest downstream points on the membrane, much as pebbles in a brook are driven downstream.

Determining which nodes of a root are Tip nodes is composed of two parts. First, a "flow" function sets up a gradient from the root base to the root tip. Second, Tip uses the flow function as a source so that Tip accumulates at the root tips to identify the Tip nodes. One useful flow function is CD (Close Diffused), a space summation function. CD has a gradient down the length of the root: it is higher at a root base and lower at the root tip.

Computationally, CD is a function which only exists for those nodes within the memory trace (nodes where $M_i$ is non-zero); its space summation only applies to other memory trace nodes (nodes where $M_k$ is non-zero):

$$CD_i|_{t+P} = (SUM_K(CD_k) + (C_{TH} - C_i))/(N + K_3)|_t \text{ for nodes having } M_i > 0 \text{ and } M_k > 0 \quad (14)$$

where:

$C_i$ is the Close function defined in Eqn. 13

$C_{TH}$ is the desired threshold on Close $K_3$ is a constant

N is the number of surrounding neighbor nodes k $CD_i$, $CD_k$ are the values of Close Diffused for nodes i and k $M_i$, $M_k$ are the Boolean functions defining the memory trace $|_t$, $|_{t+P}$ and $SUM_K$ are as defined in Eqn. 10

CD, the Close Diffused function, diffuses only within the confines of the root. The threshold $C_{TH}$ is chosen to have a value between the Close value of a root tip and the Close value of the root stem. Junctions and clusters produce large positive CD sources, stem nodes produce smaller CD sources and the root tip nodes produce negative CD sources. This arrangement of sources produces a gradient which becomes more negative traversing from junctions toward the root tip. It is this gradient which drives the Tip from the junctions toward the root tips.

The Tip function is driven by CD, its flow function. Tip combines a summation style space difference function (Eqn. 10) with a time summation (accumulation) function such as Eqn. 1; Tip uses CD as the source variable $S_k$ to drive the space difference function. Tip, like CD, is a function which only exists inside the memory trace. A simple but useful Tip function is shown below using the CD function (Eqn. 14) as its source:

$$T_i|_{t+P} = T_i|_t + K_4 * SUM_K(T_k|_t) + TO \quad \text{for both } i \text{ and } k \quad (15)$$
$$\text{in the same trace}$$
$$(|W_k| > 0) \text{ and } CD_i < CD_k$$

$$T_k|_{t+P} = T_k|_t - K_4 * T_k|_t \quad \text{for both } i \text{ and } k$$
$$\text{in the same trace}$$
$$(|W_k| > 0) \text{ and } CD_i > Cd_k$$

$$\text{limited to the range: } 0 < T_i|_{t+P} < 100$$

where:

$CD_i$, $CD_k$ are the Close Diffused values for trace nodes i and k $K_4$ is a fraction TO is the source Tip added at each trace node i during each period P $T_i$, $T_k$ are the values of Tip, limited to the range between 0 and 100

The second term on the right side of the first equation of Eqn. 15 is some fraction of the Tip at the neighbor trace node k. Whenever the CD difference at trace node i is negative compared to node k (the i node is more downstream than the k node), this fraction is added to the node i and subtracted from the node k. Nodes i and k must both be in the trace. In addition, each trace node i produces an amount of Tip, TO, during each time period P, providing a constant supply of Tip to each trace node.

After many time periods P, Tip is passed from one memory trace node to another, accumulating in the one having the locally lowest CD value. "Locally" refers here to the tip of each root present; if two or more roots are present or if a root branches, they each collect Tip at the root tip. The values of pip are limited to the range between 0 and 100; nodes whose Tip value is 100 are identified as the tip of a memory trace root. Whether Tip accumulates each period P is determined by a space summation function, CD. Thus space differences and space summations are combined to identify a root tip.

To understand how Tip converges on the locally highest Close, consider the simple case of nodes on the stem and tip of a root as shown in FIG. 14. The node 302 and some of the other circuits 77 near it have a higher Close value than a threshold value $C_{TH}$ of, say, 60. Node 304 and other root stem nodes will have a Close value greater than the threshold $C_{TH}$. Thus the source values in Eqn. 14 will be negative at the root tip and positive elsewhere in the trace, producing a CD gradient toward the root tip. Values of CD will be highest in the interior of the cluster (as in node 305), will be lower on the root stem (as the node 304) and will finally turn negative at the root tip (as in node 302).

Assume the fraction $K_4$=0.5 and TO=5 (the Tip produced by each memory trace node) during the period P. If the Tip of a node has a smaller CD value than its trace neighbor, half of its Tip is transferred to the neighbor: stem node 304 receives rip from interior node 305; tip node 306 receives Tip from stem node 304. Hence Tip is transferred to node 302 from its neighbor nodes on the root tip. As time goes on, more and more rip accumulates in node 302 as it is transferred from nearby nodes with higher CD; other root tip nodes are depleted as Tip is transferred to circuits 77 with lower CD values.

The equation for Tip (Eqn. 15) is unstable: if a trace node has the lowest CD in its neighborhood, it receives more and more Tip until it exceeds the limit on rip. Tip is driven toward those trace nodes having the lowest CD (those surrounded by the fewest trace neighbors) and away from those nodes having a higher CD (those surrounded by more trace neighbors). Since CD values are always lower at the tip of a memory trace root than on its stem, root tip nodes such as node 302 accumulate Tip. Soon only the root tip node with the very highest local CD value has a Tip value of 100. Surrounding nodes have lower Tip values: their Tip is depleted by neighboring nodes with lower CD.

The result is that those nodes which have Close values less than the threshold $C_{TH}$, transfer their Tip to the node with the lowest CD value where it accumulates and eventually saturates to a Tip value of 100. Hence, the Tip function identifies those nodes (nodes with Tip=100) which have the highest local convexity: the root tips. As memory traces grow, much of the growth occurs from these tips of memory trace root stems. It is saturated Tip nodes (Tip=100) which destabilize surrounding non-trace nodes, extending the root as new nodes are added to the memory trace.

Note that once tunneling proceeds to adjacent nodes, the tunneling node's Close value decreases (it is surrounded by more trace and fewer non-trace nodes); no longer is it the one with highest Close. Rather, the newest memory trace node (the node just tunneled to) has the highest Close value of any nodes nearby. It accumulates Tip, saturates, and thus is identified as a root tip node; it then tunnels to its non-trace neighbor nodes as the process of extending the memory trace root repeats.

MD Function

MD is the function "Memory trace Diffused"—a diffusion function that is a variation of the space summation function (Eqn. 12) using the memory trace function M as the source $S_k$. The MD function guides the root-making process so that roots will be attracted toward other memory trace roots and clusters in the network of circuits 77. Basically, all memory trace nodes (circuits 77 having a non-zero M value) produce MD. The MD spreads by diffusion through the non-trace nodes (circuits 77 having a zero M value). In developing organisms, MD is similar to a "guidance molecule" whose concentration gradient guides embryonic nerve fibers to inervate specific regions of the brain as the organism learns instincts.

A simple MD function is:

$$MD_i|_{t+P}=(SUM_K(MD_k)+M_i)/(N+K_5)|_t \qquad (16)$$

where:

$M_i$ is the source M which defines the memory trace $K_5$ is a constant

N is the number of surrounding neighbor nodes k $MD_i$, $MD_k$ are the values of B Diffused for nodes i and k $|_t$, $|_{t+P}$ and $SUM_K$ are as defined in Eqn. 10 and 11 above In the non-trace nodes where there is no source $M_i$, Eqn. 15 is characterized by its constant, $K_5$, which is a measure of how much MD is absorbed by non-trace nodes. The reciprocal of $K_5$ (1/$K_5$) in a space summation function is analogous to the time constant of a time summation function (such as $T_1$ and $T_2$ of Eqn. 9). Each describes how quickly its associated variable decays in its respective domain, space or time. If $K_5$ is small compared to N, there is little absorption by non-trace nodes and MD spreads without loss to surrounding nodes quite far from the MD sources (the trace nodes). If $K_5$ is large compared to N, then MD is easily absorbed by non-trace nodes and spreads only to the non-trace nodes in the close vicinity of the trace node sources.

FIG. 15A shows a 3-dimensional network of nodes 77 which has a memory trace root 310 in the output layer 21N along one corner of the network 101. The circuits 77 of the root 310 have MD sources ($M_i$ in Eqn. 16). The MD function diffuses from these sources throughout the non-trace circuits 77 of network 101. FIG. 15B shows a cross-sectional view of the network 101 cut by the plane 311. If a line 312 is projected from the MD sources of root 310 on plane 311, the variation of MD is shown in FIG. 15B. Nodes close to the root have high MD values while nodes farther from root 310 have progressively lower and lower values of MD. Notice that for low values of the constant $K_5$, MD falls off slowly with distance from the root 310; with a high $K_5$ value, MD drops off quickly with distance from the root 310.

ROOT STEERING

To make connections with other roots, a root must steer toward other roots. Since other roots are sources of MD (Memory trace Diffused), picking the direction of the non-trace nodes having the maximum MD steers the growing root toward another root. Said another way, roots give off a "scent" that attracts other roots. That scent is called MD and growing roots are attracted to the scent.

The root steers toward another root by choosing the direction of the next new node which will be added to the tip of the growing root. Steering is done by two different methods of choosing the next new node: picking the new node which has the highest MD (and is therefore the one closest to the root source) and picking the node whose direction most closely matches that of the MD gradient.

Maximum MD Targeting

As noted earlier, Tip nodes (memory trace circuits 77 which accumulate Tip) destabilize the non-trace nodes around them. These non-trace nodes are called "target" nodes because they are targeted for destabilization by a Tip node. In the first method of choosing target nodes, the non-trace nodes surrounding each Tip node having the highest MD are chosen; these are the ones that are closest to the MD source (the attracting root). In the second method, the non-trace nodes chosen are the ones whose direction from the Tip node most closely matches the direction of the MD gradient of that node.

In targeting the non-trace nodes with the highest MD, the ranking style of space difference function (Eqn. 11) finds which non-trace circuits 77 have both the highest MD values for each saturated Tip node (T=100) and the lowest WTSUM values:

$$q|_{t+P} = (MAX_{QN}(MD_k) * MIN_{QN}(WTSUM_k))|_t \quad (17)$$

for all non-trace nodes $k$ ($M_k = 0$) neighboring each Tip node ($T = 100$)

where:
- $MD_k$ is calculated for each non-trace neighbor k of each Tip node
- $WTSUM_k$ is the either the weight balance or the firing balance of node k
- q are the Q target nodes for that Tip node The $WTSUM_k$ term is the sum of DAC 60 weights of potential target nodes. The summation is the weight balance (sum of DAC 60 weights, see Weight Balance). Minimizing $WTSUM_k$ assures that target nodes are not part of another root.

Each root in the network will have at least one Tip node which saturates. Each Tip node may have Q associated target nodes. For clarity of illustration, consider only one of these target nodes. FIG. 16A illustrates such a root 322 growing in the network 101 of circuits 77 toward root 320 cut by plane 321 from level 21A to level 21N. The cross-section of the network 101 is shown in FIG. 16B where each node is indicated by a cell; the growing root 322 and the source root 320 are cross-hatched cells. The Tip node 323 is shown at the end of root 322. A line from Tip node 123 to the root 320 is the direction in which root 322 should steer to make a connection with root 320.

FIG. 16C shows a detailed view of the root 322 and its surrounding nodes for the plane of nodes furthest from the viewer. Trace nodes (M>0) are lightly cross-hatched, non-trace nodes are not. The Close values of the trace nodes of the root 322 are indicated on each node. These Close values drive the Tip of the highest Close node 323 to saturate at T=100, identifying it as a Tip node. When the root 322 tunnels toward root 320, Tip node 323 destabilizes its neighboring nodes. For simplicity, adjacent nodes 325–329 in plane 321 will only be considered as potential target nodes to Tip node 323. Also assume that no other roots have grown in circuit 101 (FIG. 16A) so that $WTSUM_k$ is zero for all non-trace nodes shown. In a more realistic situation, nodes in the planes behind and in front of plane 321 are also neighboring nodes and growing root 322 might have to avoid other roots as it steers toward root 320.

As MD diffuses from the source root 320, the values of MD grow larger the closer to the source root 320: toward the right and toward the top in FIG. 16C. Applying Eqn. 17 to the nodes 325–329 identifies node 326 as the target node: the node with the largest MD value and smallest $WTSUM_k$ value. It is this node which will be destabilized as the root 322 grows its next increment.

MD Gradient Targeting

The second method of choosing a target node uses the gradient vector of MD found by applying the summation style of the space difference equation (Eqn. 10) to each Cartesian coordinate. Below gradient equations are shown for a three dimensional network:

$$GMDx_i|_{t+P} = SUM_K(MDx_i - MDx_k) * dx_k)|_t$$

$$GMDy_i|_{t+P} = SUM_K(MDy_i - MDy_k) * dy_k)|_t$$

$$GMDz_i|_{t+P} = SUM_K(MDz_i - MDz_k) * dz_k)|_t \quad (18)$$

where:
- $MDx_k$, $MDy_k$, $MDz_k$ are the x, y, z components of MD for the node k
- $MDx_i$, $MDy_i$, $MDz_i$ are the x, y, z components of MD for the node i
- $dx_k$, $dy_k$, $dz_k$ are the x, y, z components of distance vector from node i to node k
- $GMDx_i|_{t+P}$, $GMDy_i|_{t+P}$, $GMDz_i|_{t+P}$ are the x, y, z components of the MD gradient FIG. 16C indicates MD gradient values (shown as GR) for the nodes 325–329 immediately adjacent to the Tip node 323. The angle between the gradient vector and the distance vector (the vector specifying the distance from node i to node k) can be calculated by the scalar product relationship for the two dimensions (x and y) of this illustration:

$$ANGLE_k|_{t+P} = ARCCOS((GMDx_k * dx_k + GMDy_k * dy_k) / (ABS(GMD) * ABS(d)))|_t \quad (19)$$

where:
- ABS(GMD) is the length of the MD gradient vector
- ABS(d) is the length of the distance vector
- $ANGLE_k$ is the angle between the MD gradient vector and the distance vector Finally, a ranking style space difference equation determines the smallest angle between the MD gradient vector and the direction vector between the Tip node and the non-trace nodes neighboring the Tip node, while also minimizing the sum of the DAC 60 weights:

$$q|_{t+P} = (MIN_{MN}(ANGLE_k) * MIN_{MN}(WTSUM_k))|_t \quad (20)$$

for all non-trace nodes k neighboring each Tip node

The Q nodes identified by Eqn. 20 ($q|_{t+P}$) are non-trace nodes whose direction from the Tip node most closely matches the direction of the MD gradient, but which have the minimum $WTSUM_k$ (zero for this illustration). As in Eqn. 17, choosing the proper target nodes steers the growing root toward sources of MD while avoiding other roots (identified by a large $WTSUM_k$). For FIG. 16C, the node 326 would again be chosen as the target node. Target nodes can be found by the maximum MD method of Eqn. 17 or the MD gradient method of Eqn. 20.

Root Paths

The process by which a targeted node becomes incorporated into the root is described in Eqn. 5 (see Stabilizing and Destabilizing) for the general case. However for roots to associate and distinguish patterns optimally, the paths formed by roots as they destabilize target nodes should have specific characteristics. Roots should form connections with other nodes in the proper sequential manner to assure that information propagates down the length of the root.

Changes which occur at the root origin propagate toward the root termination in a wave-like manner much like the pulsating motion of the peristaltic wave of the esophagus during a swallow. In the preferred embodiment, some of the node circuits 77 act as relaxation oscillators where the output 26 of the circuit feeds directly back to the input 25 (see Direct Feedback). As noted, such a circuit oscillates at a frequency determined by the size and delay of the feedback signal when its branch inputs 25 are large enough. As root building occurs, these inputs 25 necessarily come from previous nodes in the root—nodes which themselves were added to the root as its path progressed.

For the root to have wave-like propagation of change down its length, each targeted node must have connections (inputs 25) only from nearby nodes of the same root. As the root grows, the target nodes make connections with the closest root nodes of the newly formed root. Due to the oscillatory nature of some of the node circuits 77, the trace nodes at the root origin pulsate since they are either oscillatory themselves or have branches which are oscillatory. Consequently, each successive node farther along the root pulsates only if its inputs 25 are pulsating.

The nodes pulsate in a coordinated fashion such that pulses of changing nodes flow along the root from its origin to its termination. If the root is long enough and the input 2 lasts long enough, "waves" of changing nodes travel down the root, much as waves on a long taut rope travel down the length of the rope when the one end is oscillated. The term "activated" is used to describe a root whose nodes pulsate along its length. An activated root behaves in a similar manner to the axons of a neuron which is repeatedly firing: pulses of depolarization move wave-like down the length of the axon.

Once the target nodes in the right direction have been found, they are destabilized by the trace nodes closest to them. Destabilizing weight changes applied to a target node come from nodes already in the memory trace. The DACs 60 of a target node use a branch competition function to determine how much the number stored in the target node's DACs 60 will be incremented (see Competition). The branch function on which the DACs 60 compete is based, as before, on time-filtered functions such as the memory trace function M. Improved self-organization results when the competition is also based on space summation and space difference functions.

In one preferred embodiment, the branch function of a target node is modified based on four functions: Fill function, memory trace function, Close function and distance function:

$$B_j = M_j * C_j / d_j \quad \text{for Fill}_j > 0 \text{ and } M_j > 0 \qquad (21)$$

where:
Fill$_j$ is the net current to the voter 75 of the node identified by branch j
M$_j$ is the memory trace function for node of branch j
C$_j$ is the Close value for node of branch j
d$_j$ is the distance function for node of branch j
B$_j$ is the branch competition function for branch j
The subscript j refers here to the branches of the target node which is being destabilized, not the neighbors k used in space summation and space difference equations. The branches j which compete are associated with circuits 77 whose output 26 feed into the target node as firing inputs 25 (Fill$_j$>0). The nodes j (the target node's branch inputs 25) also have a memory trace function M$_j$ (defining whether the node is in a memory trace), Close function C$_j$ (defining how close the node is to other nearby trace nodes) and a distance function d$_j$ (determining the node's distance to the target node). In the preferred embodiment, only firing branches compete for weight increments. But since nodes can oscillate from firing to non-firing, branches which are not firing at one phase of the oscillation may be firing at another phase.

In this particular branch function (Eqn. 21), the competition for branches j of the target node will likely be won by those branches 25 whose associated nodes 77 are firing trace nodes (both Fill$_j$ and M$_j$ greater than zero), which are nearest the tip of the root (highest Close value) and which are closest to the target node (lowest distance d$_j$). This choice of branch function B lets the root grow in a directed fashion toward the MD source while assuring each target node's inputs 25 will be nearby firing trace nodes. As discussed in Stabilizing and Destabilizing, the branches j which win the branch competition have their weights incremented in a direction that drives the target node to the opposite Fill value so that it becomes part of the growing root. In tunneling, generally a competitive rather than a cooperative competition function is used, so only a few of the j trace branches would be chosen for weight incrementation (see Competition). B values determined by Eqn. 11 are later combined with other variables such as U and Fill in Eqn. 4 to produce a modified branch function B' used in weight modification.

Continuing with the details of the example, applying Eqn. 22 to the trace nodes in FIG. 16C gives the B values shown in each trace node cell. For simplicity, let the target node 326 have a negative bias value in DAC 74, initially requiring positive DAC 60 weights to change its output state. Also assume a very simplified competitive competition function where only two inputs 25 both come from plane 321 (in reality, other inputs 25 would likely come from other planes of the root). The nodes 323 and 324 have the highest B values in the trace (50 and 26, respectively). These two inputs 25 will form an AND/NAND-like connection with the target node 326 by adding small weight increments in the counters 67 of node 326.

As the node 326 is targeted again and again, the positive weights associated with nodes 323 and 324—the high B nodes—eventually become large enough to offset the node's bias. Its Fill changes sign and soon node 326 becomes part of the memory trace as its memory trace function M becomes greater than zero as it meets the proper temporal criteria.

Once part of the growing root, node 326 itself develops a high Close value and targets other non-trace nodes in its vicinity for adding to the memory trace. Since its only inputs 25 are from root nodes 323 and 324, node 326 can only pulsate if both 323 and 324 are changing in synchrony. If either node 323 or 324 are not both firing, then the chain of information flow along root 322 ceases. Node 326 is AND/NAND-like requiring that its inputs from both node 323 and node 324 combine to change its output 26.

The activated root 322 continues to grow toward the MD source root 320 by destabilizing one node after another in its path. Each new node, like node 326, is formed of AND/NAND-like connections coming from trace nodes, like nodes 323 and 324, which are already in the root. The newly formed root is "directional": information can only flow in one direction along root 322 from system input level 21A towards the root 320. Like an axon of a neuron, information in an activated root only flows in one direction.

Filleting

Root steering is one way in which the root grows: tunneling directs an activated root to sources having high MD. Filleting is a second way in which a root grows by tunneling. Recognize that roots propagate quickly from one cluster to another if they have a core of OR/NOR-like nodes, but they make junctions with other roots quickly if they have a skin of AND/NAND-like connections. Filleting assures that roots are thick enough (have the proper stem diameter) for OR/NOR-like core nodes combined with AND/NAND-like skin nodes. Filleting applies only to non-trace nodes adjacent to trace nodes.

Figure 17:
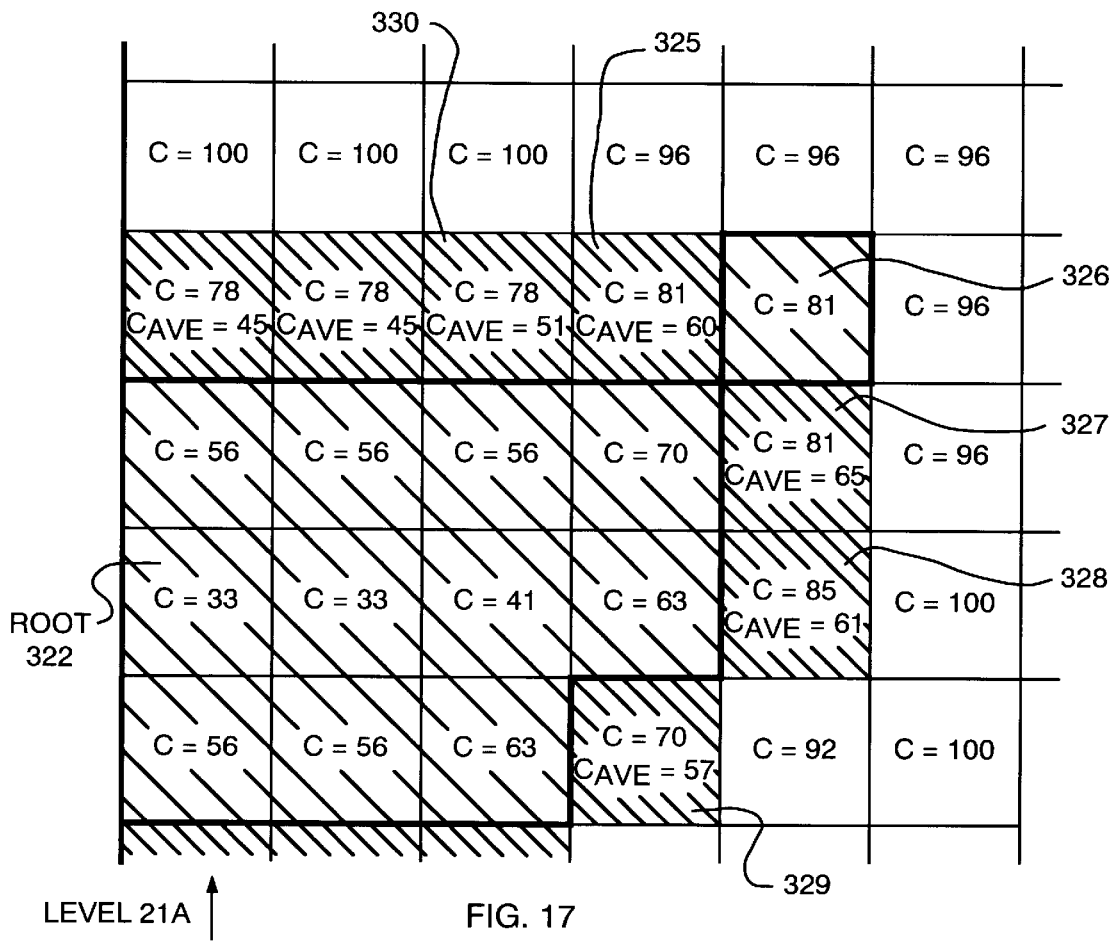
FIG. 17 is the same cross-section shown in FIG. 16C, but after the root structure has grown.

FIG. 17 shows a close-up of the root tip of FIG. 16C after node 326 has become part of the root 322; trace nodes shown in light cross-hatch. Filleting applies only to adjacent nodes such as nodes 325, 327–330. Adjacent nodes are defined by a spatial summation function (Eqn. 12) which applies to non-trace nodes (M=0):

$$A|_{t+P} = \text{SUM}_K(M_k)|_t \quad \text{for all non-trace nodes } (M_k = 0) \quad (22)$$

Any nodes for which the adjacent function A is not zero have at least one neighbor which is a trace node. However, filleting produces the most consistent root structures when the adjacent function includes several trace node neighbors. The criterion $A \geq A_{TH}$ assures that no node is defined as an adjacent node unless it has at least $A_{TH}$ trace neighbors; for face centered cubic neighborhoods, $A_{TH} \geq 4$ gives a consistent root structure. In FIG. 17. Adjacent nodes ($A \geq 4$) are shown in dark cross-hatch.

There are several filleting strategies. The simplest one is to target adjacent nodes ($A \geq A_{TH}$) whose Close value is greater than a desired Close threshold, $C_{TH}$. Close values accompany each cell in FIG. 17; note that Close (Eqn. 13) is defined for both trace and non-trace nodes. For the growing root to have a central core surrounded by a skin of trace nodes requires that adjacent nodes having Close values greater than 80 ($C_{TH}$=80) be targeted: nodes 325, 327, 328 (as well as others in the planes not shown). Other nodes with Close values less than the threshold $C_{TH}$80 (such as 329 and 330) are not targeted for inclusion into the memory trace.

A second strategy is to use the average Close of the surrounding nodes to target adjacent nodes for filleting. The average Close for each adjacent node is a space summation function (Eqn. 12) found by summing the Close values of the trace neighbor nodes and dividing by the number of trace neighbor nodes for each adjacent node:

$$C_{AVE} = \text{SUM}_K(C_k)/N_T \quad \text{for all trace nodes } k \ (M_k > 0) \quad (23)$$

where:
- $C_k$ is the value of Close for the neighbor trace node k
- $N_T$ is the number of trace nodes ($M_k>0$) among the neighbor nodes k
- $C_{AVE}$ is the average Close at an adjacent node ($A \geq AT_{TH}$)
- $C_{AVE}$ is a measure of how well the Close of a potential trace node matches that of its neighbors which are already in the memory trace. When $C_{AVE}$ values are higher than some threshold, the adjacent node is targeted for inclusion into the trace. For example, in FIG. 17, $C_{AVE}$ values greater than 60 identify adjacent nodes 325, 327, and 328 as filleting targets, while excluding nodes 329, 330 and others with too small a $C_{AVE}$ value.

Yet another filleting strategy targets an adjacent node where the difference between its Close value and the average Close of its neighbor trace nodes is negative:

$$DC = C - C_{AVE}] \quad (24)$$

Here, values of DC less than zero mean that the adjacent node—a non-trace node—is surrounded by trace nodes which have higher Close values. Such nodes are ones which have made a pocket or local concavity in an activated root; including them as part of the growing root produces a root with smoother skin.

By whatever strategy, filleting assures that roots do not get too large in diameter as they tunnel through non-trace nodes. Nor do roots become so small in diameter that they can not have a core covered by an outer skin of trace nodes. Likely the axons and dendrites of neurons use similar techniques based on molecular interactions as they grow in response to the chemical diffusion signals of nerve growth factor (NGF).

SUMMARY OF FUNCTIONS

As noted, various branch functions B (Eqn. 1, 6, 21) allow the branches j of a node 77 to compete with each other. The winning branches have their weights modified depending on how their weights have been modified in the past, and upon the universal signal U for punish or reward (see Eqn. 4 and 5). Simple branch functions B depend on the state of the node's output 26 (is it firing or not). More complex branch functions B and B' also depend on temporal aspects of the state of a node: how its state has changed (was it firing and stopped or wasn't it firing and started). More complex still are branch functions which depend on the spatial aspects of the node: are surrounding nodes changing in the same way.

To summarize the various functions which govern the branch competition, FIG. 18 organizes the different time and space functions into summation, difference and combined categories. Beginning with time functions, the Boolean branch function B (Eqn. 1) and the Burst filter (Eqn. 8) are examples of time summation function since they require that their input function accumulate over time. Time difference functions—both algorithmically (second term of Eqn. 6) and as circuitry (Change Sensitive Circuits)—depend upon temporal changes in their inputs. Time difference and time summation functions are combined to produce a composite temporal function, the memory trace function M (Eqn. 9). The preferred embodiment memory trace function M is the time-filtered response of the output 26 of a node circuit 77; it combines change-sensitive functions with Burst filters.

The memory trace function M is used as the input function to space functions: spatial interactions between the node and its surrounding k neighbor nodes are determined by the memory trace function of the nodes. Most space functions shown in FIG. 18 combine both temporal and spatial aspects since they depend upon a time function, the memory trace function. However, other functions which are not time based such as the distance function d (Eqn. 10, 11, 12) can also be used to drive the space functions.

Space summation functions include the general form of the function (I, Eqn. 12). The most important space summation function is one which determines the local spatial clustering of memory trace nodes (such as Close, Eqn. 13). Close distinguishes a root node from a cluster node, helps identify the tip of the root, distinguishes skin nodes from core nodes and identifies adjacent nodes for targeting. Another space summation function is Close Diffused (CD, Eqn. 14) that determines how Close diffuses through the memory trace. CD is used variously to drive the Tip function and locate Tip nodes and to find those nodes most interior in a cluster (which is important to root interactions as we will see). Another important space summation function is Memory trace Diffused (MD, Eqn. 16) which determines the "smell" of memory traces so that other traces can tunnel to them. Other space functions are the Adjacent function (A, Eqn. 22) which controls filleting of a root and Average Close ($C_{AVE}$, Eqn. 23) or Close Difference (DC, Eqn. 24), two functions which control targeting for filleting.

Space difference functions include the general form for the summation style (D, Eqn. 10) and ranking style (Q,q, Eqn. 11). An important summation style function is Tip (Eqn. 15) which is one way to identify nodes closest to the tip of memory trace root. Another summation style function is the MD gradient vector (GMD, Eqn. 18) used to identify target nodes. The ranking style of space difference function is represented by the target nodes (q, Eqn. 17 and 20). The target nodes are identified by either ranking MD (picking the node with the largest MD value) or ranking the angle between the MD gradient vector and the target node direction (picking the smallest ANGLE, Eqn. 19).

Just as the Memory trace function combines time summation functions and time difference functions, certain space functions combine space summation functions with space difference functions. One such function is the branch function (B, Eqn. 21) which uses space summation function Close to determine which branch of a target node should have its weights modified, the target node itself being determined by a space difference functions.

CLASSICAL LEARNING

Classical learning was pioneered by Pavlov during his famous experiments with dogs. The sight or smell of food (the unconditioned stimulus) caused a dog to salivate (the unconditioned response). Pavlov rang a bell (the conditioned stimulus) at the same time that he presented the dog food. After many training sessions, the dog learned to associate the sound of the bell with the food: it salivated when the bell was rung (conditioned response).

Figure 19:
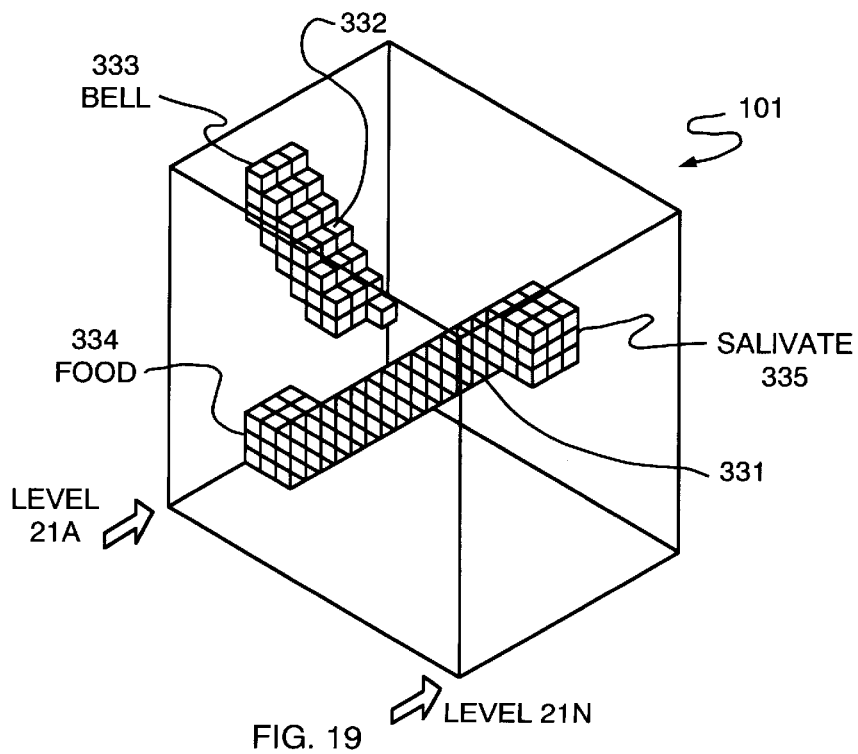
FIG. 19 is a three dimensional representation of the circuit shown in FIG. 2 describing a classical learning example of a root structure growing towards a second root.

FIG. 19 shows the unconditioned response as activated root 331: a connection between the unconditioned stimulus 334 (FOOD input signal 2) into level 21A nodes 77 and the unconditioned response 335 (SALIVATE nodes as output signal 3) at level 21N output nodes 77. The nature of this connection is that when the FOOD input signals 334 pulsate, the chain of circuits 77 in root 331, each "back-connected" to circuits 77 closer to the input signal 334, pulsate in turn. As root 331 activates, the chain of pulsating nodes propagates to the SALIVATE output nodes 335 in level 21N. It is these level 21N nodes whose output 26 indicates that the SALIVATE output signal 335 has occurred. Conversely, if the FOOD input signals 334 into level 21A cease to pulsate, root 331 deactivates and the SALIVATE output 335 nodes in level 21N soon cease pulsating. Note that root connection 331 is specific to input 334 and output 335 signals shown: input 2 signals at other locations in level 21A do not produce output signals 26 of the SALIVATE nodes 335 at level 21N.

Also shown in FIG. 19 is the beginning of a conditioned response which network 101 is learning. The learning process is simple: at the same time that the FOOD input 334 changes state, the BELL input 333 (the conditioned stimulus) also changes state. As the BELL input 333 continues, a second root 332 forms from the BELL input 333 and begins tunneling toward the activated FOOD-SALIVATE root 331. In a process of targeting, tunneling, and filleting like that of FIGS. 14–17, activated root 332 grows toward root 331 by following the maximum MD values of nodes successively closer and closer to root 331. Eventually, the BELL root 332 contacts the FOOD-SALIVATE root 331.

Figure 20A:
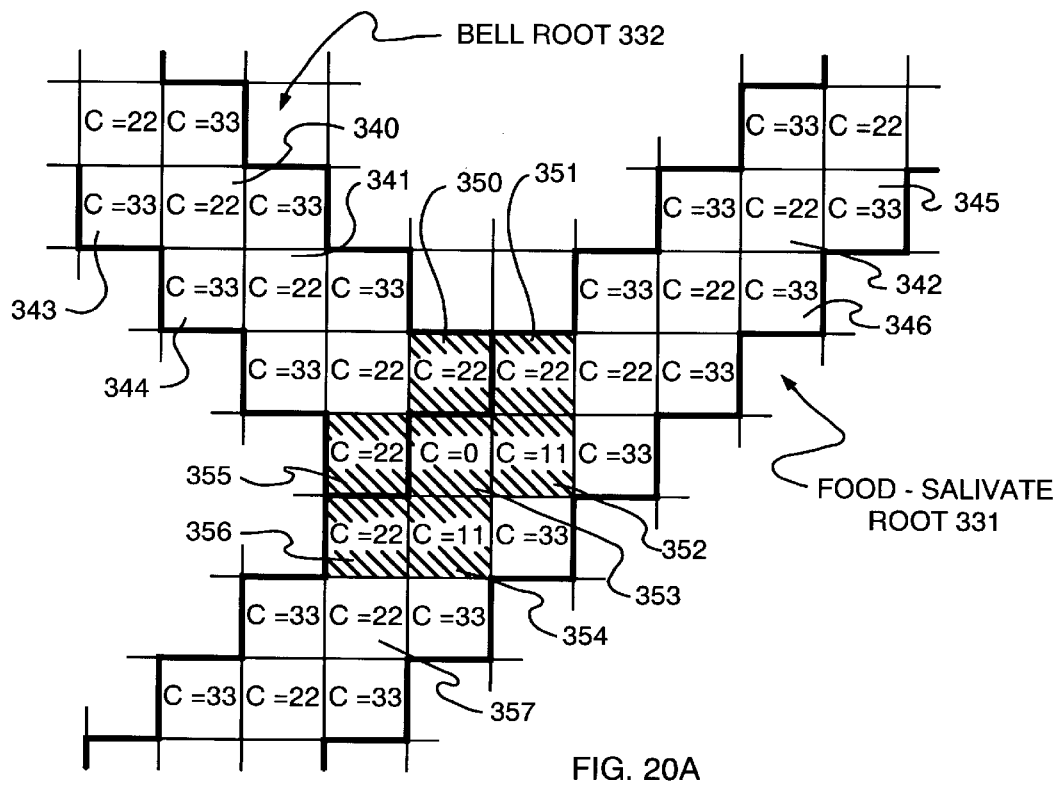
FIG. 20A is a cross-sectional view of node circuits of the growing root of FIG. 19 after it has joined the second root structure.
Figure 20B:
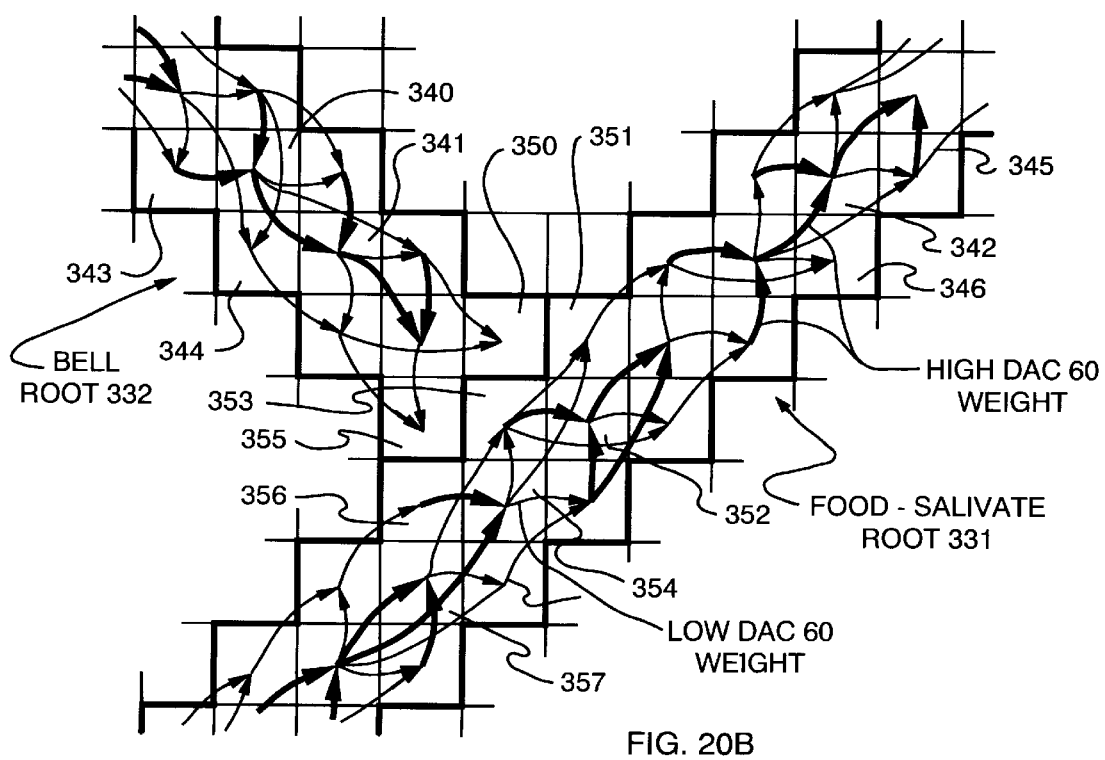
FIG. 20B is the same cross-sectional view of FIG. 20A showing simplified connections between the node circuits prior to classical learning.

FIG. 20A illustrates the central plane cross-section of both roots as they make contact and form a stylized junction. In the simplified network of FIG. 20A, each node circuit 77 has only two inputs 25 which have DAC 60 weights. FIG. 20B shows how these weights might have arisen as the root 331 and 332 tunneled through the network 101. Notice that each cell of FIG. 20A corresponds to each cell of FIG. 20B. As the roots grew, each node of the root was destabilized by branches from preceding root nodes. Each trace node cell has two inputs indicated by an arrow coming from a preceding trace node. The direction of root 331 is from lower left to upper right (each trace node is forced by nodes below or to its left); the direction of root 332 is from upper left to lower right (each trace node is forced by nodes above it or to its left). At the point of first contact shown in FIG. 20B, no branches cross from one root to the other.

AND/NAND-Like to OR/NOR-Like

Figure 21:
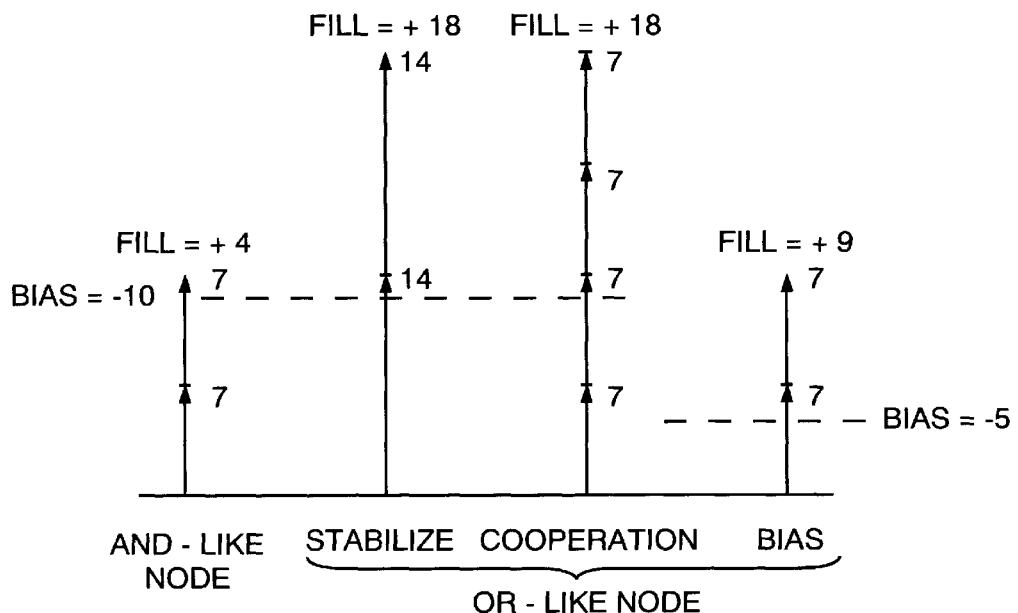
FIG. 21 is a diagrammatic representation in vector format of weights for node circuits having different types of Boolean logic.

Digressing for a moment, consider the methods by which the weighs of a node 77 can combine with the threshold DAC 74 to produce OR/NOR-like nodes from AND/NAND-like nodes. As a simplification, only AND-like and OR-like nodes will be discussed; a similar argument holds for NAND-like and NOR-like nodes. FIG. 21 shows on the left a vector representation of the weights of an AND-like node which might have formed as root 331 or 332 tunneled. For an AND-like node such as circuit 77a of FIG. 7A, the bias weight (DAC 74a) is negative and has a value of −10; only two DAC weights 70a and 70b are set, each at +7. When inputs 25a and 25b are both firing, the total current flowing to the voter 75a (its Fill value) will be positive (+4) and the node will fire. If either input 25a or 25b does not fire, the total current will be negative (−3) and the node will not fire. Hence node 77a is a 2-input AND-like node since both, but not one, inputs 25 are required to make it change state.

On the right side of FIG. 21, circuit 77a has been converted from an AND-like node to an OR-like node by three different methods. The first method maintains the same number of inputs but increases the weights of each of those inputs. The vector diagram labeled "Stabilize" has had each of the two DAC weights 70a and 70b increased from +7 to +14. When both inputs 25a and 25b fire, the total current to the voter 75a is positive (+18) and node 77a will fire. However when only one of the inputs 25a and 25b fire, the total current is still positive (+4) and node 77a will fire—its Fill is still greater than zero. The node 77a is converted from a 2-input AND-like node to an OR-like node by stabilizing, changing the Fill value. If the Fill is small (e.g., +4) the node is AND-like; if it is large (e.g., +18) the node is OR-like.

The second method of converting from AND-like to OR-like both stabilizes the node and spreads the weight increases over more inputs 25. Essentially the node uses a more cooperative competition function (see Cooperation): more inputs 25 to a node are rewarded during stabilizing. The vector diagram of FIG. 21A labeled "Cooperation" has inputs from four DAC weights (70a, 70b, 70c and 70n in FIG. 7A) each with a value of +7. The Fill is again +18 if all inputs (25a, 25b, 25c, 25n) are firing. However, the node 77a still fires if any two of its inputs 25 fire. It has become more OR-like.

A third method of making a node more OR-like is made by reducing the node's bias (see Bias). The vector diagram labeled "Bias" shows how reducing the bias from −10 to −5 has the effect of changing the node from an AND-like node to an OR-like one. No input 25 weights have been changed. With a lower bias, either input 25a or 25b will make the Fill positive (+2) and the node 77a will fire as will both inputs 25a and 25b together. Only if both inputs do not fire will node 77a not fire.

OR/NOR Core

Either singly or in combination, the three methods above can convert nodes from AND/NAND-like to OR/NOR-like. These methods will now be used in conjunction with space summation functions to alter the characteristics of memory trace interactions. Returning to FIG. 20A, notice the Close values displayed in each cell. Far from the junction, the Close values of a root are characterized by lower values of Close on the root skin (Close=33) than in the root core (Close=22). Close values are a way to distinguish between skin nodes and core nodes of a root. In the present invention, spatial summation functions such as Close not only determine a root's tip for targeting and its stem size for filleting, but also discriminate between core and skin.

As a first example of converting AND/NAND-like nodes to OR/NOR-like nodes, stabilizing will be used: increasing the node's Fill (see Firing Balance). A Close threshold of +25 is chosen to discriminate between skin and core nodes. With regard to FIG. 20A, note that the root nodes in the plane above and below the plane shown are all skin nodes since their Close values are all greater than the Close threshold of +25 (see FIG. 17 showing such a root plane). Only the central plane of the root shown in FIGS. 20A and 20B has low Close core nodes.

In the plane shown in FIG. 20A, nodes lying along the interior of the roots 331 and 332 (such as nodes 340, 341 on root 332 or nodes 342, 357 on root 331), all have Close values below the +25 threshold while the nodes on the exterior of the root (such as nodes 343 and 344 on root 332 or nodes 345 and 346 on root 331) have Close values above the threshold. It is these low Close nodes which are converted from AND-like nodes to OR-like ones. By stabilizing these interior nodes to +18 while keeping the number of inputs 25 at two (as in FIG. 21, "Stabilize"), the root core becomes OR/NOR-like. Following the example of FIG. 21 with a bias of −10, skin nodes with two inputs have DAC 60 weights of +7, while core nodes with two inputs have DAC weights of +14. In FIGS. 20B, DAC 60 branch weights of +14 are shown in bold for the low Close (C<25 in FIG. 20A) core nodes of roots 331 and 332.

OR/NOR Root Junctions

As a second illustration of converting to OR/NOR-like nodes, consider the nodes at the junction of the two roots 331 and 332. Nodes 350–356 at the junction of roots 331 and 332 (shown in cross hatch on FIG. 20A) all have Close values below the threshold. Before the two nodes joined, nodes 351, 353 and 356 were the AND/NAND-like skin nodes of root 331 since their Close value was above the threshold to convert to core nodes. After joining, these same nodes find themselves at the interior of the junction with a Close value below the core node threshold. They are converted to OR/NOR-like nodes by stabilizing (increasing the firing balance) and cooperation (adding more DAC 60 weights).

Figure 22:
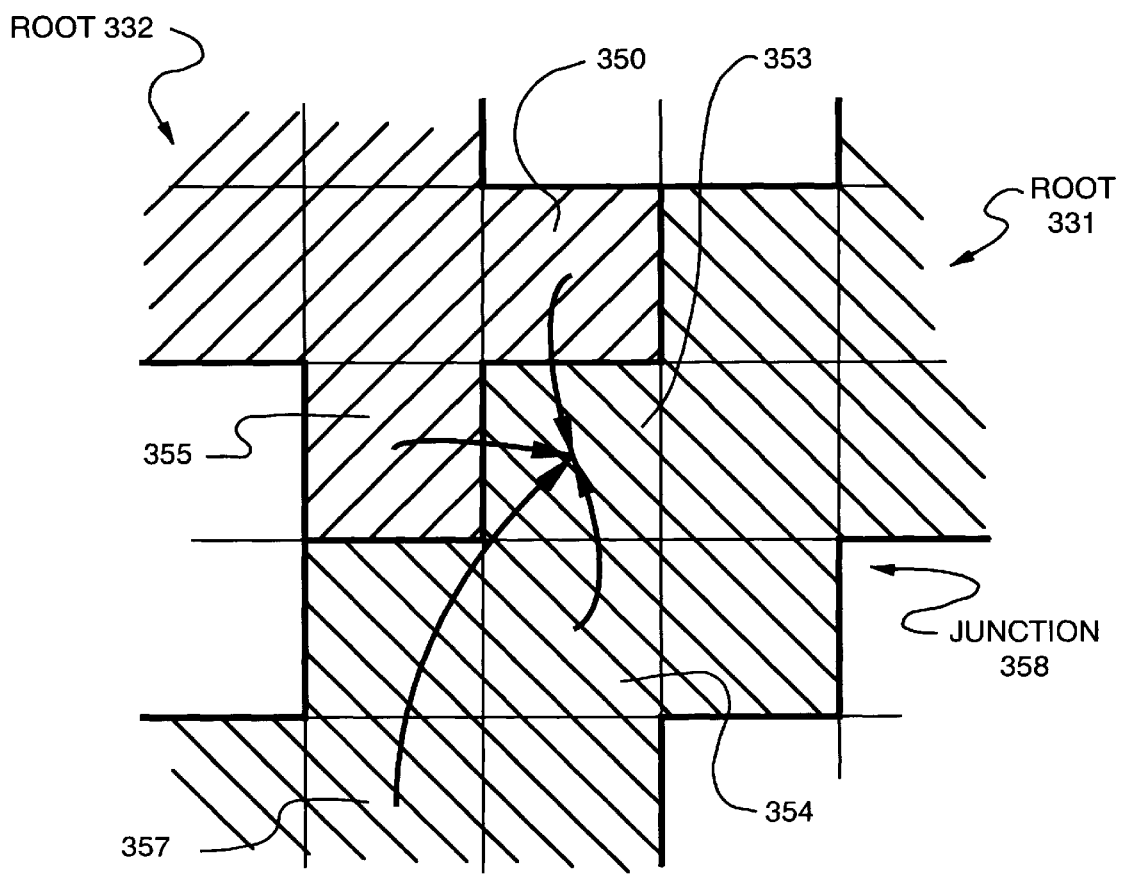
FIG. 22 is a detailed cross-sectional view of the node circuits at the junction between the two root structures shown in FIGS. 20A and 20B.

Node 353 is used to illustrate the weight changes for interior junction nodes such as 351, 353 and 356. Before joining, node 353 has connections from nodes 354 and 357 as shown in FIG. 20B; each DAC 60 weight is +7 with a bias of −10 (in keeping with the AND-like characteristics of FIG. 21). After joining, classical learning of node 353 makes additional connections with nodes in its vicinity as shown in FIG. 22: inputs come from nodes 350 and 355 in addition to nodes 354 and 357. Now node 353 will change state, as before, when root 331 is activated (receiving current additions to its voter 75 from nodes 354 and 357), but will also change state when root 332 is activated (receiving inputs from nodes 350 and 355 of root 332).

Notice in FIG. 20B that before joining the two roots have no root-to-root connection. Inputs to nodes 350 and 355 at the end of root 332 came only from other nodes in root 332. Similarly, all nodes in root 331 came only from other nodes in the same root 331. Using the low Close values of the junction to trigger additional connections, FIG. 22 shows that the two roots have joined: branch connections cross the boundary between the roots. Connections between roots 331 and 332 occur not just at node 353 but also at nodes 351 and 356 which find themselves at the interior of a junction.

When interior nodes 351, 353 and 356 make connections between roots 331 and 332, the roots themselves become OR/NOR-like. As noted, when FOOD inputs 334 to root 331 activates, root 331 activates causing the SALIVATE output 335 to pulsate. After adding the additional inputs 25 to the interior junction nodes 351, 353 and 356, BELL input signal 333 also makes SALIVATE output 335 pulsate even if the FOOD input 334 is not activated. When the BELL input 333 activates root 332, eventually nodes 350 and 355 at the end of root 332 activate and cause the junction nodes 351, 353 and 356 of root 331 to pulsate. These nodes in turn trigger other nodes on root 331 activating root 331 which eventually triggers the SALIVATE output 335.

In practice, the situation is more complicated because many more nodes in the junction convert to OR/NOR-like nodes than nodes 351, 353 and 356. Surrounding nodes 352, 354, 350, and 355 (see FIG. 20A) have low Close values and convert to OR/NOR-like nodes. These nodes also make additional connections with nodes from both roots. The entire junction 358 activates when either root 331 or 332 is triggered, assuring that the information propagates. Also, the nodes needn't be just the AND-like or OR-like nodes depicted; any mix of AND-like, OR-like, NAND-like, or NOR-like nodes gives the same behavior.

The roots are "causal": FOOD input 334 does not cause the BELL root 332 to activate because roots 331–332 are directional. After learning, when FOOD input 334 activates, root 321 is activated along its entire length, including junction 358 and junction nodes 350–356. However, no nodes "upstream" of the junction 358 on root 332 (i.e., from junction 358 toward the BELL input 333). These nodes are not connected to junction nodes; they are only connected to nodes further upstream. Information can only flow along a root in the direction in which it first tunneled (see Root Paths).

Figure 23:
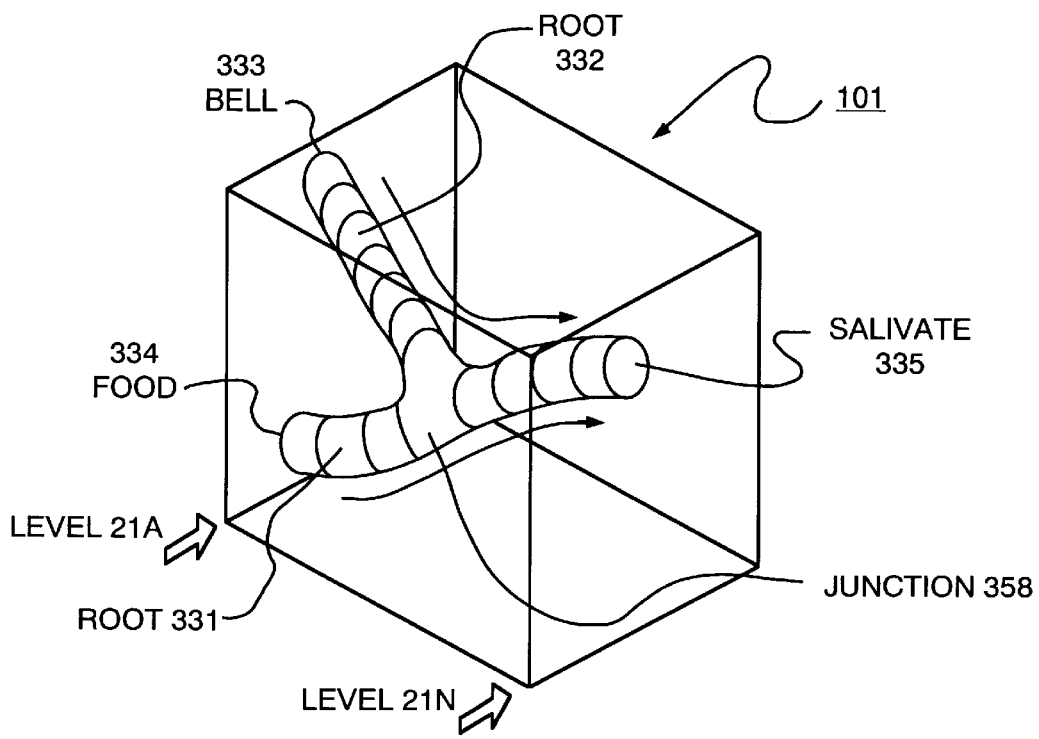
FIG. 23 is a three dimensional representation of stylized root structures of FIG. 19, but after the two have joined.

As a result, the network exhibits the associative behavior of classical learning. Two inputs (FOOD and BELL) become associated with each other. Before learning, only the FOOD input 2 caused the SALIVATE output 3. After learning, both the FOOD input 2 and the BELL input 2 cause the SALIVATE output 3 as shown in FIG. 23. The roots in FIG. 23 are stylized for simplicity, but have the same core and skin nodes of more detailed figures. The BELL and FOOD inputs 2 become associated simply by being present at the same time. Living organisms also associate behaviors which occur at the same time.

When either the FOOD or BELL input 2 is removed from their respective activated root, the root ceases to propagate information down the root. Whether AND/NAND-like or OR/NOR-like, each node depends on upstream nodes to change its own state. When the input branches 25 of a root node 77 stop firing, that node ceases to pulsate. Each ceased node in turn helps prevent other nodes further along the root from changing state and the entire root soon ceases to be activated.

The nature of roots formed by tunneling is that they depend on their input 2 signals to activate. Yet another root can tap into a root at any point along its length during classical learning when both roots are activated at the same time. Once joined, the portion of root beyond the junction activates whenever the joining root is activated. Associations between input patterns form spontaneously whenever two roots are activated at the same time ¾ just as Pavlov's dog learned to associate the bell with food.

OPERANT LEARNING

The second type of learning used by living organisms is operant learning: learning by reward and punishment. Likely operant learning developed in organisms after classical learning since it dominates the behavior of higher organisms such as vertebrates and mammals. Operant learning is called "supervised" learning because a supervisor judges whether the output is correct or incorrect. By contrast, classical learning is "unsupervised": only the temporal coupling of two input patterns is required to form an association between them. In operant learning, a correct response is accompanied by a reward; an incorrect response is accompanied by punishment.

In the self-organizing system 101, the external source 9 (the supervisor) judges the output signal 3 or intermediate outputs 26 for correctness and applies a reward signal 5 or a punish signal 6. In general, the reward and punish signals use signal 5a (correct) and 6a (incorrect) to direct the network 101 of circuits 77 (see Correct and Incorrect). Signals 5b (associate) and 6b (distinction) also can be used by embodiments of the present invention to modify the behavior of the network by making appropriate nodes more cooperative (more OR/NOR-like) or more competitive (more AND/NAND-like); see Association and Distinction.

In both classical learning and operant learning, junctions of roots play a key role. In classical learning, junction nodes simply became more OR/NOR-like when two roots join. In operant learning, junction nodes are controlled to be either OR/NOR-like or AND/NAND-like by reward or punishment via the universal signals 5 and 6. Simply put, an activated junction becomes more AND/NAND-like when the network 101 is punished; it becomes more OR/NOR-like when the network 101 is rewarded.

As shown in classical learning, junctions of roots are found by spatial summation functions such as Close which identify the location of a node in relation to other memory trace nodes. High values of Close indicate that a node is near the exterior of a memory traces; these become tip nodes or skin nodes. Low values of Close indicate interior nodes; these become core nodes or junction nodes. Activated junctions form when the roots which form the junctions are activated.

Adding a Component

Once patterns can be associated (classical learning), much of the rest of knowledge learned by organisms or by self-organizing systems falls into two categories of distinction: adding a component to an already-learned pattern or deleting a component from an already-learned pattern (see Association and Distinction). In the simplest networks, components are the input 2 signals which combine to give a particular output 3. For example, when we learned the alphabet we likely learned it in ascending order—learning an "E" before an "F" and learning a "P" before an "R". To learn an "F" means that an existing component (the bottom bar) must be deleted from the components of "E" that are already known. To learn an "R" means that a new component (the tail of the "R") must be added to the components of "P" that are already known.

Figure 24:
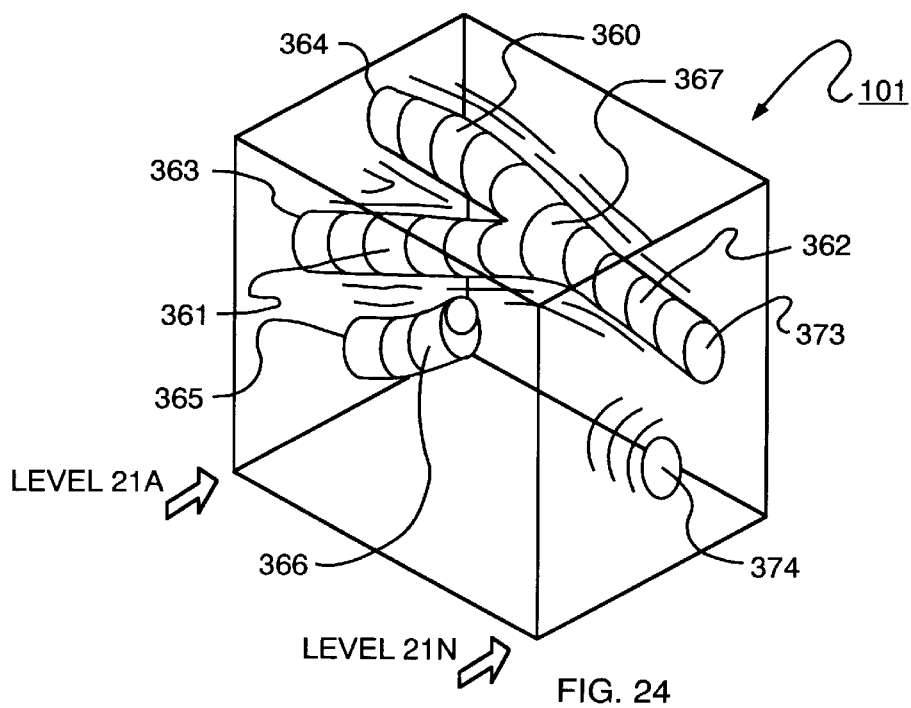
FIG. 24 is a three dimensional representation of stylized root structures describing the addition of a component in operant learning.

Beginning with adding a component, an example will be shown in FIG. 24 of learning the letter "R" after the letter "P" has already been learned. The process will alter junction nodes which will change root interaction and behavior. In FIG. 24, roots such as root segments 360, 361 and 362 are again shown in three dimensions in a stylized way with details omitted for clarity. Root direction is left to right such that an activated input 2 signal at level 21A propagates to the right toward output level 21N as it activates.

In the unfolding scenario of FIG. 24, the letter "P" response 373 has already been learned by network 101. It formed previously by the combination of its components (the straight vertical component 363 and the curved upper component 364) in a similar manner that the letters of FIGS. 12–13 are composed of their components. The root connection from each input 2 component 363 and 364 formed when the these patterns tunneled, filleted and densified roots 360 and 361, growing toward the MD source "P" 373 at the level 21N output. Since each root was itself an MD source, the roots were attracted toward each other as they steered to the highest MD at their root tips. After they joined at junction 367, the single root 362 continued from the junction to the MD source "P" 373. The junction initially formed was an OR/NOR-like junction since classical learning altered the junction nodes to be more stable and more cooperative. The result is that if either component 363 or 364 (or both) are activated, the output "P" 373 is activated.

At the point shown in FIG. 24, an added component is to be included in the learned responses of the network 101. The addition of the tail of the "R" (short left slanting diagonal 365) has a new meaning: when it is present with the other two components 363 and 364, the network should respond at level 21N with the letter "R" 374. To learn the new pattern, the output 3 (level 21N) nodes for "R" 374 are activated and become an MD source. Here the MD source of node group "R" 374 emanates MD, not by actually being a memory trace root, but rather, by altering the source function $M_i$ of the MD diffusion equation (Eqn. 16). Since they are not part of the memory trace (M=0), these output 3 nodes draw roots toward them but do not cause branch competition, DAC 60 weight changes or a growing root tip.

From the left diagonal component 365, a new root 366 begins to grow and steers toward the highest MD in its vicinity. While MD emanates from root segments 360–362 as well as from the output 3 nodes, new root 366 is drawn toward the closest MD source, root 361 segment (since it will contribute more MD at the root 361 tip than MD from more distant sources).

The letter "R" is composed of three components 363–365: two letter "P" components 363 and 364 in addition to the tail component 365. When these components are first presented to circuit 101, root segments 360, 361 are activated by pattern "R" input 2 signals since they include "P" components 363, 364. Root segments 360, 361 will in turn activate the root segment 362, resulting in the incorrect output 3 nodes: the letter "P" response 373. In operant learning, incorrect outputs 3 are detected by the "supervisor" (external source 9, FIG. 1) and produce a punish signal 6a directed to every circuit 77 in the network 101. The punish signal acts through the bus 76 to increment or decrement the weight values stored in the counters 67 of DAC 60 (FIG. 6A). In keeping with the simplification of FIG. 21, only AND-like and OR-like node behavior will be addressed; NAND-like and NOR-like nodes behave in a similar way but have weight additions of opposite sign.

While the punish signal 6a is directed to all nodes 77, improved self-organization results when the weight changes are applied to those memory trace nodes (M>0) having the lowest Close values. As in classical learning, nodes 77 meeting these criteria are activated core and activated junction nodes. Nodes of junction 367 (FIG. 24) have the lowest Close values while the core nodes of roots 360–362 and 366 have somewhat higher Close values.

The spatial summation function CD (Close Diffused) in Eqn. 14 determines which nodes are most interior in a junction. Earlier, a CD function was used as a "flow" variable to drive the filtering action that determines Tip nodes (see Tip Function). Here, the same CD function identifies which nodes are most interior to the memory trace. As noted, Eqn. 14 uses $C_{TH}-C_i$ as its source function. Close itself is highest on the boundary of a cluster but falls to zero a short distance from the trace boundary. Interior nodes are always below the threshold $C_{TH}$ making CD highest for interior nodes furthest from the trace boundary.

The Close diffusion function CD represents a spatial "smoothing" of Close. Traversing a path from the boundary of a large cluster to its interior, CD slowly increases in value. The core of roots do not have very large CD values because they have so much surface which draws down the CD produced by the core. The interior of junctions have higher values of CD; the interior of larger memory trace clusters have much larger CD values.

By analogy, heated buildings are like memory traces. Exterior rooms of a building are colder than interior rooms because they lose more heat to the outside; interior rooms are not exposed to the cold so they stay warmer. Similarly, exterior nodes of a memory trace have a lower CD than interior nodes because they lose CD more easily to the trace's boundary; interior nodes are not exposed to the boundary and have higher CD values. Interior junction nodes are "hotter" than core nodes since they are less exposed to boundary nodes that "cool" the skin of the memory trace.

OR/NOR-Like to AND/NAND-Like

All values of CD higher than a threshold $CD_{TH}$ are nodes which are destabilized by the punish signal 6a. In FIG. 24, junction 367 nodes have CD values higher than threshold $CD_{TH}$ and it is these nodes which are destabilized by the punish signal 6a. Recall that destabilizing means driving a node 77 in the opposite direction as its present Fill. The AND-like and OR-like nodes considered in this example have positive Fill when activated; destabilizing means that additional DAC 60 weights are negative (see Stabilizing and Destabilizing).

As the junction nodes are destabilized by the addition of inhibiting weights, the OR-like nodes of junction 367 are converted to AND-like nodes. FIG. 25 is a weight vector diagram indicating how negative weight additions to an OR-like node of junction 367 alters its behavior. Junction 367 nodes (formed by classical learning when the components of "P" produced junction 367) begin as OR-like nodes shown in the left diagram of FIG. 25. They are OR-like because any two of their four inputs can activate the node. In the middle diagram of FIG. 25, adding two additional inputs 25 whose DAC 60 weights are each –8 is destabilizing: it reduces the node's Fill from +18 to +2. As such it becomes AND-like since all four of the inputs 25 (each with DAC 60 weight of +7) must act together for the node to activate.

Inputs 25 to a node 77 of a growing root come from trace nodes which surround them, prioritized by a branch function such as B (Eqn. 21). Since B is based on Close, inputs 25 from junction nodes tend to come from both root segments of the junction formed. In junction 367, the addition of inhibiting weights from both the root 360 segment and the root 361 segment means that the junction nodes will not activate unless both roots are activated. Since nodes in root segment 362 depend on the junction nodes changing, the root 362 segment (and the letter "P" output 373) will not be activated unless both components 363 and 364 are simultaneously activated. As addressed in Classical Learning, the roots at a junction take on the characteristics of the junction nodes: OR-like junction nodes produce OR-like junction behavior. Here, AND-like junction nodes produce AND-like behavior of the root junctions.

Continuing with the example, punish signal 6a converts junction 367 from the OR-like behavior of classical learning to AND-like behavior by adding inhibiting (negative) weights which destabilize the high CD junction nodes. In addition, when root 366 (growing from "R" tail component 365) joins root 361 (growing from the curved upper component 364), the junction becomes AND-like rather than OR-like since it forms during punish signal 6a.

AND/NAND-Like to NOT-Like

However, the incorrect output 3 signal 373 at "P" does not deactivate after junction 367 has been converted from an OR-like junction to an AND-like junction. Components 363 and 364 still combine together to produce the letter "P" output 373. Because the incorrect "P" response 373 continues to be activated at level 21N, punish signal 6a continues to destabilize the activated high CD nodes of junction 367.

Nodes pass from OR-like to AND-like and finally to NOT-like as they are destabilized by punishment. In the vector diagram on the right side of FIG. 25, each of the two negative DAC 60 weights have grown to values of –10 which drops the Fill to –2. When the Fill of a high CD junction 367 node in FIG. 24 drops below zero, the node will not activate: it has become NOT-like. Since root segment 362 depends upon the junction 367 nodes to be activated, this segment is deactivated and the pathway from the components 363 and 364 continues only to junction 367. Similarly, the newly formed junction between roots 361 and 362 will deactivate the root beyond their junction due to continued punish signals 6a.

FIG. 26A shows how the developing root pathways grow after the pathway to "P" output 373 has ceased. At this stage, root 366 from input 2 component 365 has connected with root 361 at junction 368 and a new root 370 has developed from the "stub" of the rightmost deactivated segment of root 361. In addition, root 369 has formed from the stub of blocked root 362 at junction 367. Roots 369 and 370 are attracted both to each other and to the letter "R" output 374 nodes which are MD sources. Since targeting avoids new nodes which have large DAC weights ($WTSUM_k$ in Eqn. 18), the new roots 369 and 370 tunnel around old root segments of the pathways to "P" output 373. Eventually new roots 369 and 370 join at junction 371 forming new root 372 which continues to the letter "R" output 374 at level 21N as shown in FIG. 26B.

Universal signals can be either punishing or rewarding. When the proper components to either letter "P" (363, 364) or letter "R" (363, 364, 365) are activated and the correct output 3 is activated, external source 9 responds with reward signal 5a. Like punish signal 6a, reward signal 5a is a universal signal delivered to all nodes 77 in network 101. Also like punish signal 6a, only high CD junction nodes in the memory trace respond to reward signal 5a. Reward signal 5a signals the high CD activated junction nodes to stabilize—to drive their Fill away from zero rather than toward zero as the punish signal 6a does.

Consequently, after many presentations of the "P" and "R" input 2 patterns, the junctions of the pathways stabilize (become more OR-like) or destabilize (become AND-like or NOT-like) when the output 3 results are correct or incorrect, respectively. For instance at junction 368, whenever the incorrect "P" response 373 occurs as output 3, some junction 368 nodes have their Fill reduced tending to block the path to "P" output 373. But when the correct "R" response 374 occurs, other junction 368 nodes increase their Fill, reinforcing the path to "R" output 374. With time, component 365 activates root 366 which blocks root 361 at junction 368 (NOT-like) but also combines with root 361 (AND-like) to activate root 370. Similarly, root 360 becomes root 369 which joins root 370 at junction 371 (AND-like).

When the "R" tail component 365 is not present, the two "P" components 363 and 364 combine AND-like to activate the letter "P" output 3 as in FIG. 24. When the "R" tail 365 is present, it blocks one of the "P" components (364) which in turn diverts the root path to activate the letter "R" output 374 as in FIG. 26B. The network 101 has learned to distinguish between "P" and "R", with and without an added component. Unlike neural net optimization techniques, new information can be added to a network of nodes without reevaluating the weights of the entire network. More important, the technique is general: any component can be added to an existing pattern to produce a new pattern through operant learning.

Altering Thresholds

Another technique which aids in establishing the proper connections during operant learning is to change thresholds in response to universal signals 5 and 6. Thresholds are those values of spatial or temporal functions which control the use of these functions. For instance, one threshold $C_{TH}$ controls whether a convex portion of cluster will grow a root (see Tip Function), another threshold $C_{TH}$ controls the root diameter (see Filleting), while still another $C_{TH}$ controls the source function of CD (see Adding A Component). Threshold $M_{TH}$ is instrumental in identifying the temporal response of a memory trace (Eqn. 9); threshold $A_{TH}$ controls filleting of a root. A threshold on CD, $CD_{TH}$, controls whether nodes belong to a junction. Even the bias value in DAC 74 (as in $N_{TH}$, Eqn. 2, 3) and the clip values of XOR/XNOR-like nodes are thresholds which control whether a node fires or not (see Bias and Clip). All thresholds can potentially be altered to improve self-organizing.

To illustrate how thresholds can be modified, consider the junction control threshold $CD_{TH}$. Recall that junction nodes which are modified by universal signals are memory trace nodes with high CD values, values greater than $CD_{TH}$. During classical learning, the CD threshold is set high so that only the most interior nodes of a junction form connections to other nodes. In operant learning, by lowering the value of $CD_{TH}$ slightly each time period P in which the output 3 was incorrect, junction nodes further from the interior are identified for destabilizing.

The incorrect output 3 will continue until it is cured by blocking one of the junctions that produces the incorrect output. Linking $CD_{TH}$ to the punish signal 6a makes the junction more and more likely to be blocked the longer the punishment continues, since more and more of the junction nodes are destabilized. As the CD threshold drops lower with continued punishment, eventually even the core nodes of the activated roots are destabilized. Hence, not only can junction nodes be destabilized but so can the roots which combine to form the junction. Blocking the contributing roots with NOT-like nodes assures that the incorrect output 3 can eventually be cured.

However, once the punish signal 6a ceases (after blocking the roots contributing to the incorrect output 3), the $CD_{TH}$ value is driven back toward a high value consistent with classical learning. Essentially the $CD_{TH}$ value "floats" between low values during punishment and high values when no punish signal 6a is present. An alternative strategy is to decrease the threshold value $CD_{TH}$ slowly during punishment but increase the threshold value during rewarding. When the reward signal 5a signals a correct output 3, the CD threshold is increased again during each period P in which the reward signal 5a is active. Other thresholds can be similarly modified as a result of universal signals to ensure the proper pathways connect during operant learning.

Deleting a Component

Figure 27A:
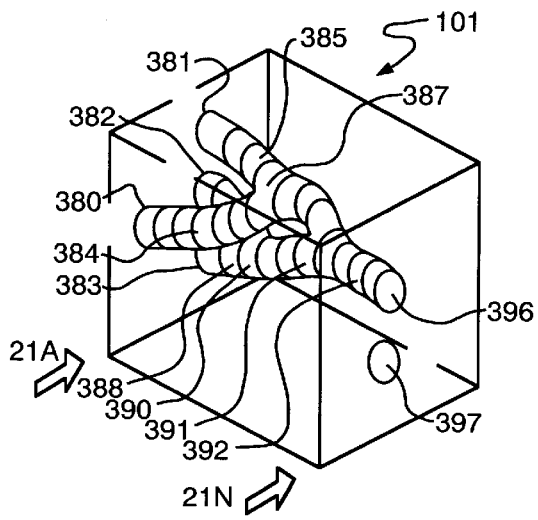
FIG. 27A is a three dimensional representation of stylized root structures describing the deletion of a component in operant learning.

The other important operant learning task of a self-organizing system is deleting a component. In learning the letter "F" when the letter "E" is already known, the lower bar component 383 is to be deleted from the set of components forming the letter "E". FIG. 27A shows the unfolding scenario of a circuit 101 which has learned by association (classical learning) the four components of the letter "E": vertical 380, top bar 381, middle bar 382, and lower bar 383. These components activate roots 384 and 385 which join OR-like at junction 387, as well as roots 388 and 389 which join OR-like at junction 390. Roots from junctions 387 and 390 join OR-like at junction 391 and activate root 392 which activates the letter "E" output 396.

To learn the input 2 pattern "F", components 380–382 of "F" input 2 are activated at the same time as the "F" output 397 is activated. Here again, the output 3 nodes form an attractant MD source but are not part of the memory trace. Circuit 101 should learn that components 380, 381 and 382, and only those, activate letter "F" output 397. Initially though, the absence of component 383 has no effect on the output 3. Junction 390 is OR-like so only input 2 component 382 (the middle bar) is needed to activate the bottom leg of junction 391 and thus the "E" output 396 via root 392. This output 3 is incorrect, triggering the punish signal 6a by the supervisor 9 (FIG. 1).

During punishment, the activated junctions 387, 390 and 391 become more AND-like as their junction nodes are destabilized as shown in the middle diagram of FIG. 25. Note here that junction 390, despite the absence of root 388, still is identified as a junction. Previous classical learning (and/or rewarding) made nearly all junction 390 nodes OR-like; they will continue to be activated even though only one root of the junction is activated. Junction 390 appears as an activated bump on an otherwise uniform activated root 389. As punishment continues, junctions 387, 390 and 391 are also converted from OR-like nodes to AND-like nodes by destabilizing them.

Figure 27B:
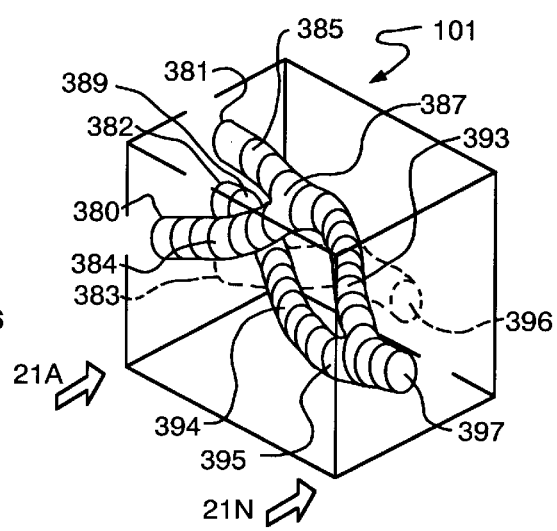
FIG. 27B is a three dimensional representation of stylized root structures shown in FIG. 27A, but at a later time.

Continued punishment eventually blocks one of the junctions 387, 390 or 391 and prevents "E" output 396 from being activated. For this example, assume junction 390 nodes are the first to be converted to NOT-like nodes (shown in the right-side vector diagram of FIG. 25). Consequently, the rightmost segment of root 389 deactivates which in turn deactivates junction 391 (now AND-like) preventing root 392 from activating the "E" output 396. Once punish signal 6a is blocked, tunneling forms new roots 393 and 394 from the stubs of junctions 390 and 391. These new roots grow toward the MD source of "F" output 397 and join at junction 395 which, in turn, grows a root that activates the "F" output 397 as shown in FIG. 27B. When the correct "F" output 397 is detected by supervisor 9, reward signal 5a reinforces the pathways that produced the correct output 397 by stabilizing junctions 387 and 395.

Repeated presentations of the "E" and "F" input 2 patterns produce either a correct or incorrect output 3 detected by the supervisor 9. Punish and reward signals 6a and 5a adjust the activated junction nodes to produce fewer incorrect responses and more correct responses until the circuit 101 can reliably distinguish between the input 2 patterns "F" and "F". Through this process, input 2 patterns which have fewer components than an already-learned input 2 pattern learn to recognize the correct output 3 when a component is deleted.

Complex concepts are composed of simpler components or limitations. Simple components are combined to produce the complex concept much as chemicals are combined to produce more complex chemicals. By either adding or deleting its constituent components through operant learning, the concept can be modified in a myriad of ways. Repeated application of adding and deleting components molds the concept into any conceivable variation. Associating such concepts through classical learning or using the concept as a component to an even more complex concept gives a self-organizing system improved organizational capabilities. In a similar way, complex chemical compounds are constructed from less complex components which in turn become the building blocks of even more complex compounds.

Repulsive Spatial Functions

Improved distinction between system 101 outputs 3 is achieved by repulsive spatial functions. A repulsive spatial function is one which repels roots rather than attracts them. One simple repulsive spatial function is a variation of MD (Eqn. 16) where the source function $M_i$ has a positive sign under reward or associate signal 5 but has a negative sign under punish or distinguish signal 6. In addition, the time constant of the MD function (or its associated source function M) is chosen to persist for many cycles of the pulsating roots. Under these conditions, a "diffusion field" is set up with sources at rewarded roots and sinks at punished roots. Since growing roots seek the highest local value of MD (or the direction of the MD gradient vector), they will tend to avoid punished roots and be attracted toward rewarded roots.

Consider the last example of FIGS. 27A and 27B where the component set 380–383 of the letter "E" is to have component 383 deleted to produce the letter "F" output 397. During the early portion of learning the "F", "E" output 396 produces a punish signal 6a by supervisor 9 which converts nodes of junctions 387, 390 and 391 to AND-like and then to NOT-like nodes, blocking the path to "E" output 396. New roots 393 and 394 grow from the blocked junction(s) and connect with "F" output 397. Now initially the path to "F" output 397 is a tenuous one. It is secured by repeated presentations of the "E" and "F" input patterns 2 (i.e., the set 380–383 or the set 380–382). During these presentations, junction nodes of junctions 390 and 391 determine which output 3 will be produced.

Suppose that during one of these presentations the input 2 set 380–382 for letter "F" erroneously produced the letter "E" output signal 396. When an incorrect output 3 results, the punish signal 6a makes the sign of the MD source function ($M_i$) negative for those roots which produce the incorrect output 3: junctions 390, 391 and root 392 shown in dashed lines in FIG. 27B. These nodes become a sink for MD rather than a source, reducing the values of MD in their vicinity. When a correct output 3 results, the reward signal 5a makes the sign of the MD source function positive for nodes that produced the correct output 3: roots 393 and 394. Since the MD values persist from one input 2 presentation to the next, nodes targeted by root direction and filleting are preferentially made to ones with high MD values. As roots grow they are guided by diffusion fields which are high in preferred regions near sources but low in regions near sinks which are to be avoided. In addition, branch functions B can incorporate the diffusion field MD as part of the competition mechanism for choosing inputs 25, assuring that densifying avoids connections with punished memory traces nodes.

SEQUENTIAL PATTERNS

The patterns described in classical and operant learning thus far have been combinational patterns: the input 2 of each component exists at the same time as other input 2 components. For example, in recognizing the letter "E" (FIG. 27A), all of its components 380–383 occur at the same time to produce the "E" output 396. However, simultaneous inputs 2 are not required for the operation of the classical or operant learning methods disclosed: the input 2 patterns for which the learning rules apply may be either static or time-varying (see Change Sensitive and Burst Functions).

Figure 28A:
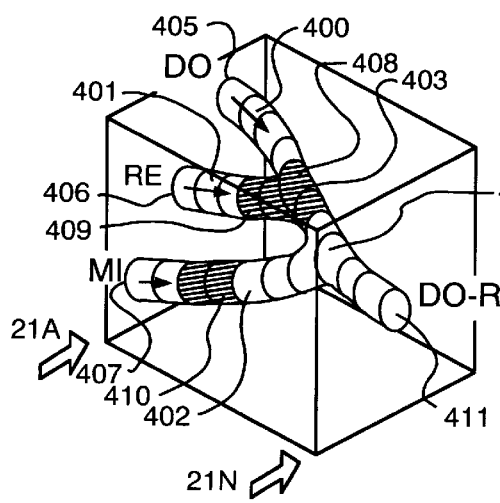
FIG. 28A is a three dimensional representation of stylized root structures describing the flow of sequential information from one root structure to another.

FIG. 28A shows a sequential pattern being learned by the network 101. Again, only negative bias nodes (AND-like and OR-like nodes) are shown for simplicity. The tones DO, RE, and MI are inputs 2 to the network 101: first the DO input 405; second, the RE input 406; and third, the MI input 407. Recall that in the preferred embodiment, each root is made up of pulsating nodes which change state in "pulses" since some of the nodes have direct feedback. Memory trace roots can be thought of as tubes through which the pulses flow and which guide the pulses to their destinations.

At the instant shown in FIG. 28A, pulse 408 of changing nodes (indicated by cross-hatching) has moved along root 400 from its initialization at level 21A nodes 405 (DO input 2). The connections formed at junction 403 assure that pulse 408 nodes will progress to junction 404 only if it is met by a second pulse 409 of changing nodes traveling along root 401. This second pulse is initiated by RE input 406 at a later time than the initialization of DO input 405. Also shown is a third pulse 410 from MI input 407, which initiation was delayed in time from the initiation of second pulse 409 from RE input 406.

Figure 28B:
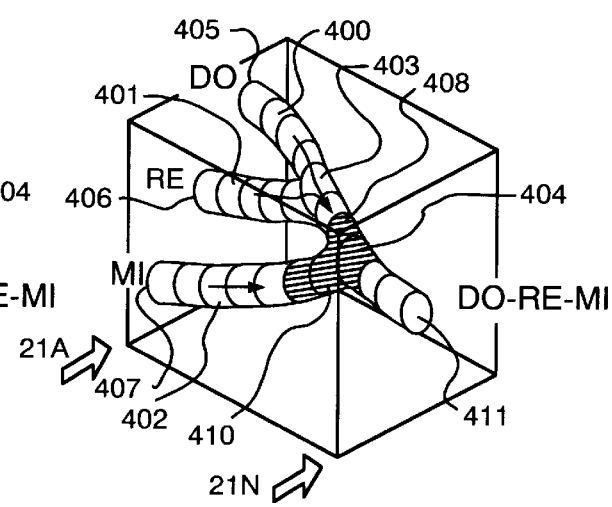
FIG. 28B is a three dimensional representation of stylized root structures shown in FIG. 28A, but at a later time.

Reinforced at junction 403 by pulse 409, pulse 408 continues along root 400, arriving at junction 404 as shown in FIG. 28B. There it meets third pulse 410 which reinforces pulse 408, allowing it to progress to DO-RE-MI output 411 at level 21N. The process of delayed pulses reinforcing a previous pulse and allowing it to pass through a junction is like a relay race: each runner arrives at the exchange point at the proper moment and passes the baton to the next runner.

Roots 400–402 which form the connections to DO-RE-MI output 411 grow by the same tunneling, destabilization, root steering, filleting and either classical or operant learning rules as roots to combinational input 2 patterns. For sequential inputs 2, pulses 408–410 are transient in nature. However, the temporal filter functions (such as the preferred memory trace function M of Eqn. 9) are such that they persist even after the pulse has passed through the root. Spatial functions such as Close (Eqn. 14), CD (Eqn. 15), Tip (Eqn. 16) and MD (Eqn. 17) also persist, steering roots 400–402 of the same sequential input 2 pattern to connect and produce the correct DO-RE-MI output 3.

As in combinational patterns 2, once junctions 403–404 form they are OR-like since they formed under classical learning. When any one of the components 405–407 are activated, even transiently, roots 400–402 direct the input 2 pattern to the DO-RE-MI output 3 at nodes 411. The supervisor 9 signals the incorrect result by triggering the punish signal 6a which destabilizes junctions 403–404 toward AND-like junctions. After many lessons, only the combination of all three components 405–407 will activate the DO-RE-MI output 411.

Although the pulse of changing nodes consists of some firing nodes and some which are not firing, only firing nodes of the roots 400–402 connect at junctions 403–404 (see Root Paths). Consequently, the learning process tends to select nodes at the tail of the earlier pulse and the head of the later pulse. In FIGS. 28 for example, the RE input 406 in root 401 is delayed in time compared to DO input 405 in root 400. When the two pulses join at junction 403, it is the lead nodes of pulse 409 that connect with the trailing nodes of pulse 408. Through the punish 6a and reward 5a signals of many lessons, only pulses arriving at junction 403 in the proper sequence activate root 400 beyond junction 403 to potentially activate output 3.

For longer delays between sequential inputs 2, the action of punish 6a and reward 5a signals alters the propagation speed of the pulses involved: slowing down the earlier pulse or speeding up the later pulse. One method of altering the pulse propagation velocity relies on the slower onset time of AND/NAND-like nodes. AND/NAND-like nodes of root junctions have a lower Fill and require more time to activate than do OR/NOR-like nodes. As junctions become more AND/NAND-like during punishment, the earlier pulse is delayed in time with respect to the later pulse; the later pulse "catches up" at junctions so the two pulses combined can activate the root beyond the junction.

In FIGS. 28, pulse 408 is delayed as it progresses through AND/NAND-like junction 403, letting pulse 409 (with fast onset OR/NOR-like nodes in its core) catch up to pulse 408. Since junction 403 is AND/NAND-like, only the combined presence of both pulses allows the pulse to propagate beyond junction 403. A similar process occurs at junction 404: pulse 410 propagates much faster through root 402 than pulse 408 which passes through two AND-like junctions 403 and 404. Only the combined presence of pulses 408 and 410 at AND/NAND-like junction 404 activate the DO-RE-MI output 411. Through operant learning only the correct output 3 is activated by the sequence of component input 2 patterns.

Another method of altering the propagation speed is to adjust the pulsating characteristics of trace nodes under universal punish and reward signals, 5 and 6. Recall that the oscillation period of a node 77 is controlled by its direct feedback signal (see Direct Feedback). Just as thresholds can be modified by punish and reward signals (see Altering Thresholds), so can other attributes of trace nodes such as node oscillator characteristics.

In FIGS. 28, when punish signal 6a slows root 400 pulse 408 by increasing the oscillation period of root 400 nodes, delayed pulses 409 and 410 can arrive at junctions 403 and 404 in time to connect with pulse 408. Alternatively, reducing the oscillation period of root 403 and 404 nodes 77 speeds pulses 409 and 410 with respect to pulse 408 to assure the pulses connect at junctions 403 and 404. Other trace node oscillator characteristics such as the ratio of firing versus non-firing time during an oscillation can be modified by punish and reward signals 5 and 6 to improve recognition of sequential input 2 patterns.

Altering the propagation speed of a pulse such as pulse 408 can be accomplished in a more generalized way: alter the oscillation speed of its trace nodes based on timing differences between it and other pulses. This method varies the speed of propagation over that portion of the root prior to junctions with other roots having pulses arriving at the junction at different times. For example in FIG. 28, root segments 400 and 401 alter their propagation speed such that pulses 408 and 409 arrive at junction 403 at the same time. Since the propagation speed is changed over a much longer segment of root, time differences between the input patterns (such as DO and RE in FIG. 28) can be greater while still ensuring synchronization of the pulses.

Detecting the timing difference between pulses is accomplished by a short-lived space function, PD for Pulse Diffused. As a pulse traverses a root it produces PD, a function much like MD (Eqn. 16) which has both time and space aspects. It's space function is a space summation function (Eqn. 12) which uses its firing value X or the sign of its Fill (Eqn. 5) as the source function $S_k$. PD diffuses from the memory trace into the space around in much the same way as MD permeates into both memory trace structures (M>0) and non-trace regions (M=0). It's time aspect is the same as the Combined Filter (Eqn. 9) of the memory trace function M, except PD has a very short time constants, $T_1 T_2$. Typically the time constants are set to give a quick rise ($T_1$=1 T to 5 T) and a slower decay ($T_2$=10 T to 20 T) in terms of the iteration time T. PD could also stand for Pixie Dust: it behaves like the pixie dust that diffused from the tip of Tinkerbelle's wand in the Disney movie Peter Pan. The wand tip was the source of pixie dust that diffused into the surrounding region but quickly dissipated.

Propagation speed through a root is increased when a node is adjacent to another node to which it has no connections ($|W_k|$=0) and which has a PD value above a threshold $PD_{TH}$. This means that the pulse is behind another adjacent pulse (it runs into PD which it didn't create) and should speed up. Conversely, when a node is adjacent to another node to which it has no connections ($|W_k|$>0) and has a PD value well below a threshold $PD_{TH}$, then its propagation speed is decreased. This means the pulse is ahead of other pulses on nearby traces and should slow down. For the most efficient pulse synchronization, the above effects can be propagated through the memory trace using a space function similar to CD (Eqn. 14) which only diffuses within the confines of the trace. After many lessons, the pulses synchronize as discussed above and connections are made between nodes 77 which fire at the same time. The process is self-adjusting such that as the pulses approach synchronization the speed of propagation is no longer changed.

Note that if the pulses do not synchronize immediately, their traces continue to grow to higher levels 21 but without connections from one trace to another. Without connections between traces, each trace acts independently with its own growing tip controlled by its own Tip function. Since traces are attracted to each other due to positive MD sources, traces which have not yet synchronized grow in parallel adjacent channels to higher and higher levels 21, even as they avoid other traces which have not been activated and as they seek an MD source. In the DO-RE-MI example of FIGS. 28, the junctions 403 and 404 become stretched out, covering many different levels. Only when their pulses have synchronized do connections between firing nodes in the roots suppress Tip production and prevent roots from having their own growing tip, finally allowing roots 400, 401 and 402 to merge into a single root.

Speech recognition and motor (muscle) coordination are important sequential tasks of the present invention. These applications are more easily learned if the pre-processor circuit 20 (FIG. 2) has inputs 25 to the first level 21A which "duration sensitize" the inputs 2. Duration sensitizing means that inputs 25 to level 21A respond most strongly for a particular duration of input 2 signal.

Improved speech recognition occurs when preprocessor circuit 20 converts inputs 2 to level 21A inputs 25 having both frequency and duration aspects. Different inputs 25 respond only when the proper frequency occurs for the proper duration. In FIGS. 28, if DO input 405 represents its acoustic frequency equivalent (i.e., its tone), then each DO tone of a particular duration is represented by a separate level 21A input 2: one input 2 for DO tone of 0.1 msec duration, another for 0.2 msec duration, and so forth. Roots based on duration sensitive inputs learn not only the correct sequence of inputs 2 but also their correct duration.

Living organisms likely use a similar technique: neurons are sensitized for sound duration in the inferior colliculus of the big brown bat (J. H. Casseday, D. Ehrich, and E. Covey, "Neural Tuning for Sound Duration: Role of Inhibitory Mechanisms in the Inferior Colliculus", Science, Vol. 264, May 6, 1994). Indeed, voice prints which are so useful in identifying speech patterns are simply sequences of phonemes each of which has different frequency constituents for different durations.

COMPLEX NETWORKS

As a result of stabilizing or destabilizing activated junction nodes due to correct or incorrect responses, network 101 can be taught to recognize any input 2 pattern and distinguish it from one with an added or a deleted component. More complex patterns can be learned by adding or deleting other components (single components or more than a single component) and associating or distinguishing these new patterns from others already learned through punish and reward signals.

For example in distinguishing letters of the alphabet, a "C" might be learned first. Then adding a "middle bar" component distinguishes the "C" from a "G"; adding a "right curve" component distinguishes the "C" from an "O"; adding a "tail" component distinguishes the "O" from a "Q" and so forth. Distinguishing usually involves punish signals 6 since differences involve AND/NAND-like junctions where the correct output 3 results only when all input 2 components are present.

By contrast, associations result when reward signals 5 form OR/NOR-like junctions of roots from input 2 components. Consider the letter "A". normally its components are a "right slant" component combined with "left slant" and "middle bar". But other component combinations are also acceptable: "vertical", "left slant" and "middle bar" or "right slant", "vertical" and "middle bar". Since any of these combinations are correct, they all should result in "A" output 3. The component roots can first combine AND/NAND-like and then each component set variation can connect OR/NOR-like to activate "A" output 3. Alternatively, the OR/NOR-like junctions may be component-to-component junctions where roots from the input 2 components join OR/NOR-like prior to the component roots joining AND/NAND-like.

The order in which the various junctions form under universal signals depends upon how the circuit was trained: which patterns were presented as input 2 patterns and in which order. Nevertheless, incorrect junctions are replaced by correct junctions as universal signals assure that the resulting output 3 is correct.

Input 2 components can combine in OR/NOR-like fashion, in AND/NAND-like fashion or in NOT-like fashion to assure only the desired input 2 pattern produces the correct output 3. Since these Boolean elements incorporate the three major logic types used in categorizing, any type of information can be built up from its components. Patent claims, library computer searches, and indexes of catalogs all use OR/AND/NOT logic to organize information. For example, an independent patent claim is usually an AND combination of components sometimes refined by NOT elements. Dependent claims AND-combine more components to the independent claim, restricting it and distinguishing over prior art. Yet the independent claims combine OR-like to give the total set of claims allowed by the Patent and Trademark Office.

Root Branching

The roots shown in FIGS. 20–28 "fan in" as they combine. The resulting structure is one where a group of components produce an output 3. Input 2 roots combine at junctions to have fewer roots than there were before the junction. However "fan out" of roots can also occur where a root can branch to produce more than one output 3. When several output 3 sources activate in combination or in sequence, each one is a source of MD which draws the growing root to it. Roots branch or bifurcate to produce more than one output 3.

As an example of root branching, let circuit 1 be used to actuate a robot's golf swing. In coordinated movement such as a golf swing, several motor commands must actuate in the proper sequence to produce the desired output. The simplified sequence of motor commands SHOULDER, ELBOW and WRIST reflect the joints and order which output 3 nodes should actuate from the SWING input 2 command. A root begins to grow from the activated SWING input 2 towards SHOULDER output 3. It is also attracted to the MD sources from ELBOW and WRIST output 3 since the MD function persists briefly even after the MD sources for each output 3 has ceased. The root is drawn to the average direction of the three output MD sources.

As the root gets closer to the SHOULDER and ELBOW sources, it splits as it is pulled apart by the two MD sources at different output 3 locations. Branching begins when each side of the root tip targets two different nodes, each in the direction of one of the MD sources (one toward the SHOULDER source and one toward the ELBOW source). Once these nodes are destabilized, any small convexity formed on the root tip makes Close locally higher; the resulting CD flow drives Tip into the convexity. Another Tip node forms and the root branches and steers toward the individual MD sources, each root tip maintaining its own Tip node. As the ELBOW root branch approaches the MD sources for ELBOW and WRIST, it branches again and individual roots connect to each MD source. As in other operant learning, punish and reward signals adjust the timing and correctness of the sequence of joint motions to produce the proper swing. The result is that a single input 2 produces three coordinated outputs 3 through root branching.

While the example shown was a sequential one, combinational root branching is also a powerful self-organizing tool for learning patterns. For instance in language translation applications, a particular combination of input 2 letter components may have several possible word outputs 3. The letters "M", "A" and "N" in combination can give an output 3 that is later associated with an "adult male". Another output 3 triggered by the same combination may later become associated with "humanity". Root branching is one way for an input 2 to have several outputs 3.

Another method of root branching forms tree-like structures through root-budding. A spatial summation function, TD (Tip Diffused) uses Tip nodes as a source for a Poisson variable which diffuses only within the root in a similar way as CD (Eqn. 14) diffuses only within the root. TD is high at the root tips but grows weaker farther from the tip nodes. Low TD values mean the root is depleted of TD since it is far from any Tip node. Values of TD below a threshold $TD_{TH}$ can be used to trigger budding: the production of other Tip nodes (for example, by coupling the C threshold $C_{TH}$ of Eqn. 14 or the source Tip TO of Eqn. 15 to low TD values).

As a root stem grows to a certain length, it develops a new Tip node which, like a bud on a tree branch, is the beginning of a root branch. The new root grows until it becomes so long that its own TD is locally depleted and another new bud develops. Tree-like structures are produced as root budding and branching occurs when a root becomes too long. High $TD_{TH}$ values produce short oak-like branches; low $TD_{TH}$ values produce long willow-like branches. The branched structures help insure that the path of an input 2 is not blocked by inactivated traces during classical and operant learning.

A third method of root branching uses memory trace structures which repulse at they grow rather than attract. As explained earlier (see Operant Learning: Repulsive Spatial Functions) when the MD function has negative sources rather than positive ones, it repulses roots. They grow away from the root, not towards it. In deploying roots which connect to motor outputs as in the SHOULDER, ELBOW and WRIST response above, repulsive signals allow a root to branch without reconnecting again after the bifurcation. Indeed there is evidence from developmental biology that as the nerve growth cones of neurons grow to connect to motor neurons, some guidance molecules such as collapsin repulse the growth cones rather than attract them.

One way of implementing repulsive MD functions is making the sign and magnitude of a root's MD sources vary in proportion to its level 21. That is, the MD source value of root nodes at low levels 21 near the input level 21A (FIG. 15A) is large and positive while those near the output level 21N are large and negative. In between, the sign of MD sources is positive (attracting) but decreasing in magnitude until reaching the middle of the network 101. After the midpoint level, MD source values turn negative (repulsive) and increase in magnitude as the level 21 increases.

As roots grow from input level 21A to output 21N, they are initially attractive such that many network input patterns coalesce to a single root. As this root grows past midpoint in network 101, the MD sources change to negative. Branches which bifurcate are repulsed from each other as they grow toward the output level 21N. Topologically the structure is like a tree that has its root system at the input level 21A, roots which coalesce to produce a central trunk, then a trunk which bifurcates into limbs, branches and twigs at the output level 21N.

Another way of using repulsive memory trace structures is to use the TD (Tip Diffused) function which produces bifurcation and budding to also trigger MD sources to be locally negative. When the TD is low (far from the root tip), the sign of the MD source values change to negative and new branches formed are repulsed from the central root. This method can complement root branching based on level 21 discussed above.

Larger Networks

Figure 29:
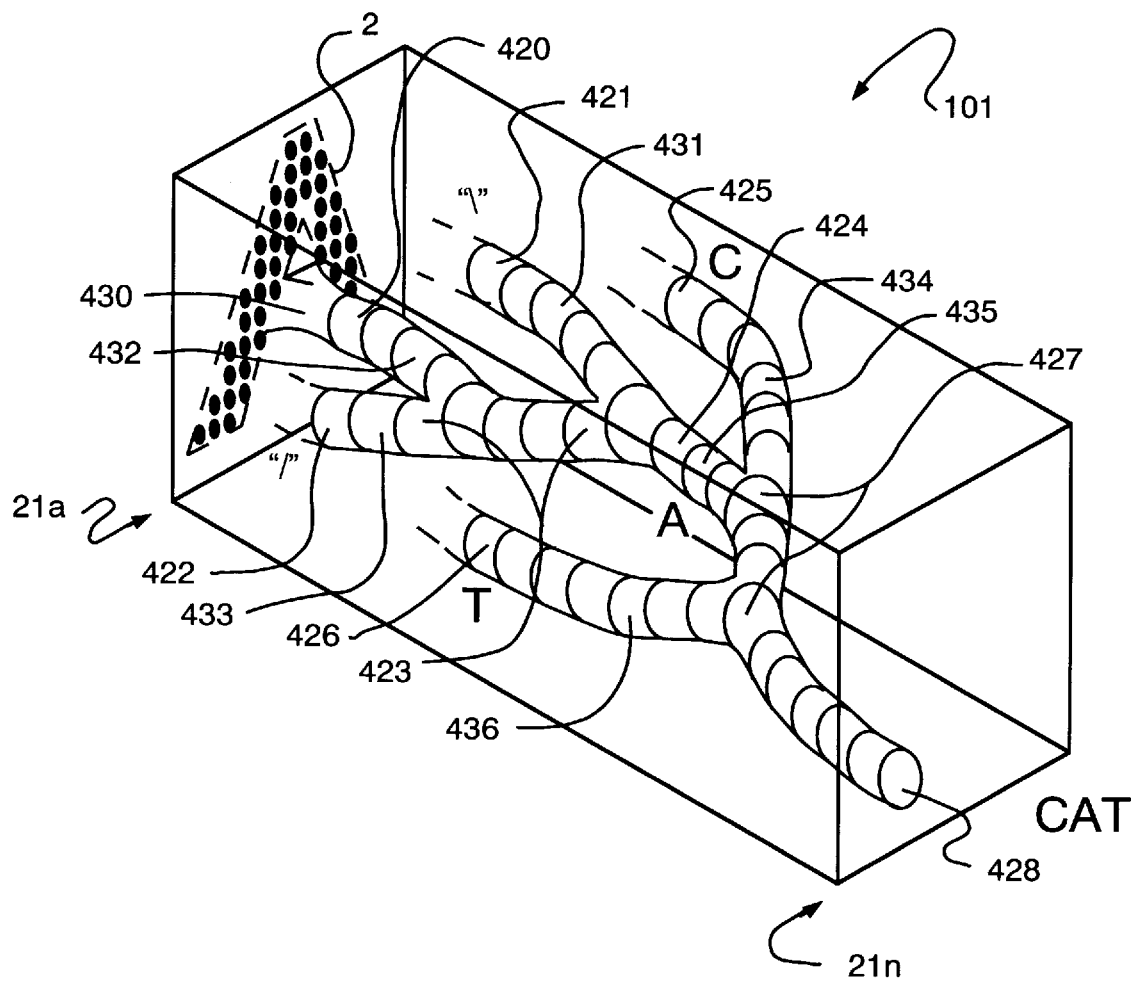
FIG. 29 is a three dimensional representation of stylized root structures in a large assembly of node circuits describing an example of determining letters and words from graphical input.

A large network 101 is shown in FIG. 29 to recognize words from graphic input 2 patterns presented at level 21A of the network. "Graphic" used here means that each input 2 pattern is an array of dots that describe a particular pattern to be learned much like the output of a dot matrix printer represents graphic information. Each dot represents an activated input 2 to a node 77 in level 21A. FIG. 29 shows a graphic representation of the letter "A" as an input 2 pattern.

The network 101 of FIG. 29 first learns the components 420–422 of letters, such as right slant 422 ("/"), middle bar 420 ("–") and left slant 421 ("\") along with other components of other letters (not shown for clarity). To learn components, temporary MD sources 420–422 are inserted by the computer 9 at nodes within the network 101 to provide a rendezvous for roots growing from level 21A. Like the "R" and "F" output 3 nodes discussed earlier, these MD sources do not correspond to actual roots where the nodes 77 pulsate, but rather the MD source function ($M_i$ in Eqn. 16) is altered to attract the appropriate roots. While these MD sources can be inserted anywhere in the network 101, for the most efficient learning they are located part of the way between input 2 level 21A and output 3 level 21N.

In FIG. 29, MD source 420 has been actuated and roots 430 have converged onto source 420 from the "middle bar" inputs 2 of level 21A. Other components such as left slant and right slant are also trained to converge onto their respective MD attractors, sources 421–422. Similarly, other letter components (not shown) are trained to converge onto their respective MD sources. As each component is learned, the input 2 pattern to be learned is presented at the same time that the MD source for that component is activated; the supervisor 9 initiates the learn signal 8 (FIG. 1) to let root growth proceed. Once the root has grown to the MD sources, the learn signal 8 ceases. Punish and reward signals 5 and 6 adjust the root junctions to be AND/NAND-like, OR/NOR-like or NOT-like depending on the correctness of the intermediate outputs such as 420–422.

Once intermediate components such as 420–422 are learned by network 101, combinations of these components let the network learn and recognize letters. In FIG. 29, the supervisor 9 has inserted MD source 424 further along toward level 21N to attract the components 420–422 of the letter "A", much as the components of "E" produced letter "E" output 396 in FIG. 27A. When the letter "A" is activated as graphic input 2 pattern at the same time as MD source 424, roots (not shown) activate components 420–422. Then roots 431–433 grow from each of the components 421–422 toward MD source 424 on learn signal 8 initiation. The learn signal 8 ceases when roots 431–433 join at junctions 423 and converge onto source 424. The letter "A" output is again an intermediate output. Through punish and reward signals 5 and 6, operant learning adjusts the junctions to be AND/NAND-like, OR/NOR-like or NOT-like so the input 2 pattern for various letters such as "A", "C" ad "T" activate the correct intermediate output nodes 424–426.

Alternatively, intermediate components like 420–422 need not be learned prior to learning the letter components 424–426. If the input 2 pattern for the letter "A" and the intermediate source nodes 424 are activated at the same time as the learn signal 8, roots (not shown) will grow from level 21A directly to the MD source 424. After learning, triggering the "A" input 2 pattern will activate the "A" intermediate output nodes 424. However, subsequent learning of other letter outputs such as "C" and "T" are somewhat less efficient than when the intermediate components are learned first. Moreover, if particular components are needed for further pattern recognition tasks, they have a location known to the external source 9; the components are named (see Naming and Intermediate Outputs).

Note that other graphic input 2 patterns can be learned by the same network 101. For instance, lower case letters "a", "c" and "t" can be learned by network 10 1 even after upper case letters "A", "C" and "T" have been learned. Presenting the "a" input 2 pattern to level 2 will activate other components (or will produce roots for those components if they have not already been learned). On activating MD source 424 for upper case letter "A" along with the "a" input pattern draws the roots from lower case "a" components to source 424. As these roots join and converge on source nodes 424, they form an OR/NOR-like junction with roots from the "A" components: either input 2 pattern will activate the source nodes 424.

Once many output letters such as "A" letter 424 have formed in circuit 101, many roots intertwine through levels 21A . . . 21N. Roots 430–436 in FIG. 29 are shown because they are activated. Many other roots are not activated (and are not shown), yet these roots may lie side by side with the roots shown. In porous embodiments, portions of other roots may even lie within the roots shown. As a root grows, it avoids other roots by picking target nodes with minimum WTSUM (Eqn. 17 and 20). For instance, by minimizing the firing balance (i.e., use WTSUM to target the least stable neighbors) lets growing roots avoid other roots if at all possible. If not, then, at worst, the growing root will only tunnel over another root's skin since skin nodes are less stable than core nodes. "Forgetting" is when roots are driven over by new roots and the connections to the original output 3 (or intermediate output) are severed.

Despite the close proximity of one root to another, adjacent roots are not activated because no connections span the boundaries between roots. Each node in the root is connected to "upstream" nodes in the same root, but not to nearby roots. Only at junctions (see FIG. 22) or if nearby roots are activated at the same time will connections be made from one root to the other, across root boundaries. Each memory trace root originating from an input 2 pattern behaves independently, much like parallel axons of neurons in the spinal cord don't interact.

Continuing with FIG. 29, after the graphic input 2 patterns for letters have been learned by network 101 to activate the correct intermediate outputs 424–426 (among others), their DAC 60 weights are fixed. Here naming of intermediate outputs 424–426 is appropriate: various combinations of these outputs can be used to form different words, the next highest level of complexity. FIG. 29 shows how the word CAT is formed from three letter elements: letter "C" 425, letter "A" 424 and letter "T" 426. The graphic input 2 pattern of the three elements are presented sequentially to level 21A, first the "C" pattern, then the "A" pattern and last the "T" pattern.

The input 2 patterns, either through intermediate components such as 420–422 or directly, activate roots 434–436 which are attracted to MD source CAT output 428. Since each letter element 424–426 has its input 2 pattern presented at the same time, each element 425, 424 and 426 activates in the same sequence. In a similar process as was shown in FIGS. 28, pulses of firing nodes from roots 434–436 assure that CAT output 428 is only activated when junctions 427 pass the pulse from root 434 to root 435 to root 436 in the correct order. Through training, punish and reward signals 5 and 6 also prevent other word output 3 nodes from being activated by elements 424–426.

The circuit 101 of FIG. 29 combines combinational input 2 patterns (components 420–422 and letters 424–426) together with sequential input 2 patterns (e.g., producing CAT output 428). While the distinction between combinational and sequential input 2 patterns provides insight into the operation of network 101, the distinction is an artificial one. Memory trace nodes 77 operate on other nearby memory trace nodes without regard to the input 2 patterns which might have triggered them. The correct CAT output 3 pattern could have been learned by simply presenting the sequence of input 2 graphic patterns one after the other. A different set of roots than roots 430–436 would have arisen to activate CAT output 428, but the result would be the same.

PERSISTENCE, OUTPUT FEEDBACK AND JUDGEMENT

When sequential or combinational patterns for the graphic input 2 patterns are presented to the circuit 101, the resulting information is available as a pulse of firing nodes, similar to the pulse 404 of FIG. 28B representing DO-RE-ME as output 411. However these outputs do not persist; the pulse output 3 at level 21N does not last longer than the initial input 2 patterns. If the input 2 patterns cease, the output 3 also ceases. Although a certain amount of delay between inputs 2 is possible using sequential methods discussed earlier (see Sequential Patterns), the time delays are not long enough for many applications of self-organizing circuit 1. Output signals 3 which persist and are available for interaction with later input 2 patterns improve the pattern recognition capability of circuit 101.

One important technique for improving persistence is "output feedback": feeding back signals 3 and associating them with the nodes of level 21A triggered by input 2 patterns. For example in FIG. 27, the output 397 which represents the letter F makes associative (OR/NOR-like) connections with the F input pattern 2 that was used to produce the output 397. OR/NOR-like connections are made from the output signals 3 to the nodes triggered by input signals 2 such that these nodes are activated either by the inputs 2 from sensors 10 (FIG. 1) or by the outputs 3. Output feedback allows pulses to circulate repeatedly through activated memory traces.

Pulses which begin at input patterns 2 for components 380, 381 and 382 flow through root segments 384, 385, 393 and 394 to produce a pulse at output 397 representing the letter F (FIG. 27). This pulse is fed back to each of the nodes of inputs 380, 381 and 382 as OR/NOR-like connections that trigger the same pulses to flow again from level 21A. OR/NOR-like connections have weights which can independently cause the node to have a Fill value greater than its Bias causing it to change state (see AND/NAND-LIKE TO OR/NOR-LIKE and FIG. 21) whenever the nodes that drive it (the nodes at output 397) are firing. The individual pulses initiated at inputs 380, 381 and 382 combine at junctions 387 and 395 to once again produce the pulse of firing nodes at output 397 and the pulse continues to circulate through the activated trace. If the inputs into level 21A which originally produced the pattern F are removed, the pulses continue to circulate through segments 384, 385, 393 and 394. Eventually the circulation of pulses cease when the memory trace function dissipates ($ABS(Z_3-Z_4)>M_{TH}$ in Eqn. 9).

Feedback of outputs 3 to inputs 2 has a another value: it assures that the outputs 3 are more closely aligned with a previously stored memory traces. Suppose an input pattern 2 such as the F pattern of FIG. 27B has inaccuracies: the top bar component 381 is not quite horizontal, the vertical 380 has a slant to it and so forth. Once it triggers segments 393 and 394 to produce output 397, that output feeds back to the learned input components 380, 381 and 382. It is these previously learned inputs 2, in addition to the inaccurate ones, that produce the pulses which circulate repeatedly through segments 384, 385, 393 and 394. When the inaccurate input patterns 2 cease, it is these segments that continue to support the circulation of pulses through output 3—the output whose stored memory trace most closely matches the original pattern. If one were to correlate the human notion of a "thought" with the operation of circuit 101, it would identified as the persistent circulating of pulses through memory traces.

Feedback from outputs 3 to inputs 2 have another value as well: circulating pulses can trigger memory traces of related patterns. For instance, input pattern 2 sensing the pattern for the string of letters EGG would produce a memory trace structure with output 3 nodes similar to those shown in FIG. 29. The Chinese pinyin word for the English word EGG is DAN. If the string of letters DAN was subsequently input as a second input pattern 2, another memory trace structure would grow towards output level 21N. In order to associate the two (see Classical Learning), the output 3 nodes which attract the DAN root is the same as the EGG output 3 nodes.

Now when the output 3 nodes are fed back to the input 2 patterns that produced them, if either the DAN or EGG pattern is input to level 21A, pulses will circulate through both the EGG trace and the DAN trace. Activating either will also activate other associations that either trace has. Suppose that the memory trace for EGG is also associated with components that identify the meaning of EGG (components such as "white", "round", "food"). When the word DAN as an input 2 pattern activates the DAN trace, it also activates the EGG output 3 by association. Then by output feedback to the input 2 patterns, the EGG trace is activated which in turn activates other associations of the EGG trace representing "white", "round", "food" and so forth. Consequently, pulses circulating from the original DAN input can activate far more than that single trace as output feedback to the input level 21A triggers related input patterns.

Such a feedback mechanism is thought to exist between the hippocampus neurons and the cortex neurons in the brains of mammals. Incoming sensory information passes through the hippocampus on its way to the cortex; outgoing motor information also passes through the hippocampus on its way to the motor portions of the spinal cord. The hippocampus is thought to be an associative part of the brain where signals from various sensors (eyes, ears, nose, touch) are associated together in much the same way that EGG and DAN are associated in the example above. These associations let a particular smell that is sensed to elicit the memory of an entire scene.

A complementary method of encouraging the persistence of pulses circulating through the memory traces is the use of "oscillating" node circuits 77. Such nodes have the output 26 fed back to inputs 25 of other nearby nodes 77 via positive/negative DACs 70. These nodes are coupled in that when one fires it causes the other not to fire (see Non-Firing Nodes). When the input delay 68b (FIG. 6A) of coupling inputs 25 are properly adjusted, the nodes are encouraged to fire in periodic bursts.

When such nodes 77 is incorporated into memory trace structures, pulses through the memory trace continue fire after the nodes initially are activated by inputs 25 from other nodes in the root. Generally only a small portion of nodes 77 are required to be coupled in this way to produce pulses which persist. Oscillating nodes can be combined with output feedback by having a larger portion of these nodes in the lower levels 21 of the circuit 101. Living organisms seem to operate in a similar way: neurons in the reticular complex surrounding the thalamus have excitory connections from the cortex which inhibit the relay of thalamic sensory input producing periodic bursts of firing in the cortex.

Judgement

Judgment is a capability of humans (and lower organisms) which allows decisions to be made based upon past experience. A corporation executive has good judgment in negotiating a contract when he brings to bear all his previous experiences in contract negotiations to decide which of several alternatives are the best. These past experiences are often based on "emotional memories", memories which were related to pleasant or unpleasant experiences.

The self-organizing circuit 101 can develop similar judgments based upon past experiences. Judgment is similar to output feedback as described above. But instead of associating an activated output 3 with the input 2 nodes that are activated, a memory trace output from level 21N is associated with a "judgment subcircuit". A judgment subcircuit is like a node subcircuit 77 of FIG. 7A: it has inputs from level 21N which can have either positive or negative weights held in a DAC (such as DAC 70a . . . 74n of FIG. 7A). Positive weights to the judgment subcircuit occur when the learning takes place under pleasant circumstances; negative weights occur when the learning takes place under unpleasant circumstances. As in subcircuit 77, the weights are summed only if their respective inputs from level 21N are firing. Unlike subcircuit 77, the output of a judgment subcircuit is simply the output of the summation amplifier 30 of its voter circuit 32 (FIG. 3); the output is analog, not digital, and represents the summation of weights whose inputs 25 (FIG. 7A) are firing.

An alternate form of judgment subcircuit makes positive or negative connections from each node circuit of the memory trace as the memory trace structure is initially formed. Instead of only having connections to the judgment subcircuit from the level 21N, the judgment subcircuit has connections from each node of the memory trace on all levels 21. As above, each connection is weighted positively when the learning takes place under pleasant circumstances and negatively when the learning takes place under unpleasant circumstances.

The following example will illustrate how the judgment subcircuit can be used for making decisions based on past experiences. Suppose the self-organizing circuit 101 (FIG. 29) learned all the letters of the alphabet as graphic input 2 patterns. When the letter A was learned, the circuit was "punished" such that the output 3 of the letter A connected a large negative weight to the judgment subcircuit. But when the letter S was learned, the circuit was "rewarded" by connecting the letter S output 3 to the judgment subcircuit with a large positive weight.

At a later time, various words are learned by combining these components together. When a word being learned contains the letter A, the firing of the A output 3 operating through the negative weight to the judgment subcircuit produces a negative summation of inputs to its summation amplifier and a negative output voltage. Words which included the letter A such as APT, CAN or BLA would be judged negatively, something undesirable, because the output of the judgment circuit would be negative. Conversely, if the word being learned contained the letter S such as SIN, IST or DOS, it would be judged positively, something desirable, because the output of the judgment circuit would be positive. Words which contained both A and S such as SPA or ASP would be judged neutrally, neither desirable nor undesirable.

Living organisms from the fruit fly to humans have analogous memory circuits. When a rat, say, is shocked at the same time it hears a tone, it associates the tone with the shock in behavior called fear conditioning. Subsequently the tone alone will elicit a fear response from the rat. When that tone is used in combination with other tones, it can also elicit a fear response similar to the description above.

OTHER EMBODIMENTS

Other embodiments are detailed in prior patents and continuations by the present inventor: U.S. Pat. No. 4,479, 241, U.S. Pat. No. 4,774,677, U.S. Pat. No. 4,989,256, U.S. Pat. No. 5,161,203 and U.S. Pat. No. 5,515,454. These patents include variations of the self-organizing system and are mentioned here because the present invention also applies to the these variations. In these patents, the preprocessor circuit 20 is explained in more detail. Specific embodiments of circuits 20 can preprocess information into a form acceptable to the self-organizing circuits in levels 21. The two types of information fall generally into the classes of static and time-varying information. An example of the former is visual information patterns representing printing or handwriting; an example of the latter is audio information such as recognizing patterns of speech or music.

Another embodiment of the prior inventions is to provide primarily analog methods of accomplishing self-organizing, to provide primarily digital methods of self-organizing and also to provide variations which include some analog circuitry combined with some digital circuitry to accomplish self-organizing. Other means for weighting (how much one circuit 77 can influence its own firing or that of another circuit 77) are discussed which don't use DACs 60.

In the present invention substantially parallel circuitry is used for circuits 77 which accepts multiple inputs 25 from other similar circuits 77, which acts on these inputs, and outputs signals 26 to yet other similar circuits 77. In the prior patents, provision is made to connect circuits 77 in a combination of parallel and serial manner: parallel manner meaning two or more of the similar circuits 77 acting simultaneously; serial manner meaning that one or more of the circuits 77 act only after another has acted. For example, the summing function of the voter 75 of a circuit 77 can be implemented by hardware as in the present invention such that each circuit 77 calculates the sum of inputs 25 from other circuits in parallel. But the summing calculation could also be done by digital circuitry (summing registers) that summed inputs 25 sequentially as a microprocessor does.

If a microprocessor were assigned to each node 77. the array of microprocessors would operate in parallel even though each one acts internally in a serial manner. On the other hand, the entire circuit 101 task of self-organizing has been simulated on a single microprocessor which is a serial means of providing self-organizing. Between these extremes are parallel processor methods where microprocessors are temporarily assigned to circuits 77 as part of the parallel processor's software. Since the nodes of any particular memory trace are typically a small fraction of the nodes in the network, only those nodes in the memory trace and adjacent nodes need be assigned to hardware.

Circuits of the present invention and prior inventions can be implemented three ways: external, internal and local. The weights (see Weighting Methods) and the balance and addendum functions (see Balance and Addendum) are implemented in these three ways (FIGS. 8A and 8B). "External" refers to functions implemented by the external computer 9, "internal" refers to functions implemented by hardware circuitry as part of the circuit 1, while "local" refers to functions implemented by hardware circuitry associated with each node 77.

Temporal and spatial functions discussed here can also be implemented in these three ways. Software in external computer 9 can calculate temporal functions such as memory trace function M or spatial function Close based on the inputs 25 and outputs 26 known by the external computer 9. Alternatively, hardware can calculate these functions internally or locally. For instance, if the function MD is to be calculated locally, the nodal circuitry only requires that the values of MD and M from its neighboring surrounding nodes be summed and combined with the memory trace function M of the source itself (see Eqn. 13). Hardware as simple as two summing registers can implement MD locally.

As noted earlier, the entire circuit 101 can be implemented in software (and indeed has been to verify the operation of the various functions presented). however, software implementations are necessarily slower than hardware implementations. An intermediate solution is software implementation by parallel processors since the spatial and temporal functions of circuit 101 are so well suited to parallel hardware implementation.

In addition, the prior patents mentioned provide both electrical and non-electrical means by which circuit 1 can self-organize. Non-electrical means include pneumatic, chemical, optical or other means which obey the rules set forth for self-organizing as described here. The prior patents also provide methods by which information between circuits 77 of the self-organizing circuit 1 can be transmitted by time-variations of signals. These time variations encompass the range between simple changes between two or more signal levels (e.g., binary data), to pulses whose width or rate (or coded sequence of widths or rates) carries the information, the purpose being to reduce the number of inter-connections between circuits 77 of the system.

These and still further modifications of the present invention will occur to persons skilled in the art and all such modifications are deemed to be within the scope of the invention as defined by the appended claims.

What is claimed is:

1. A self-organizing system having a system input signal with constituent elements comprising:

self-organizing means for providing a system output signal corresponding to the analysis of the constituent elements of said system input signal, said self-organizing means further comprising a plurality of identical subcircuits, each subcircuit having a changeable state and organized into a plurality of levels;

an input set composed of both the constituent elements of said system input signal and the output state of each said subcircuit, each subcircuit adapted to receive input messages from at least one element of the input set and which input messages can originate from other subcircuits in previous levels, in the same level and in higher levels;

voting means for voting on the state of each said subcircuit based on a comparison of the relative amounts of positive and negative weighting which the input messages have on each subcircuit;

weight modification means of each subcircuit for modifying the weighting of the input messages based in part upon space functions of subcircuits.

2. The system of claim 1 wherein said weighting means further comprises universal means for additionally modifying the weighting of the input messages of said subcircuits using universal punish and reward signals directed to all subcircuits.

3. The system of claim 2 wherein said weighting means further comprises comparison means for comparing the relative amount of positive and negative input to said voting means, wherein the comparison in conjunction with said universal means determines whether weight modification of the subcircuit will change from its present value.

4. The system of claim 3 wherein the amount of weight modification is limited by the comparison of the relative amounts of positive and negative input provided by said comparison means.

5. The system of claim 1 wherein said weighting of at least a portion of input messages in the analysis of a first pattern of constituent elements of said system input signal is held fixed during the analysis of a second pattern of constituent elements.

6. The system of claim 1 wherein said space functions can include spatial summation functions and spatial difference functions.

7. The system of claim 6 wherein said spatial summation functions for a subcircuit include iterative calculations summing the values of said spatial summation function in its local neighborhood of subcircuits, which neighborhood can include the subcircuit itself.

8. The system of claim 7 wherein said spatial summation functions for a subcircuit include the sum of subcircuits in its local neighborhood which have the proper time-filtered state.

9. The system of claim 7 wherein said spatial summation functions for a subcircuit include the sum of the spatial summation values in its local neighborhood combined with a source value.

10. The system of claim 9 wherein said spatial summation functions for a subcircuit includes a source value based upon the time-filtered state of the subcircuit.

11. The system of claim 9 wherein said spatial summation functions for a subcircuit includes a source value based upon the sum of the subcircuits in its local neighborhood which have the proper time-filtered state.

12. The system of claim 9 wherein said spatial summation functions for a subcircuit includes a source value based in part on universal punish and reward signals directed to all subcircuits.

13. The system of claim 6 wherein said spatial difference functions for a subcircuit include the sum of the differences in an argument function between the subcircuit and other subcircuits in its local neighborhood.

14. The system of claim 6 wherein said spatial difference functions for a subcircuit include the ranking of an argument function among the subcircuits of its local neighborhood.

15. The system of claim 14 wherein said argument function for a subcircuit includes the sum of the argument function values of subcircuits in its local neighborhood combined with a source value based upon the time-filtered state of the subcircuit.

16. The system of claim 1 wherein the input messages from said same level to a subcircuit can include an input message of the subcircuit state.

17. The system of claim 16 wherein said input message of the subcircuit state is delayed in time from the subcircuit state.

18. The system of claim 1 wherein subcircuits which meet the proper time-filtered change of state criteria determine topological memory trace structures using said space functions.

19. The system of claim 18 wherein said memory trace structures include root structures having an elongated shape in which the number of subcircuits across the structure is smaller than the number of subcircuits along the structure.

20. The system of claim 19 wherein said root structures grow by incorporating target subcircuits into the root structure by modifying the weight of target subcircuit input messages originating from subcircuits already in the root structure.

21. The system of claim 20 wherein the direction of growth of said root structure is based in part upon the values of space functions of the subcircuits.

22. The system of claim 20 in which the growth of said root structures further elongates the root structure.

23. The system of claim 20 in which the growth of said root structures fills in concavities in the root structure.

24. The system of claim 20 in which the growth of said root structures branches the root structure into two or more elongated root structures.

25. The system of claim 18 in which the weighting of input messages of memory trace subcircuits is modified to produce different Boolean logic behavior of the subcircuit state.

26. The system of claim 25 in which the weighting of input messages of memory trace subcircuits is modified to produce OR/NOR-like behavior.

27. The system of claim 26 in which the memory trace subcircuits having their weighting modified are interior subcircuits identified by the values of space functions of the subcircuits.

28. The system of claim 18 in which the weighting of input messages of memory trace subcircuits is modified to produce different Boolean logic behavior of the subcircuit state based in part on universal punish and reward signals directed to all subcircuits.

29. The system of claim 28 in which the weighting of input messages of memory trace subcircuits is modified to produce OR/NOR-like behavior under universal reward signals and to produce AND/NAND-like behavior under universal punish signals.

30. The system of claim 29 in which the memory trace subcircuits having weighting modified are interior subcircuits identified by the values of space functions of the subcircuits.

31. The system of claim 28 in which the weighting of input messages of memory trace subcircuits is modified to hinder the progress of information through the memory trace structure under universal punish signals.

32. The system of claim 31 in which the memory trace subcircuits having weighting modified are interior subcircuits identified by the values of space functions of the subcircuits.

33. The system of claim 28 in which the weighting of input messages of memory trace subcircuits is modified to facilitate the progress of information through the memory trace structure under universal punish signals.

34. The system of claim 33 in which the memory trace subcircuits having weighting modified are interior subcircuits identified by the values of space functions of the subcircuits.

35. The system of claim 18 in which a computational threshold of a memory trace subcircuit is modified based in part on universal punish and reward signals directed to all subcircuits.

36. The system of claim 35 in which said computational threshold determines the topology characteristics of the memory trace identified by the values of space functions of the subcircuits.

37. The system of claim 1 in which said self-organizing system is implemented in software.

38. The system of claim 18 in which the progress of information through one memory trace structure is modified based upon the space functions of adjacent memory trace structures.

39. The system of claim 38 in which the progress of information through one memory trace structure is modified based upon the time difference between progress of information through adjacent memory trace structures.

40. The system of claim 1 in which said system output signal is fed back to each said constituent element of the system input signal and further having said system output signal weighted to encourage the repeated circulation of information through said plurality of identical subcircuits.

41. The system of claim 1 in which a portion of said identical subcircuits are coupled to other nearby subcircuits that encourage the repeated circulation of information through said plurality of identical subcircuits.

42. The system of claim 1 in which each said system output signal is identified during its weight modification as having either desirable or undesirable characteristics, said characteristics being later summed to provide a composite measure of the desirability of unknown constituent elements of said system input signal.

43. The system of claim 1 in which each said subcircuit is identified during its weight modification as having either desirable or undesirable characteristics, said characteristics being later summed to provide a composite measure of the desirability of unknown constituent elements of said system input signal.

* * * * *